US012703768B2

(12) United States Patent
Mayfield et al.

(10) Patent No.: US 12,703,768 B2
(45) Date of Patent: Aug. 11, 2026

(54) DEGRADABLE BIO-BASED POLYMERS

(71) Applicants: The Regents of the University of California, Oakland, CA (US); Algenesis Corporation, Cardiff, CA (US)

(72) Inventors: Stephen Mayfield, La Jolla, CA (US); Robert Pomeroy, La Jolla, CA (US); Michael Burkart, La Jolla, CA (US); Natasha Gunawan, La Jolla, CA (US); Ariel Schreiman, La Jolla, CA (US); Marissa Tessman, Cardiff, CA (US); Nitin Neelakantan, Cardiff, CA (US); Ryan Simkovsky, La Jolla, CA (US)

(73) Assignees: The Regents of the University of California, Oakland, CA (US); Algenesis Corporation, Cardiff, CA (US)

( * ) Notice: Subject to any disclaimer, the term of this patent is extended or adjusted under 35 U.S.C. 154(b) by 543 days.

(21) Appl. No.: 17/921,588

(22) PCT Filed: Apr. 26, 2021

(86) PCT No.: PCT/US2021/029239

§ 371 (c)(1),
(2) Date: Oct. 26, 2022

(87) PCT Pub. No.: WO2021/222140

PCT Pub. Date: Nov. 4, 2021

(65) Prior Publication Data

US 2023/0167225 A1 Jun. 1, 2023

Related U.S. Application Data

(60) Provisional application No. 63/016,272, filed on Apr. 27, 2020, provisional application No. 63/016,198, filed on Apr. 27, 2020.

(51) Int. Cl.

| | |
|---|---|
| ***C08J 11/10*** | (2006.01) |
| ***C08G 18/42*** | (2006.01) |
| *C08G 101/00* | (2006.01) |

(52) U.S. Cl.

CPC .......... *C08G 18/4238* (2013.01); *C08J 11/10* (2013.01); *C08J 11/105* (2013.01); (Continued)

(58) Field of Classification Search

CPC ................................ C08J 11/10; C08J 11/105

See application file for complete search history.

(56) References Cited

U.S. PATENT DOCUMENTS

| | | | | |
|---|---|---|---|---|
| 6,255,451 | B1 * | 7/2001 | Koch | C08J 11/105 435/19 |
| 8,513,329 | B2 | 8/2013 | Lake et al. | |

(Continued)

FOREIGN PATENT DOCUMENTS

| | | | |
|---|---|---|---|
| CN | 1723276 A | | 1/2006 |
| CN | 102585286 A | * | 7/2012 |

(Continued)

OTHER PUBLICATIONS

JP-2005307083_Nov. 2005_English.*

(Continued)

*Primary Examiner* — Michael L Leonard

(74) *Attorney, Agent, or Firm* — Foley & Lardner LLP

(57) ABSTRACT

Disclosed herein are bio-based polymers, methods to prepare the same, bio-based polymer products, methods to degrade the same, and methods to recycle the same.

20 Claims, 18 Drawing Sheets

(52) U.S. Cl.
CPC ..... *C08G 2101/00* (2013.01); *C08G 2230/00* (2013.01); *C08J 2375/06* (2013.01)

(56) References Cited

U.S. PATENT DOCUMENTS

| | | | | |
|---|---|---|---|---|
| 2006/0106120 | A1 | 5/2006 | Abe et al. | |
| 2007/0099285 | A1 | 5/2007 | Kambe et al. | |
| 2016/0152761 | A1* | 6/2016 | Wettach | C08G 18/4238 525/440.16 |
| 2016/0257800 | A1* | 9/2016 | Ohwada | C08J 11/26 |
| 2016/0280881 | A1* | 9/2016 | Boisart | C12P 7/56 |
| 2016/0303279 | A1* | 10/2016 | Hsu | C08G 18/4202 |
| 2018/0230286 | A1 | 8/2018 | Stubblefield et al. | |

FOREIGN PATENT DOCUMENTS

| | | | | |
|---|---|---|---|---|
| CN | 107955206 | A | 4/2018 | |
| CN | 108410006 | A | 8/2018 | |
| EP | 1 162 222 | A2 | 12/2001 | |
| EP | 1 621 608 | A1 | 2/2006 | |
| GB | 1 093 884 | A | 12/1967 | |
| JP | 2005307083 | A * | 11/2005 | |
| WO | WO-2015/185744 | A1 | 12/2015 | |
| WO | WO-2019/243293 | A1 | 12/2019 | |
| WO | WO-2019245986 | A1 * | 12/2019 | B09B 3/00 |
| WO | WO-2020/064776 | A1 | 4/2020 | |

OTHER PUBLICATIONS

CN-102585286_Jul. 2012_English.*

International Search Report and Written Opinion dated Aug. 9, 2021, from application No. PCT/US2021/029239.

Magnin, et al., "Enzymatic recycling of thermoplastic polyurethanes: Synergistic effect of an esterase and an amidase and recovery of building blocks", Waste Management, 2019, vol. 85, pp. 141-150.

Wang, et al., "Fabrication and Properties of a Bio-Based Biodegradable Thermoplastic Polyurethane Elastomer", Polymers, 2019, vol. 11, No. 1121, pp. 1-13.

Wang, et al., "Fabrication and Properties of a Bio-Based Biodegradable Thermoplastic Polyurethane Elastomer", Polymers 2019, 11, 1121.

Gunawan, et al., "Rapid biodegradation of renewable polyurethane foams with identification of associated microorganisms and decomposition products", Bioresource Technology Reports, vol. 11, Sep. 1, 2020 (Sep. 1, 2020), pp. 1-9.

* cited by examiner

PU Interior 70
60
50
40
30
20
10
0
4
8
12

Media 70
60
50
40
30
20
10
0
4
8
12

Time (weeks)

Compost
*Uncultured*
*Arthographis kalrae*
*Thermomyces sp.*
*Apiotrichum sp.*
*Mortierella elongata*

Soil
*Uncultured*
*Arthographis kalrae*
*Apiotrichum sp.*
*Aspergillus sp.*
*Thermomyces sp.*

DEGRADABLE BIO-BASED POLYMERS

CROSS-REFERENCE TO RELATED APPLICATIONS

This application is a U.S. National Stage Application under 35 U.S.C. § 371 of International Application No. PCT/US2021/029239, filed Apr. 26, 2021, which claims priority to U.S. Provisional Application No. 63/016,272, filed Apr. 27, 2020, and to U.S. Provisional Application No. 63/016,198, filed Apr. 27, 2020, the contents of each of which are incorporated herein by reference in their entirety.

STATEMENT OF GOVERNMENT SUPPORT

This invention was made with government support under Award Number DE-SC0019986 awarded by the Department of Energy. The government has certain rights in the invention.

BACKGROUND

As of today, approximately 7 billion metric tons of plastic waste had been generated, around 9% of which had been recycled, 12% was incinerated, and 79% was accumulating in landfills or the natural environment. If current production and waste management trends continue, roughly 96 billion tons of plastic waste will be in landfills or in the natural environment by 2050. Nearly all of the plastics in common products, be they shopping bags, water bottles, or footwear, are derived from petrochemicals. When considering the life-cycle of plastic products, every step of production creates pollution. Extraction of petroleum and refining to feedstock chemicals as well as the manufacturing the monomers releases sequestered carbon into the atmosphere, and these processes consume vast quantities of water. Even recycling of the resulting plastic polymers requires energy and water and can be more expensive than new production, resulting in poor recycling compliance and a marginal carbon footprint improvement for recycled products over new production. Given these deleterious effects, a large market opportunity exists in producing plastic products which can be made from renewable feedstocks to produce polymers that will eventually undergo biodegradation.

SUMMARY

In one aspect, disclosed herein are methods to biodegrade a bio-based polymer product, the method comprising incubating the bio-based polymer product with a first microorganism, wherein the bio-based polymer product comprises a bio-based polymer, and incubation of the bio-based polymer product and the first microorganism is conducted under a condition that degrades the bio-based polymer to subunits.

In another aspect, disclosed herein are methods to degrade a bio-based polymer product, the method comprising incubating the bio-based polymer product with an acid or a base, wherein the bio-based polymer product comprises a bio-based polymer, and incubation of the bio-based polymer product with the acid or the base is conducted under a condition that degrades the bio-based polymer to subunits.

In another aspect, disclosed herein are degradable polymer products comprising a bio-based polymer and a rate-regulating compound, wherein the bio-based polymer comprises a bio-based polymer; the bio-based polymer is a polyurethane, a polyester, or a polyester polyurethane; and the rate-regulating compound is a cross-linker comprised within the bio-based polymer or an additive.

In another aspect, disclosed herein are methods of recycling a bio-based polymer product, the method comprising: incubating a bio-based polymer product, wherein the bio-based polymer product comprises a bio-based polymer, under a condition to generate a mixture of subunits from depolymerization of the bio-based polymer; purifying the mixture to obtain one or more isolated subunits; and synthesizing a pre-polymer comprising at least one of the one or more isolated subunits.

In another aspect, disclosed herein are methods to prepare a polyurethane, the method comprising: contacting one or more diols and one or more di-carboxylic acids in a first polymerization reaction to obtain a linear aliphatic polyester polyol; and contacting the linear aliphatic polyester polyol with a diisocyanate in a second polymerization reaction to obtain the polyurethane; wherein at least about 5% of the polyurethane degrades after incubation for 12 weeks with one or more enzymes at a temperature from about 22° C. to about 32° C.

BRIEF DESCRIPTION OF THE DRAWINGS

FIG. 5A: Family-level comparisons of bacteria (left) and fungi (right) in compost or soil media, exterior surface of PU and interior section of PU at 12 weeks. Top 5 most abundant organisms are colored. Closest library comparison of Uncultured fungi: JX489840.1. FIGS. 5B and 5C: Species-level comparisons of change in relative abundance at 4, 8, and 12 weeks of biodegradation on PU interior (top) and media (bottom). Top 5 species for bacteria (FIG. 5B) and fungi (FIG. 5C) found in compost and soil are listed. Organisms from compost are marked with a solid line and organisms from soil are marked with a dotted line.

FIGS. 8A-8D: Imaging Mass Spectrometry (IMS) of compost-derived organisms growing on PUM9 film-agar plates indicates biodegradation. FIG. 8A: Photograph of the PUM9 film inoculated at an agar-exposed region with a week 8 compost shaker flask sample following one week of growth. FIGS. 8B-8F: Ion distributions indicating location and relative intensity (intensity scale inset in A) of the ion with the given m/z value and its molecular association. MDA: 4,4'-methylenedianiline.

DETAILED DESCRIPTION

Certain Terminology

Figure 1:
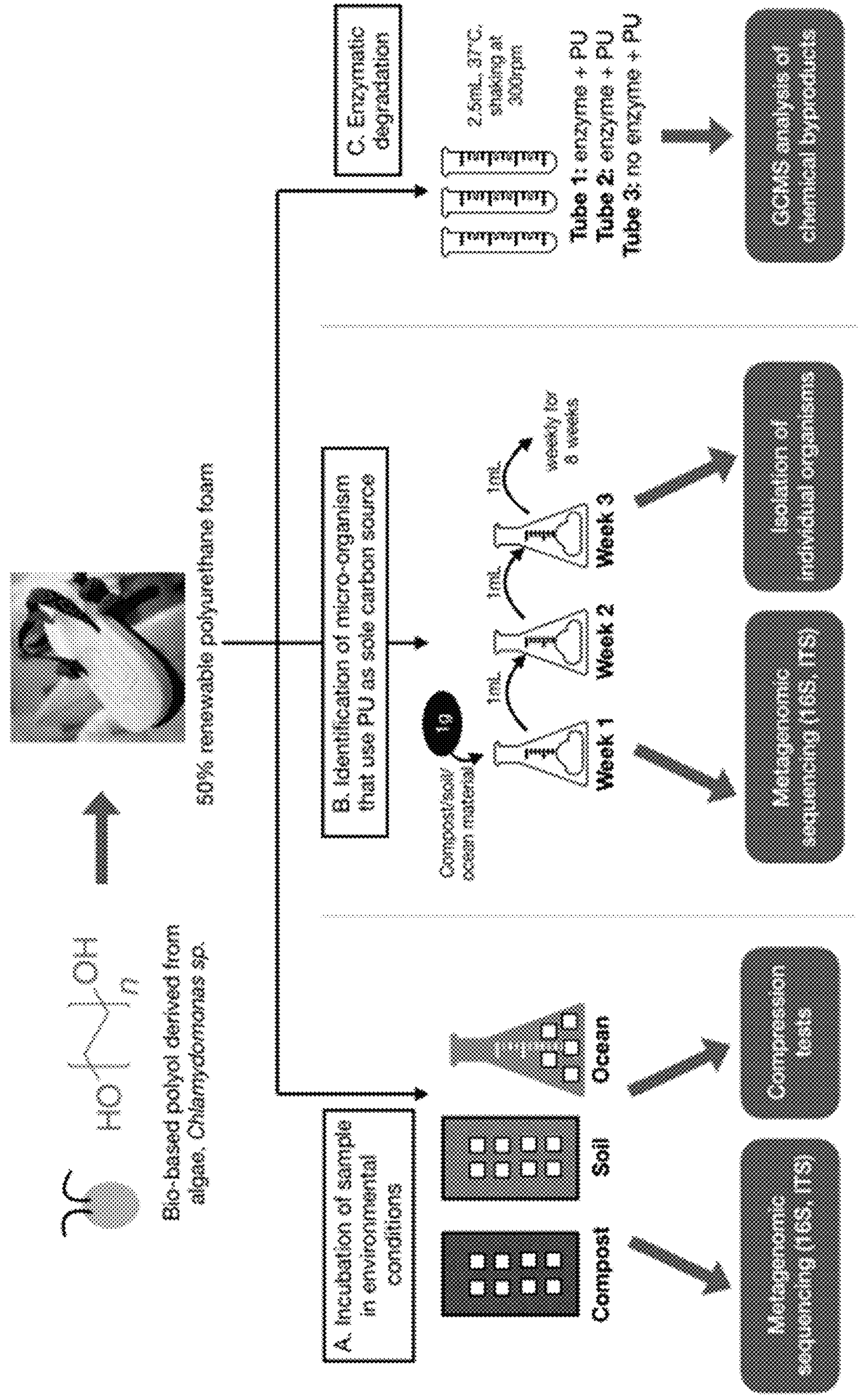
FIG. 1: Testing paradigm schematic.

Unless defined otherwise, all technical and scientific terms used herein have the same meaning as is commonly understood by one of skill in the art to which the claimed subject matter belongs. It is to be understood that the foregoing general description and the following detailed description are exemplary and explanatory only and are not restrictive of any subject matter claimed. In this application, the use of the singular includes the plural unless specifically stated otherwise. It must be noted that, as used in the specification and the appended claims, the singular forms “a,” “an” and “the” include plural referents unless the context clearly dictates otherwise. In this application, the use of “or” means “and/or” unless stated otherwise. Furthermore, use of the term “including” as well as other forms, such as “include”, “includes,” and “included,” is not limiting.

The term “about,” as used herein when referring to a measurable value such as an amount or concentration and the like, is meant to encompass variations of 20%, 10%, 5%, 1%, 0.5%, or even 0.1% of the specified amount.

Certain ranges are presented herein with numerical values being preceded by the term “about”. The term “about” is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

The section headings used herein are for organizational purposes only and are not to be construed as limiting the subject matter described.

As used herein, the term “comprising” is intended to mean that the compositions and methods include the recited elements, but do not exclude others. As used herein, the transitional phrase consisting essentially of (and grammatical variants) is to be interpreted as encompassing the recited materials or steps and those that do not materially affect the basic and novel characteristic(s) of the recited embodiment. Thus, the term "consisting essentially of" as used herein should not be interpreted as equivalent to "comprising." "Consisting of" shall mean excluding more than trace elements of other ingredients and substantial method steps for administering the compositions disclosed herein. Aspects defined by each of these transition terms are within the scope of the present disclosure.

As used herein, an enzyme for use in one or more of the methods described herein encompass any enzyme that is capable of degrading a polyurethane described herein. In some instances, an enzyme described herein degrades the polyurethane by about 5%, 10%, 20%, 30%, 40%, 50%, 60%, 70%, 80%, 90%, 95%, or 100%. In some cases, an enzyme described herein degrades the polyurethane into one or more monomers of a polyol.

In some embodiments, an enzyme described herein is from a fungus or a bacterium isolated from soil, compost, or seawater. In some instances, the enzyme is from a bacterium isolated from soil, compost, or seawater. In some instances, the enzyme is from a bacterium selected from the genus *Chryseobacterium, Ochrobactrum, Paenarthrobacter, Pandoraea, Pseudomonas, Rhizobium, Stenotrophomonas, Alteromonas, Marinobacter, Achromobacter, Brucella*, or *Bacillus.*

*Chryseobacterium* is a genus of Gram-negative bacteria. Exemplary species isolated from soil include, but are not limited to, *Chryseobacterium soli* and *Chryseobacterium jejuense.*

*Ochrobactrum* is a genus of Gram-negative bacteria. Exemplary species isolated from soil include, but are not limited to, *Ochrobactrum anthropic* and *Ochrobactrum grignonense.*

*Paenarthrobacter* is a genus of bacteria from the family Micrococcaceae. Exemplary species of *Paenarthrobacter* from soil include *Paenarthrobacter nicotinovorans.*

*Pandoraea* is a genus of Gram-negative bacteria. Exemplary species isolated from soil include, but are not limited to, *Pandoraea apista.*

*Pseudomonas* is a genus of Gram-negative bacteria. Exemplary species isolated from soil include, but are not limited to, *Pseudomonas aeruginosa* and *Pseudomonas frederiksbergensis*. Exemplary species isolated from compost include, but are not limited to, *Pseudomonas composti*. Exemplary species isolated from seawater include, but are not limited to, *Pseudomonas oceani.*

*Rhizobium* is a genus of Gram-negative bacteria. Exemplary species isolated from compost include, but are not limited to, *Rhizobium leguminosarum* and *Rhizobium meliloti.*

*Achromobacter* is a genus of Gram-negative bacteria. Exemplary species isolated from compost include, but are not limited to, *Achromobacter xylosoxidans.*

*Brucella* is a genus of Gram-negative bacteria. Exemplary species isolated from compost include, but are not limited to, *Brucella melitensis*, and *Brucella abortus.*

*Alteromonas* is a genus of Gram-negative Proteobacteria isolated from seawater. Exemplary species isolated from seawater include, but are not limited to, *Alteromonas marina.*

*Marinobacter* is a genus of Proteobacteria isolated from seawater. Exemplary species isolated from seawater include, but are not limited to, *Marinobacter hydrocarbonoclasticus, Marinobacter goseongensis, Marinobacter salsuginis, Marinobacter salaries*, and *Marinobacter similis.*

*Bacillus* is a genus of Gram-positive bacteria. Exemplary species of *Bacillus* for use in a method described herein include, but are not limited to, *Bacillus subtilis.*

In some instances, at least one of the one or more enzymes are from *Paenarthrobacter nicotinovorans.*

In some instances, at least one of the one or more enzymes are from *Pseudomonas oceani.*

In some instances, at least one of the one or more enzymes are from *Pseudomonas aeruginosa.*

In some instances, at least one of the one or more enzymes are from *Alteromonas marina.*

In some instances, at least one of the one or more enzymes are from *Bacillus subtilis.*

In some instances, at least one of the one or more enzymes are from *Brucella melitensis.*

In some embodiments, an enzyme described herein is from a fungus isolated from soil, compost, or seawater. In some instances, the enzyme is a fungus selected from the genus *Aspergillus* or *Cladosporium.*

*Aspergillus* is a genus of fungi. An exemplary species of *Aspergillus* for use in a method described herein include, but are not limited to, *Aspergillus fumigatus.*

*Cladosporium* is a genus of fungi. Exemplary species for use in a method described herein include, but are not limited to, *Cladosporium fulvum* and *Cladosporium* cladosporioides.

In some instances, at least one of the one or more enzymes are from a fungus selected from *Aspergillus fumigatus.*

Serine hydrolase is a diverse family of enzymes that include lipases and esterases. In some embodiments, the serine hydrolase comprises LipA and CE1. In some instances, the LipA is full-length enzyme, is a functional fragment thereof, or an equivalent thereof. In some cases, the LipA is a modified LipA, comprising one or more substitutions. In some cases, the modified LipA comprises a valine to leucine substitution. In some cases, the LipA comprises at least 80%, 85%, 90%, 95%, 96%, 96%, 97%, 98%, 99%, or 100% sequence identity to SEQ ID NO: 1. In some instances, the LipA consists of SEQ ID NO: 1.

*MKFVKRRIIALVTILMLSVTSLFALQPSAKAAEHNPVVMVHGIGGASFNFAG* SEQ ID NO: 1

*IKSYLVSQGWSRDKLYAVDFWDKTGTNYNNGPVLSRFVQKVLDETGAKKVDIVAH*

*SMGGANTLYYIKNLDGGNKVANVVTVGGANRLTTGKALPGTDPNQKILYTSIYSSA*

*DMIVMNYLSRLDGARNVQIHGVGHIGLLYSSQVNSLIKEGLNGGGQNTN*

*Stenotrophomonas* is a genus of Gram-negative bacteria. Exemplary species isolated from compost include, but are not limited to, *Stenotrophomonas korrensis.*

In some embodiments, the LipA is encoded by a nucleic acid sequence comprising at least 80%, 85%, 90%, 95%, 96%, 96%, 97%, 98%, 99%, or 100% sequence identity to SEQ ID NO: 3. In some cases, the LipA is encoded by a nucleic acid sequence consisting of SEQ ID NO: 3.

SEQ ID NO: 3

*ATGAAATTTGTAAAAAGAAGGATCATTGCACTTGTAACAATTTTGATGC*

*TGTCTGTTACATCGCTGTTTGCGTTGCAGCCGTCAGCAAAAGCCGCTGAACACAA*

*TCCAGTCGTTATGGTTCACGGTATTGGAGGGGCATCATTCAATTTTGCGGGAATT*

*AAGAGCTATCTCGTATCTCAGGGCTGGTCGCGGGACAAGCTGTATGCAGTTGATT*

*TTTGGGACAAGACAGGCACAAATTATAACAATGGACCGGTATTATCACGATTTGT*

*GCAAAAGGTTTTAGATGAAACGGGTGCGAAAAAAGTGGATATTGTCGCTCACAG*

*CATGGGGGGCGCGAACACACTTTACTACATAAAAAATCTGGACGGCGGAAATAA*

*AGTTGCAAACGTCGTGACGGTTGGCGGCGCGAACCGTTTGACGACAGGCAAGGC*

*GCTTCCGGGAACAGATCCAAATCAAAAGATTTTATACACATCCATTTACAGCAGT*

*GCCGATATGATTGTCATGAATTACTTATCAAGATTAGATGGTGCTAGAAACGTTC*

*AAATCCATGGCGTTGGACACATCGGCCTTCTGTACAGCAGCCAAGTCAACAGCCT*

*GATTAAAGAAGGGCTGAACGGCGGGGGGCCAGAATACGAATTAA*

SEQ ID NO: 3 is obtained from GenBank: M74010.1 (accessed on Apr. 15, 2020).

In some embodiments, the enzyme is CE1. In some instances, the CE1 is full-length enzyme, is a functional fragment thereof, or an equivalent thereof. In some cases, the CE1 is a modified CE1, comprising one or more substitutions. In some cases, the modified CE1 comprises a valine to isoleucine substitution. In some cases, the CE1 comprises at least 80%, 85%, 90%, 95%, 96%, 96%, 97%, 98%, 99%, or 100% sequence identity to SEQ ID NO: 2. In some cases, the CE1 consists of SEQ ID NO: 2.

SEQ ID NO: 2

*MKKKSLLPLGLAIGLASLAASPLIQASTYTQTKYPIVLAHGMLGFDNILGVD*

*YWFGIPSALRRDGAQVYVTEVSQLDTSEVRGEQLLQQVEEIVALSGQPKVNLIGHSH*

*GGPTIRYVAAVRPDLIASATSVGAPHKGSDTADFLRQIPPGSAGEAILSGLVNSLGALI*

*SFLSSGSTGTQNSLGSLESLNSEGAARFNAKKYPQGVPTSACGEGAYKVNGVSYYSWS*

*GSSPLTNFLDPSDAFLGASSLTFKNGTANDGLVGTCSSHLGMVIRDNYRMNHLDEV*

*NQVFGLTSLFETSPVSVYRQHANRLKNASL*

In some embodiments, the CE1 is encoded by a nucleic acid sequence comprising at least 80%, 85%, 90%, 95%, 96%, 96%, 97%, 98%, 99%, or 100% sequence identity to SEQ ID NO: 4. In some cases, the CE1 is encoded by a nucleic acid sequence consisting of SEQ ID NO: 4.

SEQ ID NO: 4

*ATGAAGAAGAAGTCTCTGCTCCCCCTCGGCCTGGCCATCGGCCTCGCCT*

*CTCTCGCTGCCAGCCCTCTGATCCAGGCCAGCACCTACACCCAGACCAAATACCC*

*CATCGTGCTGGCCCACGGCATGCTCGGCTTCGACAACATCCTCGGGGTCGACTAC*

*TGGTTCGGCATTCCCAGCGCCTTGCGCCGTGACGGTGCCCAGGTCTACGTCACCG*

*AAGTCAGCCAGTTGGACACCTCGGAAGTCCGCGGCGAGCAGTTGCTGCAACAGG*

*TGGAGGAAATCGTCGCCCTCAGCGGCCAGCCCAAGGTCAACCTGATCGGCCACA*

*GCCACGGCGGGCCGACCATCCGCTACGTCGCCGCCGTACGTCCCGACCTGATCGC*

*TTCCGCCACCAGCGTCGGCGCCCCGCACAAGGGTTCGGACACCGCCGACTTCCTG*

-continued

*CGCCAGATCCCACCGGGTTCGGCCGGCGAGGCAATCCTCTCCGGGCTGGTCAAC*

*AGCCTCGGCGCGCTGATCAGCTTCCTTTCCAGCGGCAGCACCGGTACGCAGAATT*

*CACTGGGCTCGCTGGAGTCGCTGAACAGCGAGGGGGCCGCGCGCTTCAACGCCA*

*AGTACCCGCAGGGCGTCCCCACCTCGGCCTGCGGCGAGGGCGCCTACAAGGTCA*

*ACGGCGTGAGCTATTACTCCTGGAGCGGTTCCTCGCCGCTGACCAACTTCCTCGA*

*TCCGAGCGACGCCTTCCTCGGCGCCTCGTCGCTGACCTTCAAGAACGGCACCGCC*

*AACGACGGCCTGGTCGGCACCTGCAGTTCGCACCTGGGCATGGTGATCCGCGAC*

*AACTACCGGATGAACCACCTGGACGAGGTGAACCAGGTCTTCGGCCTCACCAGC*

*CTGTTCGAGACCAGCCCGGTCAGCGTCTACCGCCAGCACGCCAACCGCCTGAAG*

*AACGCCAGCCTGTAG*

SEQ ID NO: 4 is obtained from GenBank: E09713.1 (accessed on Apr. 15, 2020).

In some embodiments, one or more of the enzymes described supra comprises an active site comprising a pentapeptide Ala/Gly-Xaa-Ser-Xaa-Gly (SEQ ID NO: 5), in which Xaa is any amino acid residue. In some instances, one or more enzymes comprising the pentapeptide is utilized for degradation of a polyurethane described herein, in one or more methods described herein.

As used herein, the term "modification" include, for example, substitutions, additions, insertions and deletions to the amino acid sequences, which can be referred to as "variants." Exemplary sequence substitutions, additions, and insertions include a full length or a portion of a sequence with one or more amino acids substituted (or mutated), added, or inserted, for example of an enzyme described herein. In some instances, an enzyme described herein includes, e.g., a modified enzyme comprising at least 70%, 80%, 85%, 90%, 95%, 96%, 97%, 98%, 99%, or 100% sequence identity to its respective wild-type version.

As used herein, the term "conservative substitution" denotes the replacement of an amino acid residue by another, chemically or biologically similar residue. Biologically similar means that the substitution does not destroy a biological activity or function, e.g., degradation of a polyurethane foams described herein.

Structurally similar means that the amino acids have side chains with similar length, such as alanine, glycine and serine, or a similar size. Chemical similarity means that the residues have the same charge or are both hydrophilic or hydrophobic. Particular examples of conservative substitutions include the substitution of a hydrophobic residue such as isoleucine, valine, leucine or methionine for another, the substitution of a polar residue for another, such as the substitution of arginine for lysine, glutamic for aspartic acids, or glutamine for asparagine, and the like. The term "conservative substitution" also includes the use of a substituted amino acid in place of an unsubstituted parent amino acid. Such proteins that include amino acid substitutions can be encoded by a nucleic acid. Consequently, nucleic acid sequences encoding proteins that include amino acid substitutions are also provided.

Modified proteins also include one or more D-amino acids substituted for L-amino acids (and mixtures thereof), structural and functional analogues, for example, peptidomimetics having synthetic or non-natural amino acids or amino acid analogues and derivatized forms. Modifications include cyclic structures such as an end-to-end amide bond between the amino and carboxy-terminus of the molecule or intra- or inter-molecular disulfide bond.

Modified forms further include "chemical derivatives," in which one or more amino acids has a side chain chemically altered or derivatized. Such derivatized polypeptides include, for example, amino acids in which free amino groups form amine hydrochlorides, p-toluene sulfonyl groups, carbobenzoxy groups; the free carboxy groups form salts, methyl and ethyl esters; free hydroxyl groups that form O-acyl or O-alkyl derivatives as well as naturally occurring amino acid derivatives, for example, 4-hydroxyproline, for proline, 5-hydroxylysine for lysine, homoserine for serine, ornithine for lysine etc. Also included are amino acid derivatives that can alter covalent bonding, for example, the disulfide linkage that forms between two cysteine residues that produces a cyclized polypeptide.

In some embodiments, an enzyme described herein further comprises a label or a tag, e.g., for purification or for detection.

The terms "equivalent" or "biological equivalent" are used interchangeably when referring to a particular molecule, biological, or cellular material and intend those having minimal homology while still maintaining desired structure or functionality. Non-limiting examples of equivalent polypeptides, include a polypeptide having at least 60%, or alternatively at least 65%, or alternatively at least 70%, or alternatively at least 75%, or alternatively 80%, or alternatively at least 85%, or alternatively at least 90%, or alternatively at least 95% identity or alternatively at least 96% identity, or alternatively at least 97% identity, or alternatively at least 98% identity, or alternatively at least 99% identity for polypeptide sequences, or a polypeptide which is encoded by a polynucleotide or its complement that hybridizes under conditions of high stringency to a polynucleotide encoding such polypeptide sequences that has substantially identical or identical function as the reference polypeptide and in one aspect, encodes the reference polypeptide. Conditions of high stringency are described herein and incorporated herein by reference. Alternatively, an equivalent thereof is a polypeptide encoded by a polynucleotide or a complement thereto, having at least 70%, or alternatively at least 75%, or alternatively 80%, or alternatively at least 85%, or alternatively at least 90%, or alternatively at least 95% identity, or at least 96% identity, or at least 97% sequence identity, or alternatively at least 98% identity, or alternatively at least 99% identity to the reference polynucleotide, e.g., the wild-type polynucleotide or referenced polynucleotide.

Non-limiting examples of equivalent polynucleotides, include a polynucleotide having at least 60%, or alternatively at least 65%, or alternatively at least 70%, or alternatively at least 75%, or alternatively 80%, or alternatively at least 85%, or alternatively at least 90%, or alternatively at least 95%, or at least 96% identity, or at least 97% sequence identity, or alternatively at least 98% identity, or alternatively at least 99% identity to a reference polynucleotide. An equivalent also intends a polynucleotide or its complement that hybridizes under conditions of high stringency to a reference polynucleotide.

A polynucleotide or polynucleotide region (or a polypeptide or polypeptide region) having a certain percentage (for example, 80%, 85%, 90%, or 95%) of "sequence identity" to another sequence means that, when aligned, that percentage of bases (or amino acids) are the same in comparing the two sequences. The alignment and the percent homology or sequence identity can be determined using software programs known in the art, for example those described in Current Protocols in Molecular Biology (Ausubel et al., eds. 1987) Supplement 30, section 7.7.18, Table 7.7.1. In certain embodiments, default parameters are used for alignment. A non-limiting exemplary alignment program is BLAST, using default parameters. In particular, exemplary programs include BLASTN and BLASTP, using the following default parameters: Genetic code=standard; filter=none; strand=both; cutoff=60; expect=10; Matrix=BLOSUM62; Descriptions=50 sequences; sort by=HIGH SCORE; Databases=non-redundant, GenBank+EMBL+DDBJ+PDB+GenBank CDS translations+SwissProtein+SPupdate+PIR. Details of these programs can be found at the following Internet address: ncbi.nlm.nih.gov/cgi-bin/BLAST. Sequence identity and percent identity can be determined by incorporating them into clustalW (available at the web address: genome.jp/tools/clustalw/, last accessed on Jan. 13, 2017).

"Homology" or "identity" or "similarity" refers to sequence similarity between two peptides or between two nucleic acid molecules. Homology can be determined by comparing a position in each sequence that may be aligned for purposes of comparison. When a position in the compared sequence is occupied by the same base or amino acid, then the molecules are homologous at that position. A degree of homology between sequences is a function of the number of matching or homologous positions shared by the sequences. An "unrelated" or "non-homologous" sequence shares less than 40% identity, or alternatively less than 25% identity, with one of the sequences of the present disclosure.

"Homology" or "identity" or "similarity" can also refer to two nucleic acid molecules that hybridize under stringent conditions.

"Hybridization" refers to a reaction in which one or more polynucleotides react to form a complex that is stabilized via hydrogen bonding between the bases of the nucleotide residues. The hydrogen bonding may occur by Watson-Crick base pairing, Hoogstein binding, or in any other sequence-specific manner. The complex may comprise two strands forming a duplex structure, three or more strands forming a multi-stranded complex, a single self-hybridizing strand, or any combination of these. A hybridization reaction may constitute a step in a more extensive process, such as the initiation of a PCR reaction, or the enzymatic cleavage of a polynucleotide by a ribozyme.

Examples of stringent hybridization conditions include: incubation temperatures of about 25° C. to about 37° C.; hybridization buffer concentrations of about 6× saline sodium citrate (SSC) to about 10×SSC; formamide concentrations of about 0% to about 25%; and wash solutions from about 4×SSC to about 8×SSC. Examples of moderate hybridization conditions include: incubation temperatures of about 40° C. to about 50° C.; buffer concentrations of about 9×SSC to about 2×SSC; formamide concentrations of about 30% to about 50%; and wash solutions of about 5×SSC to about 2×SSC. A high stringency hybridization refers to a condition in which hybridization of an oligonucleotide to a target sequence comprises no mismatches (or perfect complementarity). Examples of high stringency conditions include: incubation temperatures of about 55° C. to about 68° C.; buffer concentrations of about 1×SSC to about 0.1×SSC; formamide concentrations of about 55% to about 75%; and wash solutions of about 1×SSC, 0.1×SSC, or deionized water. In general, hybridization incubation times are from 5 minutes to 24 hours, with 1, 2, or more washing steps, and wash incubation times are about 1, 2, or 15 minutes. SSC is 0.15 M NaCl and 15 mM citrate buffer. It is understood that equivalents of SSC using other buffer systems can be employed.

In one aspect, described herein is a bio-based polyurethane that was designed to be suitable for commercial material applications and can be degraded enzymatically or chemically and the degradation products purified to be used to regenerate new monomers. Enzymes have been identified and cloned that can degrade the bio-based polyurethane back into the starting raw materials, which have been purified and isolated.

Degradable Bio-Based Polymers

In another aspect, disclosed herein are degradable bio-based polymers. In some embodiments, the degradable bio-based polymer is a biodegradable bio-based polymer.

In some embodiments, the degradable polymer is a polyurethane, a polyester, or a polyester polyurethane. In some embodiments, the degradable polymer is a polyurethane. In some embodiments, the degradable polymer is a polyester. In some embodiments, the degradable polymer is a polyester polyurethane.

In some embodiments, the degradable polymer further comprises a rate-regulating compound is a cross-linker. In some embodiments, the rate-regulating compound is a cross-linker. In some embodiments, the cross-linker is selected from a $C_2$-$C_{12}$ diol, glycerol, trimethylolpropane, pentaerythritol, and a combination of two or more thereof.

In some embodiments, the rate-regulating compound is present in the degradable polymer in an amount of about 0.1% w/w to about 5% w/w. This includes an amount of about 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, and 5.0% w/w, including increments therein.

In some embodiments, the bio-based polymer is a polymerization product of one or more polyols, and a diisocyanate.

In some embodiments, the one or more polyols are linear aliphatic polyester polyols.

In some embodiments, the polyol is produced from one or more biologically sourced diols, one or more biologically sourced di-carboxylic acids, or a combination thereof. In some embodiments, the one or more biologically sourced diols, the one or more biologically sourced di-carboxylic acids or a combination thereof are derived from algae.

In some embodiments, the one or more biologically sourced diols or the one or more biologically sourced di-carboxylic acids are non-branched. In some embodiments, the one or more biologically sourced diols and the one or more biologically sourced di-carboxylic acids are non-branched. In some embodiments, the one or more biologically sourced diols and the one or more biologically sourced di-carboxylic acids are branched. In some embodiments, the branched one or more biologically sourced diols are selected from 1,2-propanediol; 2-methyl-1,3-propanediol; 2,2-dimethyl-1,3-propanediol; 1,2-butanediol; 1,3-butanediol; 2,3-butanediol; 3-methyl-1,5-pentanediol; and 2-methyl-2,4-pentanediol, or a combination of two or more thereof.

In some embodiments, the one or more biologically sourced diols and the one or more biologically sourced di-carboxylic acids have a carbon chain length of 2-10 carbons. In some embodiments, the one or more biologically sourced diols or the one or more biologically sourced di-carboxylic acids have a carbon chain length of 2-4 carbons. In some embodiments, the one or more biologically sourced diols and the one or more biologically sourced di-carboxylic acids have a carbon chain length of 2-4 carbons. In some embodiments, the one or more biologically sourced diols and the one or more biologically sourced di-carboxylic acids have a carbon chain length of 5-20 carbons. In some embodiments, the one or more biologically sourced di-carboxylic acids are selected from glutaric acid, adipic acid, pimelic acid, suberic acid, azelaic acid, sebacic acid, dodecanedioic acid, and octadecanedioic acid, or a combination of two or more thereof.

In some embodiments, the one or more biologically sourced di-carboxylic acids are independently selected from the group consisting of oxalic acid, malonic acid, succinic acid, glutaric acid, adipic acid, pimelic acid, suberic acid, azelaic acid, and sebacic acid.

In some embodiments, the one or more biologically sourced diols are independently selected from the group consisting of ethylene glycol; 1,2 propanediol; 1,3-propanediol; glycerol; 1,3-butanediol; 1,4-butanediol; 2-methyl-1,3-propanediol; 2,3-butanediol; trimethylolpropane; 1,5-pentanediol; 1,6-hexanediol; 3-methyl-1,5-pentanediol; 1,7-heptanediol; 1,8-octanediol; 1,9-nonanediol; and 1,10-decanediol.

In some embodiments, diisocyanate is selected from methylenebis(phenyl isocyanate) (MDI), toluene diisocyanate (TDI), hexamethylene diisocyanate (HDI), naphthalene diisocyanate (NDI), methylene bis-cyclohexylisocyanate (HMDI), isophorone diisocyanate (IPDI), or a combination of two or more thereof.

In some embodiments, about 5% to about 100% degradation of the bio-based polymer into subunits occurs after at least 12 weeks. This includes a time period of 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, or 52 weeks, including increments therein. In some embodiments, about 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%, including increments therein, degradation occurs. In some embodiments, the degradation is performed at a temperature from about 22° C. to about 32° C. This includes ranges of temperature of from about 22° C. to about 30° C., from about 22° C. to about 28° C., from about 23° C. to about 30° C., from about 23° C. to about 28° C., from about 24° C. to about 30° C., from about 24° C. to about 28° C., from about 25° C. to about 30° C., from about 25° C. to about 28° C., from about 26° C. to about 30° C., and from about 26° C. to about 28° C. In some embodiments, the temperature is about 22° C., about 23° C., about 24° C., about 25° C., about 26° C., about 27° C., about 28° C., about 29° C., about 30° C., about 31° C., or about 32° C. In some embodiments, the degradation is performed at a humidity of about 50%, 60%, 70%, 80%, 90%, 91%, 92%, 93%, 94%, 95%, 96%, 97%, 98%, or 99%. In some embodiments, about 5%, 10%, 20%, 30%, 40%, 50%, 60%, 70%, 80%, 90%, 95%, or 100% degradation of the bio-based polymer into subunits occurs after at least 12 weeks. In some embodiments, about 5%, 10%, 20%, 30%, 40%, 50%, 60%, 70%, 80%, 90%, 95%, or 100% degradation of the bio-based polymer into subunits occurs after at least 12 weeks at a temperature from about 22° C. to about 32° C. and at a humidity of about 50%, 60%, 70%, 80%, 90%, or 95%.

In some embodiments, the subunits comprise a polyol, a di-carboxylic acid, a diol, or a combination of two or more thereof. In some embodiments, the di-carboxylic acid is independently selected from the group consisting of oxalic acid, malonic acid, succinic acid, glutaric acid, adipic acid, pimelic acid, suberic acid, azelaic acid, and sebacic acid. In some embodiments, the diol is independently selected from the group consisting of ethylene glycol; 1,2 propanediol; 1,3-propanediol; glycerol; 1,3-butanediol; 1,4-butanediol; 2-methyl-1,3-propanediol; 2,3-butanediol; trimethylolpropane; 1,5-pentanediol; 1,6-hexanediol; 3-methyl-1,5-pentanediol; 1,7-heptanediol; 1,8-octanediol; 1,9-nonanediol; and 1,10-decanediol.

In some embodiments, the degradable polymer is in a form of a foam. In some embodiments, the foam comprises an open cell foam. In some embodiments, the foam comprises a closed cell foam. In some embodiments, the foam has a density of 0.05 g/cc to 0.75 g/cc as measured by ASTM D796; a hardness of 20 Asker C units to 80 Asker C units as measured by ASTM D2240; a tensile of 0.5 MPa to 5 MPa as measured by ASTM D412; elongation of 50% to 900% as measured by ASTM D2209 and ASTM D2211; Die C Tear values of 2 N/mm to 20 N/mm as measured by ASTM D624; Split Tear values of 0.5 N/mm to 3 N/mm as measured by ASTM D3574; compression of 5% to 20% as measured by ASTM 3574; and resilience of 10% to 60% as measured by DIN 53512.

In some embodiments, the foam has a cell size of about 1 micron to about 1 mm in cell diameter.

In some embodiments, the polyurethane is in the form of a thermal plastic polyurethane (TPU).

In some embodiments, the polyurethane is in the form of an adhesive. In some embodiments, the adhesive is prepared from a polyol selected from polycaprolactone and poly(ethyl-azelate), and poly(ethyl-co-propyl-azelate), or a combination of two or more thereof; one or more selected from propanediol, ethylene glycol, dimethylolpropionic acid, and ethylenediamine (EDA); and one or more diisocyanates selected from hexamethylene diisocyanate (HDI), heptamethylene diisocyanate (HpDI), toluene diisocyanate (TDI), and isophorone diisocyanate (IPDI).

In some embodiments, a bio-based polyurethane comprises linear aliphatic polyester polyols, wherein the polyol is produced from one or more algae-derived diols, one or more algae-derived di-carboxylic acids, or a combination thereof, wherein the bio-based polyurethane is a foam with a density of 0.05 g/cc to 0.75 g/cc as measured by ASTM D796; a hardness of 20 Asker C units to 80 Asker C units as measured by ASTM D2240; a tensile of 0.5 MPa to 5 MPa as measured by ASTM D412; elongation of 50% to 900% as measured by ASTM D2209 and ASTM D2211; Die C Tear values of 2 N/mm to 20 N/mm as measured by ASTM D624; Split Tear values of 0.5 N/mm to 3 N/mm as measured by ASTM D3574; compression of 5% to 20% as measured by ASTM 3574; and resilience of 10% to 60% as measured by DIN 53512.

The degradable polymers described herein may be degraded using methods disclosed herein. The degradable polymers described herein may be recycled using the methods disclosed herein.

In some embodiments, a degradable polymer described herein is prepared according to a method described herein. In some embodiments, a bio-based polymer described herein is prepared according to a method described herein.

Methods to Prepare Bio-Based Polymers

In another aspect, disclosed herein are methods to prepare degradable polymers. In some embodiments, the degradable polymer is a polyurethane.

In another aspect, disclosed herein are methods to prepare bio-based polymers. In some embodiments, the bio-based polymer is a polyurethane.

Accordingly, in another aspect, disclosed herein is a method to prepare a polyurethane, the method comprising

- contacting one or more diols and one or more di-carboxylic acids in a first polymerization reaction to obtain a linear aliphatic polyester polyol; and
- contacting the linear aliphatic polyester polyol with a diisocyanate in a second polymerization reaction to obtain the polyurethane;
- wherein at least about 5% of the polyurethane degrades after incubation for 12 weeks with one or more enzymes at a temperature from about 22° C. to about 32° C.

In some embodiments, the diisocyanate is methylenebis (phenyl isocyanate) (MDI), toluene diisocyanate (TDI), hexamethylene diisocyanate (HDI), naphthalene diisocyanate (NDI), methylene bis-cyclohexylisocyanate (HMDI), isophorone diisocyanate (IPDI), or a combination of two or more thereof.

In some embodiments, the one or more diols comprise ethylene glycol; 1,2 propanediol; 1,3-propanediol; glycerol; 1,3-butanediol; 1,4-butanediol; 2-methyl-1,3-propanediol; 2,3-butanediol; trimethylolpropane; 1,5-pentanediol; 1,6-hexanediol; 3-methyl-1,5-pentanediol; 1,7-heptanediol; 1,8-octanediol; 1,9-nonanediol; 1,10-decanediol; or a combination of two or more thereof. In some embodiments, the one or more diols are derived from algae.

In some embodiments, the one or more di-carboxylic acids comprise oxalic acid, malonic acid, succinic acid, glutaric acid, adipic acid, pimelic acid, suberic acid, azelaic acid, or sebacic acid, or a combination of two or more thereof. In some embodiments, the one or more di-carboxylic acids comprise azelaic acid. In some embodiments, the one or more di-carboxylic acids are derived from algae.

In some embodiments, the one or more diols are contacted with an equimolar amount of the one or more di-carboxylic acids.

In some embodiments, the linear aliphatic polyester polyol has a molecular weight of about 400 to about 4000, and an OH number of about 14 mg KOH/g to about 140 mg KOH/g. In some embodiments, the linear aliphatic polyester polyol has a molecular weight of about 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, or 4000, including increments therein, and an OH number of about 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, or 140 mg KOH/g. In some embodiments, the linear aliphatic polyester polyol has a molecular weight of about 2000, and an OH number of about 56 mg KOH/g.

In some embodiments, the polyurethane is in the form of a foam. In some embodiments, the foam comprises an open cell foam. In some embodiments, the foam comprises a closed cell foam.

In some embodiments, the foam has a density of 0.05 g/cc to 0.75 g/cc as measured by ASTM D796; a hardness of 20 Asker C units to 80 Asker C units as measured by ASTM D2240; a tensile of 0.5 MPa to 5 MPa as measured by ASTM D412; elongation of 50% to 900% as measured by ASTM D2209 and ASTM D2211; Die C Tear values of 2 N/mm to 20 N/mm as measured by ASTM D624; Split Tear values of 0.5 N/mm to 3 N/mm as measured by ASTM D3574; compression of 5% to 20% as measured by ASTM 3574; and resilience of 10% to 60% as measured by DIN 53512.

In some embodiments, contacting the linear aliphatic polyester polyol with a diisocyanate in a second polymerization reaction comprises pouring a mixture of the diisocyanate and linear aliphatic polyester polyol, or polyol-prepolymer (e.g., a mixture containing polyol and partial equivalents of diisocyanate), into a mold. In some embodiments, the method avoids mechanical shearing prior to the pouring.

In some embodiments, the polyurethane is in the form of a thermal plastic polyurethane (TPU).

In some embodiments, the polyurethane is in the form of an adhesive. In some embodiments, the adhesive is prepared from a polyol selected from polycaprolactone, poly(ethyl-azelate), and poly(ethyl-co-propyl-azelate), or a combination of two or more thereof; one or more selected from propanediol, ethylene glycol, dimethylolpropionic acid, and ethylenediamine (EDA); and one or more diisocyanates selected from hexamethylene diisocyanate (HDI), heptamethylene diisocyanate (HpDI), toluene diisocyanate (TDI), and isophorone diisocyanate (IPDI).

In some embodiments, about 5% to about 100% of the polyurethane degrades after incubation for at least 12 weeks with one or more enzymes at a temperature from about 22° C. to about 32° C. In some embodiments, at least about 5%, 10%, 15%, 20%, 25%, 30%, 40%, 50%, 60%, 70%, 80%, 90%, 95%, or 100% of the polyurethane degrades after incubation for at least 12 weeks with one or more enzymes at a temperature from about 22° C. to about 32° C. This includes a time period of 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, or 52 weeks, including increments therein. In some embodiments, about 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%, including increments therein, degradation occurs. In some embodiments, the incubation is performed at a temperature from about 22° C. to about 32° C. This includes ranges of temperature of from about 22° C. to about 30° C., from about 22° C. to about 28° C., from about 23° C. to about 30° C., from about 23° C. to about 28° C., from about 24° C. to about 30° C., from about 24° C. to about 28° C., from about 25° C. to about 30° C., from about 25° C. to about 28° C., from about 26° C. to about 30° C., and from about 26° C. to about 28° C. In some embodiments, the temperature is about 22° C., about 23° C., about 24° C., about 25° C., about 26° C., about 27° C., about 28° C., about 29° C., about 30° C., about 31° C., or about 32° C. In some embodiments, the incubation is performed at a humidity of about 50%, 60%, 70%, 80%, 90%, 91%, 92%, 93%, 94%, 95%, 96%, 97%, 98%, or 99%. In some embodiments, at least about 5%, 10%, 15%, 20%, 25%, 30%, 40%, 50%, 60%, 70%, 80%, 90%, 95%, or 100% of the polyurethane degrades after incubation for 12 weeks with one or more enzymes at a temperature from about 22° C. to about 32° C. and at a humidity of about 50%, 60%, 70%, 80%, 90%, or 95%.

In some embodiments, the one or more enzymes are from a fungus isolated from soil, compost, or seawater. In some embodiments, the one or more enzymes are from a fungus isolated from soil or compost. In some embodiments, the one or more enzymes are from a fungus isolated from soil. In some embodiments, the one or more enzymes are from a fungus isolated from compost. In some embodiments, the one or more enzymes are from a fungus isolated from seawater.

In some embodiments, the one or more enzymes are from a bacterium selected from the genus *Chryseobacterium, Ochrobactrum, Paenarthrobacter, Pandoraea, Pseudomonas, Rhizobium, Stenotrophomonas, Alteromonas, Marinobacter*, or *Bacillus*.

In some embodiments, at least one of the one or more enzymes is a serine hydrolase, a lipase, an esterase, or a combination of two or more thereof. In some embodiments, at least one of the one or more enzymes is a serine hydrolase. In some embodiments, at least one of the one or more enzymes is a lipase. In some embodiments, at least one of the one or more enzymes is an esterase.

In some embodiments, at least one of the one or more enzymes comprises LipA or CE1, or both. In some embodiments, at least one of the one or more enzymes comprises LipA. In some embodiments, at least one of the one or more enzymes comprises CE1.

In some embodiments, the LipA is full-length enzyme or is a functional fragment. In some embodiments, the LipA is a modified LipA, comprising one or more substitutions. In some embodiments, the modified LipA comprises a valine to leucine substitution. In some embodiments, LipA comprises at least 80%, 85%, 90%, 95%, 96%, 96%, 97%, 98%, 99%, or 100% sequence identity to SEQ ID NO: 1.

In some embodiments, the CE1 is full-length enzyme or is a functional fragment. In some embodiments, the CE1 is a modified CE1, comprising one or more substitutions. In some embodiments, the modified CE1 comprises a valine to isoleucine substitution. In some embodiments, the CE1 comprises at least 80%, 85%, 90%, 95%, 96%, 96%, 97%, 98%, 99%, or 100% sequence identity to SEQ ID NO: 2.

Degradable Polymer Products

In another aspect, disclosed herein are degradable polymer product comprising, consisting essentially of, or consisting of a bio-based polymer and a rate-regulating compound, wherein the bio-based polymer comprises a bio-based polymer; the bio-based polymer is a polyurethane, a polyester, or a polyester polyurethane; and the rate-regulating compound is a cross-linker comprised within the bio-based polymer or an additive.

In some embodiments, the additive is a vitamin, a salt, or a mineral. In some embodiments, the additive is a vitamin or a salt. In some embodiments, the additive is a vitamin or a mineral. In some embodiments, the additive is a salt or a mineral. In some embodiments, the additive is a vitamin. In some embodiments, the additive is a salt. In some embodiments, the additive is a mineral. In some embodiments, the vitamin is selected from p-aminobenzoic acid (PABA), folic acid, biotin, lipoic acid, mercaptoethane-sulfonic acid, nicotinic acid, pantothenic acid, pyridoxine (B6), riboflavin (B2), thiamine (B1), vitamin B12, or vitamin K, or a combination of two or more thereof. In some embodiments, the salt is selected from the group consisting of $CaCl_2$), $Na_2HPO_4$, $KH_2PO_4$, NaCl, $NH_4Cl$, $MgSO_4$, and a combination of two or more thereof. In some embodiments, the salt is selected from the group consisting of $CaCl_2$), $Na_2HPO_4$, $KH_2PO_4$, NaCl, $NH_4Cl$, $MgSO_4$, $NaNO_3$, $NaH_2PO_4$, $FeCl_3$, and a combination of two or more thereof. In some embodiments, the salt is selected from the group consisting of $NaNO_3$, $NaH_2PO_4$, $FeCl_3$, and a combination of two or more thereof. In some embodiments, the mineral is selected from the group consisting of nitrogen, potassium, phosphate, iron, calcium, sulfur, magnesium, cobalt, zinc, and a combination of two or more thereof.

In some embodiments, the additive is a cell-opener. As used herein, a "cell-opener" is a polyol, fluid, or finely divided particle that aids in enlarging the cell size of a polyurethane foam, or aids in rupturing cell walls during foam expansion/curing, leading to an open cell structure. In some embodiments, the cell-opener is selected from VORANOL™ CP1421 polyol (polyether polyol), VORANOL™ 4053 polyol (polyether polyol), GORAPUR® IMR 852 (silicone-based), TEGOSTAB® B8948, NIAX™ L-1507 (non-hydrolyzable silicone surfactant), NIAX™ L-6164 (non-hydrolyzable silicone copolymer surfactant), NIAX™ L-6186 (non-hydrolyzable silicone copolymer surfactant), and NIAX™ L-6189 (organosilicone copolymer surfactant).

In some embodiments, the additive is present in the degradable polymer product in an amount of about 1% w/w to about 5% w/w. This includes an amount of about 1%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, and 5.0% w/w, including increments therein.

In some embodiments, the degradable polymer product is in a form of a thermal plastic polyurethane (TPU).

In some embodiments, the degradable polymer product is in a form of an adhesive. In some embodiments, the adhesive is prepared from a polyol selected from polycaprolactone and poly(ethyl-azelate), and poly(ethyl-co-propyl-azelate), or a combination of two or more thereof; one or more selected from propanediol, ethylene glycol, dimethylolpropionic acid, and ethylenediamine (EDA); and one or more diisocyanates selected from hexamethylene diisocyanate (HDI), heptamethylene diisocyanate (HpDI), toluene diisocyanate (TDI), and isophorone diisocyanate (IPDI).

In some embodiments, the degradable polymer product is in a form of a foam. In some embodiments, the foam comprises an open cell foam. In some embodiments, the foam comprises a closed cell foam. In some embodiments, the foam has a density of 0.05 g/cc to 0.75 g/cc as measured by ASTM D796; a hardness of 20 Asker C units to 80 Asker C units as measured by ASTM D2240; a tensile of 0.5 MPa to 5 MPa as measured by ASTM D412; elongation of 50% to 900% as measured by ASTM D2209 and ASTM D2211; Die C Tear values of 2 N/mm to 20 N/mm as measured by ASTM D624; Split Tear values of 0.5 N/mm to 3 N/mm as measured by ASTM D3574; compression of 5% to 20% as measured by ASTM 3574; and resilience of 10% to 60% as measured by DIN 53512.

In some embodiments, the foam has a density of about 0.05 g/L to about 0.75 g/L. In some embodiments, the foam has a density of about 0.075 g/L to about 0.6 g/L. In some embodiments, the foam has a density of about 0.075 g/L to about 0.3 g/L. In some embodiments, the foam has a density of about 0.45 g/L to about 0.6 g/L.

The degradable polymer product may be cured in mold. Typically, such curing will create an integral skin or outer surface layer as a result of the expanding material pushing against the mold wall. As such, in some embodiments, the degradable polymer product comprises an outer surface layer. In some embodiments, the outer surface layer is comprised of the same polymer as the bio-based polymer.

In some embodiments, the degradable polymer product is a biodegradable polymer product.

In some embodiments, the degradable polymer product is comprised within a shoe, insole or midsole.

The degradable polymer products described herein may be degraded using methods disclosed herein. The degradable polymer products described herein may be recycled using the methods disclosed herein.

Methods to Degrade the Bio-Based Polymer Product

In another aspect, disclosed herein are methods to degrade a bio-based polymer product, the methods comprising incubating the bio-based polymer product with an acid or a base, wherein the bio-based polymer product comprises a bio-based polymer, and incubation of the bio-based polymer product with the acid or the base is conducted under a condition that degrades the bio-based polymer to subunits.

In another aspect, disclosed herein are methods to biodegrade a bio-based polymer product, the methods comprising incubating the bio-based polymer product with a first microorganism, wherein the bio-based polymer product comprises a bio-based polymer, and incubation of the bio-based polymer product and the first microorganism is conducted under a condition that degrades the bio-based polymer to subunits.

In some embodiments, the bio-based polymer product comprises a foam. In some embodiments, the bio-based polymer product comprises an open cell foam. In some embodiments, the bio-based polymer product comprises a closed cell foam. In some embodiments, the foam has a density of 0.05 g/cc to 0.75 g/cc as measured by ASTM D796; a hardness of 20 Asker C units to 80 Asker C units as measured by ASTM D2240; a tensile of 0.5 MPa to 5 MPa as measured by ASTM D412; elongation of 50% to 900% as measured by ASTM D2209 and ASTM D2211; Die C Tear values of 2 N/mm to 20 N/mm as measured by ASTM D624; Split Tear values of 0.5 N/mm to 3 N/mm as measured by ASTM D3574; compression of 5% to 20% as measured by ASTM 3574; and resilience of 10% to 60% as measured by DIN 53512.

In some embodiments, the foam has a density of about 0.05 g/L to about 0.75 g/L. In some embodiments, the foam has a density of about 0.075 g/L to about 0.6 g/L. In some embodiments, the foam has a density of about 0.075 g/L to about 0.3 g/L. In some embodiments, the foam has a density of about 0.45 g/L to about 0.6 g/L.

In some embodiments, the bio-based polymer product comprises a thermal plastic polyurethane (TPU). In some embodiments, the bio-based polymer product comprises an adhesive.

In some embodiments, the bio-based polymer product is comprised in a shoe, an insole, or a midsole.

In some embodiments, the bio-based polymer is a polyurethane. In some embodiments, the polyurethane is a polymerization product of one or more linear aliphatic polyester polyols, and a diisocyanate. In some embodiments, one or more linear aliphatic polyester polyols are produced from one or more biologically sourced diols and one or more biologically sourced di-carboxylic acids. In some embodiments, the one or more biologically sourced diols, the one or more biologically sourced di-carboxylic acids, or a combination thereof are derived from algae.

In some embodiments, the one or more biologically sourced diols or the one or more biologically sourced di-carboxylic acids are non-branched. In some embodiments, the one or more biologically sourced diols and the one or more biologically sourced di-carboxylic acids are non-branched. In some embodiments, the one or more biologically sourced diols and the one or more biologically sourced di-carboxylic acids are branched. In some embodiments, the branched one or more biologically sourced diols are selected from 1,2-propanediol; 2-methyl-1,3-propanediol; 2,2-dimethyl-1,3-propanediol; 1,2-butanediol; 1,3-butanediol; 2,3-butanediol; 3-methyl-1,5-pentanediol; and 2-methyl-2,4-pentanediol, or a combination of two or more thereof.

In some embodiments, the one or more biologically sourced diols and the one or more biologically sourced di-carboxylic acids have a carbon chain length of 2-10 carbons. In some embodiments, the one or more biologically sourced diols or the one or more biologically sourced di-carboxylic acids have a carbon chain length of 2-4 carbons. In some embodiments, the one or more biologically sourced diols and the one or more biologically sourced di-carboxylic acids have a carbon chain length of 2-4 carbons. In some embodiments, the one or more biologically sourced diols and the one or more biologically sourced di-carboxylic acids have a carbon chain length of 5-20 carbons. In some embodiments, the one or more biologically sourced di-carboxylic acids are selected from glutaric acid, adipic acid, pimelic acid, suberic acid, azelaic acid, sebacic acid, dodecanedioic acid, and octadecanedioic acid, or a combination of two or more thereof.

In some embodiments, the bio-based polymer product further comprises a rate-regulating compound, wherein the rate-regulating compound accelerates degradation of the bio-based polymer compared to degradation of the bio-based polymer in the absence of the rate-regulating compound. In some embodiments, the bio-based polymer product further comprises a rate-regulating compound, wherein the rate-regulating compound decelerates degradation of the bio-based polymer compared to degradation of the bio-based polymer in the absence of the rate-regulating compound.

In some embodiments, the rate-regulating compound is present in the bio-based polymer product in an amount of about 0.1% w/w to about 5% w/w. This includes an amount of about 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, and 5.0% w/w, including increments therein.

In some embodiments, the rate-regulating compound is a cross-linker or a chain extender additive. In some embodiments, the cross-linker or chain extender additive is selected from a $C_2$-$C_{12}$ diol, glycerol, trimethylolpropane, pentaerythritol, and a combination of two or more thereof. In some embodiments, the cross-linker or chain extender additive is selected from trimethylolpropane; ethylene glycol; 1,2- and 1,3-propylene glycol; 1,4- and 2,3-butane diol; 1,6-hexane diol; 1,8-octane diol; neopentyl glycol; cyclohexane dimethanol; 2-methyl-1,3-propane diol; glycerine; 1,2,6-hexane triol; 1,2,4-butane triol; trimethylolethane; pentaerythritol; quinitol; mannitol; sorbitol; methyl glycoside; diethylene glycol; triethylene glycol; tetraethylene glycol; dipropylene glycol; dibutylene glycol; or a combination of two or more thereof.

In some embodiments, low cross-linking (i.e., ≤5%) of the bio-based polymer leads to faster degradation compared to a bio-based polymer with high cross-linking (i.e., >5%). In some embodiments, high cross-linking of the bio-based polymer leads to slower degradation compared to a bio-based polymer with low cross-linking (i.e., ≤5%).

In some embodiments, the rate-regulating compound comprises a mineral, a salt, a vitamin, or a combination of two or more thereof. In some embodiments, the mineral is selected from the group consisting of nitrogen, potassium, phosphate, iron, calcium, sulfur, magnesium, cobalt, zinc, and a combination of two or more thereof. In some embodiments, the salt is selected from $CaCl_2$), $Na_2HPO_4$, $KH_2PO_4$, NaCl, $NH_4Cl$, $MgSO_4$, and a combination of two or more thereof. In some embodiments, the salt is selected from the group consisting of $CaCl_2$), $Na_2HPO_4$, $KH_2PO_4$, NaCl, $NH_4Cl$, $MgSO_4$, $NaNO_3$, $NaH_2PO_4$, $FeCl_3$, and a combination of two or more thereof. In some embodiments, the salt is selected from the group consisting of $NaNO_3$, $NaH_2PO_4$, $FeCl_3$, and a combination of two or more thereof. In some embodiments, the vitamin is selected from p-aminobenzoic acid (PABA), folic acid, biotin, lipoic acid, mercaptoethanesulfonic acid, nicotinic acid, pantothenic acid, pyridoxine (B6), riboflavin (B2), thiamine (B1), vitamin B12, or vitamin K, or a combination of two or more thereof.

In some embodiments, the rate-regulating compound comprises a cell-opener. In some embodiments, the cell-opener is selected from VORANOL™ CP1421 polyol (polyether polyol), VORANOL™ 4053 polyol (polyether polyol), GORAPUR® IMR 852 (silicone-based), TEGOSTAB® B8948, NIAX™ L-1507 (non-hydrolyzable silicone surfactant), NIAX™ L-6164 (non-hydrolyzable silicone copolymer surfactant), NIAX™ L-6186 (non-hydrolyzable silicone copolymer surfactant), and NIAX™ L-6189 (organosilicone copolymer surfactant).

In some embodiments, the bio-based polymer product further comprises an outer surface layer. In some embodiments, the outer surface layer is comprised of the same polymer as the bio-based polymer.

In some embodiments, the incubation is performed in an aqueous solution. In some embodiments, the aqueous solution is sea water or salt water. In some embodiments, the aqueous solution lacks a carbon source.

In some embodiments, the acid is selected from hydrochloric acid, nitric acid, sulfuric acid, hydrobromic acid, hydroiodic acid, or perchloric acid, or a combination of two or more thereof.

In some embodiments, the base is selected from lithium hydroxide, sodium hydroxide, potassium hydroxide, calcium hydroxide, strontium hydroxide, or barium hydroxide, or a combination of two or more thereof.

In some embodiments, the first microorganism is selected from a bacterium or a fungus. In some embodiments, the bacterium is selected from the genus *Chryseobacterium, Ochrobactrum, Paenarthrobacter, Pandoraea, Pseudomonas, Rhizobium, Stenotrophomonas, Alteromonas, Marinobacter, Achromobacter, Brucella*, and *Bacillus*. In some embodiments, the bacterium is selected from the genus *Chryseobacterium*. In some embodiments, the bacterium is selected from the genus *Ochrobactrum*. In some embodiments, the bacterium is selected from the genus *Paenarthrobacter*. In some embodiments, the bacterium is selected from the genus *Pandoraea*. In some embodiments, the bacterium is selected from the genus *Pseudomonas*. In some embodiments, the bacterium is selected from the genus *Rhizobium*. In some embodiments, the bacterium is selected from the genus *Stenotrophomonas*. In some embodiments, the bacterium is selected from the genus *Alteromonas*. In some embodiments, the bacterium is selected from the genus *Marinobacter*. In some embodiments, the bacterium is selected from the genus *Achromobacter*. In some embodiments, the bacterium is selected from the genus *Brucella*. In some embodiments, the bacterium is selected from the genus *Bacillus*.

In some embodiments, the first microorganism is selected from the group consisting of *Paenarthrobacter nicotinovorans, Pseudomonas oceani, Pseudomonas aeruginosa, Alteromonas marina, Bacillus subtilis, Brucella melitensis*, and *Aspergillus fumigatus*. In some embodiments, the first microorganism is *Paenarthrobacter nicotinovorans*. In some embodiments, the first microorganism is *Pseudomonas oceani*. In some embodiments, the first microorganism is *Pseudomonas aeruginosa*. In some embodiments, the first microorganism is *Alteromonas marina*. In some embodiments, the first microorganism is *Bacillus subtilis*. In some embodiments, the first microorganism is *Brucella melitensis*. In some embodiments, the first microorganism is *Aspergillus fumigatus*.

In some embodiments, the first microorganism expresses at least one enzyme that degrades the bio-based polymer to the subunits, wherein the at least one enzyme comprises a serine hydrolase, a lipase, an esterase, or a combination of two or more thereof. In some embodiments, the at least one enzyme comprises a serine hydrolase. In some embodiments, the at least one enzyme comprises a lipase. In some embodiments, the at least one enzyme comprises an esterase.

In some embodiments, the first microorganism expresses at least one enzyme that degrades the bio-based polymer to the subunits, wherein the at least one enzyme comprises LipA or CE1, or both. In some embodiments, the at least one enzyme comprises LipA. In some embodiments, the at least one enzyme comprises CE1.

In some embodiments, the incubation further comprises 1, 2, 3, or 4 additional microorganisms. In some embodiments, a rate of degradation of the bio-based polymer product is accelerated in the presence of the additional microorganisms.

In some embodiments, at least one of the first microorganism or the additional microorganisms metabolizes methylenedianiline (MDA).

In some embodiments, each of the additional microorganisms expresses at least one enzyme that degrades the bio-based polymer to the subunits, wherein the at least one enzyme comprises a serine hydrolase, a lipase, an esterase, or a combination of two or more thereof. In some embodiments, each of the additional microorganisms expresses at least one enzyme that degrades the bio-based polymer to the subunits, wherein the at least one enzyme comprises LipA or CE1, or both.

In some embodiments, the LipA is full-length enzyme or is a functional fragment. In some embodiments, the LipA is a modified LipA, comprising one or more substitutions. In some embodiments, the modified LipA comprises a valine to leucine substitution. In some embodiments, the LipA comprises at least 80%, 85%, 90%, 95%, 96%, 96%, 97%, 98%, 99%, or 100% sequence identity to SEQ ID NO: 1.

In some embodiments, the CE1 is full-length enzyme or is a functional fragment. In some embodiments, the CE1 is a modified CE1, comprising one or more substitutions. In some embodiments, the modified CE1 comprises a valine to isoleucine substitution. In some embodiments, the CE1 comprises at least 80%, 85%, 90%, 95%, 96%, 96%, 97%, 98%, 99%, or 100% sequence identity to SEQ ID NO: 2.

In some embodiments, the incubation results in about 5% to about 100% degradation of the bio-based polymer to subunits. In some embodiments, the incubation results in about 5%, 10%, 20%, 30%, 40%, 50%, 60%, 70%, 80%, 90%, 95%, or 100% degradation of the bio-based polymer to subunits. In some embodiments, the incubation results in about 5%, 10%, 20%, 30%, 40%, 50%, 60%, 70%, 80%, 90%, 95%, or 100% degradation of the bio-based polymer to subunits after at least 12 weeks. This includes a time period of 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, or 52 weeks, including increments therein. In some embodiments, about 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%, including increments therein, degradation occurs. In some embodiments, the incubation is performed at a temperature from about 22° C. to about 32° C. This includes ranges of temperature of from about 22° C. to about 30° C., from about 22° C. to about 28° C., from about 23° C. to about 30° C., from about 23° C. to about 28° C., from about 24° C. to about 30° C., from about 24° C. to about 28° C., from about 25° C. to about 30° C., from about 25° C. to about 28° C., from about 26° C. to about 30° C., and from about 26° C. to about 28° C. In some embodiments, the temperature is about 22° C., about 23° C., about 24° C., about 25° C., about 26° C., about 27° C., about 28° C., about 29° C., about 30° C., about 31° C., or about 32° C. In some embodiments, the incubation is performed at a humidity of about 50%, 60%, 70%, 80%, 90%, 91%, 92%, 93%, 94%, 95%, 96%, 97%, 98%, or 99%. In some embodiments, about 5%, 10%, 20%, 30%, 40%, 50%, 60%, 70%, 80%, 90%, 95%, or 100% degradation of the bio-based polymer into subunits occurs after incubation for at least 12 weeks at a temperature from about 22° C. to about 32° C. and at a humidity of about 50%, 60%, 70%, 80%, 90%, or 95%.

In some embodiments, the subunits comprise a polyol, a di-carboxylic acid, a diol, or a combination of two or more thereof. In some embodiments, the di-carboxylic acid is independently selected from the group consisting of oxalic acid, malonic acid, succinic acid, glutaric acid, adipic acid, pimelic acid, suberic acid, azelaic acid, and sebacic acid. In some embodiments, the diol is independently selected from the group consisting of ethylene glycol; 1,2 propanediol; 1,3-propanediol; glycerol; 1,3-butanediol; 1,4-butanediol; 2-methyl-1,3-propanediol; 2,3-butanediol; trimethylolpropane; 1,5-pentanediol; 1,6-hexanediol; 3-methyl-1,5-pentanediol; 1,7-heptanediol; 1,8-octanediol; 1,9-nonanediol; and 1,10-decanediol.

Methods of Recycling the Bio-Based Polymer Product

In another aspect, disclosed herein are methods of recycling a bio-based polymer product, the method comprising:
- incubating a bio-based polymer product, wherein the bio-based polymer product comprises a bio-based polymer, under a condition to generate a mixture of subunits from depolymerization of the bio-based polymer;
- purifying the mixture to obtain one or more isolated subunits; and
- synthesizing a pre-polymer comprising at least one of the one or more isolated subunits.

In some embodiments, the bio-based polymer is a polyurethane. In some embodiments, the polyurethane is a polymerization product of one or more linear aliphatic polyester polyols, and a diisocyanate. In some embodiments, one or more linear aliphatic polyester polyols are produced from one or more biologically sourced diols and one or more biologically sourced di-carboxylic acids. In some embodiments, the one or more biologically sourced diols, the one or more biologically sourced di-carboxylic acids, or a combination thereof are derived from algae.

In some embodiments, the one or more biologically sourced diols or the one or more biologically sourced di-carboxylic acids are non-branched. In some embodiments, the one or more biologically sourced diols and the one or more biologically sourced di-carboxylic acids are non-branched. In some embodiments, the one or more biologically sourced diols and the one or more biologically sourced di-carboxylic acids are branched. In some embodiments, the branched one or more biologically sourced diols are selected from 1,2-propanediol; 2-methyl-1,3-propanediol; 2,2-dimethyl-1,3-propanediol; 1,2-butanediol; 1,3-butanediol; 2,3-butanediol; 3-methyl-1,5-pentanediol; and 2-methyl-2,4-pentanediol, or a combination of two or more thereof.

In some embodiments, the one or more biologically sourced diols and the one or more biologically sourced di-carboxylic acids have a carbon chain length of 2-10 carbons. In some embodiments, the one or more biologically sourced diols or the one or more biologically sourced di-carboxylic acids have a carbon chain length of 2-4 carbons. In some embodiments, the one or more biologically sourced diols and the one or more biologically sourced di-carboxylic acids have a carbon chain length of 2-4 carbons. In some embodiments, the one or more biologically sourced diols and the one or more biologically sourced di-carboxylic acids have a carbon chain length of 5-20 carbons. In some embodiments, the one or more biologically sourced di-carboxylic acids are selected from glutaric acid, adipic acid, pimelic acid, suberic acid, azelaic acid, sebacic acid, dodecanedioic acid, and octadecanedioic acid, or a combination of two or more thereof.

In some embodiments, the mixture of subunits comprises a di-carboxylic acid and diol.

In some embodiments, the one or more isolated subunits comprises a di-carboxylic acid. In some embodiments, the one or more isolated subunits comprises a diol.

In some embodiments, the pre-polymer is synthesized from two isolated subunits, each of which has a different chemical structure. In some embodiments, the two isolated subunits comprise a diol and a di-carboxylic acid.

In some embodiments, the di-carboxylic acid is selected from the group consisting of oxalic acid, malonic acid, succinic acid, glutaric acid, adipic acid, pimelic acid, suberic acid, azelaic acid, and sebacic acid.

In some embodiments, the diol is selected from the group consisting of ethylene glycol; 1,2 propanediol; 1,3-propanediol; glycerol; 1,3-butanediol; 1,4-butanediol; 2-methyl-1,3-propanediol; 2,3-butanediol; trimethylolpropane; 1,5-pentanediol; 1,6-hexanediol; 3-methyl-1,5-pentanediol; 1,7-heptanediol; 1,8-octanediol; 1,9-nonanediol; and 1,10-decanediol.

In some embodiments, the bio-based polymer product comprises cross-linked components.

In some embodiments, the bio-based polymer product comprises a polyurethane foam. In some embodiments, the polyurethane foam comprises an open cell foam. In some embodiments, the polyurethane foam comprises a closed cell foam. In some embodiments, the foam has a density of 0.05 g/cc to 0.75 g/cc as measured by ASTM D796; a hardness of 20 Asker C units to 80 Asker C units as measured by ASTM D2240; a tensile of 0.5 MPa to 5 MPa as measured by ASTM D412; elongation of 50% to 900% as measured by ASTM D2209 and ASTM D2211; Die C Tear values of 2 N/mm to 20 N/mm as measured by ASTM D624; Split Tear values of 0.5 N/mm to 3 N/mm as measured by ASTM D3574; compression of 5% to 20% as measured by ASTM 3574; and resilience of 10% to 60% as measured by DIN 53512.

In some embodiments, the foam has a density of about 0.05 g/L to about 0.75 g/L. In some embodiments, the foam has a density of about 0.075 g/L to about 0.6 g/L. In some embodiments, the foam has a density of about 0.075 g/L to about 0.3 g/L. In some embodiments, the foam has a density of about 0.45 g/L to about 0.6 g/L.

In some embodiments, the bio-based polymer product comprises a thermal plastic polyurethane (TPU). In some embodiments, the bio-based polymer product comprises an adhesive.

In some embodiments, the bio-based polymer product is comprised in a shoe, an insole, or a midsole.

In some embodiments, the method further comprises synthesizing a polymer from the pre-polymer. In some embodiments, the polymer is a polyurethane, a polyester, or a polyester polyurethane. In some embodiments, the synthesizing does not utilize any petroleum-based components. In some embodiments, the polymer is a polyurethane in a form of a foam having commercial specifications for use in the manufacture of footbeds and midsoles comprising a density of 0.05 g/cc to 0.75 g/cc as measured by ASTM D796; a hardness of 20 Asker C units to 80 Asker C units as measured by ASTM D2240; a tensile of 0.5 MPa to 5 MPa as measured by ASTM D412; elongation of 50% to 900% as measured by ASTM D2209 and ASTM D2211; Die C Tear values of 2 N/mm to 20 N/mm as measured by ASTM D624; Split Tear values of 0.5 N/mm to 3 N/mm as measured by ASTM D3574; compression of 5% to 20% as measured by ASTM 3574; and resilience of 10% to 60% as measured by DIN 53512. In some embodiments, the foam has a density of about 0.05 g/L to about 0.75 g/L. In some embodiments, the foam has a density of about 0.075 g/L to about 0.6 g/L. In some embodiments, the foam has a density of about 0.075 g/L to about 0.3 g/L. In some embodiments, the foam has a density of about 0.45 g/L to about 0.6 g/L.

In some embodiments, the polyurethane is in the form of a thermal plastic polyurethane (TPU).

In some embodiments, the polyurethane is in the form of an adhesive. In some embodiments, the adhesive is prepared from a polyol selected from polycaprolactone and poly(ethyl-azelate), and poly(ethyl-co-propyl-azelate), or a combination of two or more thereof; one or more selected from propanediol, ethylene glycol, dimethylolpropionic acid, and ethylenediamine (EDA); and one or more diisocyanates selected from hexamethylene diisocyanate (HDI), heptamethylene diisocyanate (HpDI), toluene diisocyanate (TDI), and isophorone diisocyanate (IPDI).

In some embodiments, the condition to generate a mixture of subunits from degradation of the bio-based polymer results in about 5% to about 100% degradation of the bio-based polymer to subunits. In some embodiments, the condition to generate a mixture of subunits from degradation of the bio-based polymer results in about 5%, 10%, 20%, 30%, 40%, 50%, 60%, 70%, 80%, 90%, 95%, or 100% degradation of the bio-based polymer to subunits. In some embodiments, the condition to generate a mixture of subunits from degradation of the bio-based polymer results in at least about 5%, 10%, 20%, 30%, 40%, 50%, 60%, 70%, 80%, 90%, 95%, or 100% degradation of the bio-based polymer to subunits.

In some embodiments, the condition comprises the inclusion of one or more independently selected from an acid, a base, a microorganism, and an enzyme.

In some embodiments, the acid is selected from hydrochloric acid, nitric acid, sulfuric acid, hydrobromic acid, hydroiodic acid, or perchloric acid, or a combination of two or more thereof.

In some embodiments, the base is selected from lithium hydroxide, sodium hydroxide, potassium hydroxide, calcium hydroxide, strontium hydroxide, or barium hydroxide, or a combination of two or more thereof.

In some embodiments, the enzyme is isolated from a microorganism found in soil, compost, or seawater.

In some embodiments, the microorganism is selected from a bacterium or a fungus. In some embodiments, the bacterium is selected from the genus *Chryseobacterium, Ochrobactrum, Paenarthrobacter, Pandoraea, Pseudomonas, Rhizobium, Stenotrophomonas, Alteromonas, Marinobacter, Achromobacter, Brucella*, or *Bacillus.*

In some embodiments, the enzyme is a serine hydrolase, a lipase, an esterase or a combination thereof.

In some embodiments, the enzyme is derived from an organism selected from the genus of *Chryseobacterium, Cladosporim, Ochrobactrum, Paenarthrobacter, Pandoraea, Pseudomonas, Rhizobium, Stenotrophomonas, Alteromonas, Marinobacter, Achromobacter, Brucella*, or *Bacillus.*

In some embodiments, the enzyme is derived from an organism selected from *Paenarthrobacter nicotinovorans, Pseudomonas oceani, Pseudomonas aeruginosa, Alteromonas marina, Bacillus subtilis, Brucella melitensis, Aspergillus fumigatus.*

In some embodiments, the enzyme is a serine hydrolase, a lipase, an esterase or a combination of two or more thereof. In some embodiments, the enzyme is a serine hydrolase. In some embodiments, the enzyme is a lipase. In some embodiments, the enzyme is an esterase.

In some embodiments, the enzyme comprises LipA or CE1, or both. In some embodiments, the enzyme comprises LipA. In some embodiments, the enzyme comprises CE1.

In some embodiments, the LipA is full-length enzyme or is a functional fragment. In some embodiments, the LipA is a modified LipA, comprising one or more substitutions. In some embodiments, the modified LipA comprises a valine to leucine substitution. In some embodiments, LipA comprises at least 80%, 85%, 90%, 95%, 96%, 96%, 97%, 98%, 99%, or 100% sequence identity to SEQ ID NO: 1.

In some embodiments, the CE1 is full-length enzyme or is a functional fragment. In some embodiments, the CE1 is a modified CE1, comprising one or more substitutions. In some embodiments, the modified CE1 comprises a valine to isoleucine substitution. In some embodiments, the CE1 comprises at least 80%, 85%, 90%, 95%, 96%, 96%, 97%, 98%, 99%, or 100% sequence identity to SEQ ID NO: 2.

In some embodiments, the bio-based polymer is prepared from algae-derived material.

In some embodiments, the bio-based polymer product further comprises a rate-regulating compound, wherein the rate-regulating compound accelerates degradation of the bio-based polymer compared to degradation of the bio-based polymer in the absence of the rate-regulating compound. In some embodiments, the bio-based polymer product further comprises a rate-regulating compound, wherein the rate-regulating compound decelerates degradation of the bio-based polymer compared to degradation of the bio-based polymer in the absence of the rate-regulating compound.

In some embodiments, the rate-regulating compound is present in the bio-based polymer product in an amount of about 0.1% w/w to about 5% w/w. This includes an amount of about 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, and 5.0% w/w, including increments therein.

In some embodiments, low cross-linking (i.e., ≤5%) of the bio-based polymer leads to faster degradation compared to a bio-based polymer with high cross-linking (i.e., >5%). In some embodiments, high cross-linking of the bio-based polymer leads to slower degradation compared to a bio-based polymer with low cross-linking (i.e., ≤5%).

In some embodiments, the rate-regulating compound is a cross-linker or a chain extender additive.

In some embodiments, the cross-linker is selected from a $C_2$-$C_{12}$ diol, glycerol, trimethylolpropane, pentaerythritol, and a combination of two or more thereof.

In some embodiments, the chain extender additive is selected from trimethylolpropane; ethylene glycol; 1,2- and 1,3-propylene glycol; 1,4- and 2,3-butane diol; 1,6-hexane diol; 1,8-octane diol; neopentyl glycol; cyclohexane dimethanol; 2-methyl-1,3-propane diol; glycerine; 1,2,6-hexane triol; 1,2,4-butane triol; trimethylolethane; pentaerythritol; quinitol; mannitol; sorbitol; methyl glycoside; diethyleneglycol; triethylene glycol; tetraethylene glycol; dipropylene glycol; dibutylene glycol; or a combination of two or more thereof.

In some embodiments, the rate-regulating compound comprises a mineral, a salt, a vitamin, or a combination of two or more thereof.

In some embodiments, the mineral is selected from the group consisting of nitrogen, potassium, phosphate, iron, calcium, sulfur, magnesium, cobalt, zinc, and a combination of two or more thereof.

In some embodiments, the salt is selected from $CaCl_2$), $Na_2HPO_4$, $KH_2PO_4$, NaCl, $NH_4Cl$, or $MgSO_4$, or a combination of two or more thereof. In some embodiments, the salt is selected from $CaCl_2$), $Na_2HPO_4$, $KH_2PO_4$, NaCl, $NH_4Cl$, $MgSO_4$, $NaNO_3$, $NaH_2PO_4$, $FeCl_3$, or a combination of two or more thereof. In some embodiments, the salt is selected from $NaNO_3$, $NaH_2PO_4$, $FeCl_3$, or a combination of two or more thereof.

In some embodiments, the vitamin is selected from selected from p-aminobenzoic acid (PABA), folic acid, biotin, lipoic acid, mercaptoethane-sulfonic acid, nicotinic acid, pantothenic acid, pyridoxine (B6), riboflavin (B2), thiamine (B1), vitamin B12, or vitamin K, or a combination of two or more thereof.

In some embodiments, the rate-regulating compound comprises a cell-opener. In some embodiments, the cell-opener is selected from VORANOL™ CP1421 polyol (polyether polyol), VORANOL™ 4053 polyol (polyether polyol), GORAPUR® IMR 852 (silicone-based), TEGOSTAB® B8948, NIAX™ L-1507 (non-hydrolyzable silicone surfactant), NIAX™ L-6164 (non-hydrolyzable silicone copolymer surfactant), NIAX™ L-6186 (non-hydrolyzable silicone copolymer surfactant), and NIAX™ L-6189 (organosilicone copolymer surfactant).

In some embodiments, the incubating step is performed in an aqueous solution. In some embodiments, the aqueous solution is sea water or salt water. In some embodiments, the aqueous solution lacks a carbon source.

In some embodiments, the incubating is performed at a temperature from about 22° C. to about 32° C. This includes a temperature from about 22° C. to about 30° C., from about 22° C. to about 28° C., from about 23° C. to about 30° C., from about 23° C. to about 28° C., from about 24° C. to about 30° C., from about 24° C. to about 28° C., from about 25° C. to about 30° C., from about 25° C. to about 28° C., from about 26° C. to about 30° C., or from about 26° C. to about 28° C. In some embodiments, the incubating is performed at a temperature of about 22° C., about 23° C., about 24° C., about 25° C., about 26° C., about 27° C., about 28° C., about 29° C., about 30° C., about 31° C., or about 32° C.

In some embodiments, the incubating is performed at a humidity of about 50%, 60%, 70%, 80%, 90%, or 95%. In some embodiments, the incubating is performed at a humidity of about 50%, 60%, 70%, 80%, 90%, 91%, 92%, 93%, 94%, 95%, 96%, 97%, 98%, or 99%.

In some embodiments, the incubating is performed for at least 12 weeks. This includes a time period of 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, or 52 weeks, including increments therein.

In some embodiments, the incubating is performed for at least 12 weeks at a temperature from about 22° C. to about 32° C. and at a humidity of about 50%, 60%, 70%, 80%, 90%, or 95%. In some embodiments, the incubating is performed for 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, or 52 weeks at a temperature from about 22° C. to about 32° C. and at a humidity of about 50%, 60%, 70%, 80%, 90%, or 95%.

In some embodiments, the condition to generate a mixture of subunits from degradation of the bio-based polymer results in at least about 5%, 10%, 20%, 30%, 40%, 50%, 60%, 70%, 80%, 90%, 95%, or 100% degradation of the bio-based polymer to subunits, wherein the incubating is performed for at least 12 weeks at a temperature from about 22° C. to about 32° C. and at a humidity of about 50%, 60%, 70%, 80%, 90%, or 95%. In some embodiments, the condition to generate a mixture of subunits from degradation of the bio-based polymer results in at least about 5%, 10%, 20%, 30%, 40%, 50%, 60%, 70%, 80%, 90%, 95%, or 100% degradation of the bio-based polymer to subunits, wherein the incubating is performed for 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, or 52 weeks at a temperature from about 22° C. to about 32° C. and at a humidity of about 50%, 60%, 70%, 80%, 90%, or 95%.

In another aspect, disclosed herein are methods of recycling a bio-based polymer product, the method comprising:

incubating a bio-based polymer product, wherein the bio-based polymer product comprises a polyurethane, under a condition to generate a mixture of subunits from depolymerization of the polyurethane;

purifying the mixture to obtain one or more isolated subunits; and synthesizing a pre-polymer comprising at least one of the one or more isolated subunits;

wherein the polyurethane is a polymerization product of one or more linear aliphatic polyester polyols, and a diisocyanate; the one or more linear aliphatic polyester polyols are produced from one or more biologically sourced diols and one or more biologically sourced di-carboxylic acids; the one or more biologically sourced di-carboxylic acids, or a combination thereof are derived from algae; the condition comprises the inclusion of one or more independently selected from an acid, a base, a microorganism, and an enzyme; the incubating is performed for 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, or 52 weeks at a temperature from about 22° C. to about 32° C. and at a humidity of about 50%, 60%, 70%, 80%, 90%, or 95%; and the condition to generate a mixture of subunits from degradation of the bio-based polymer results in at least about 5%, 10%, 20%, 30%, 40%, 50%, 60%, 70%, 80%, 90%, 95%, or 100% degradation of the bio-based polymer to subunits.

Unless defined otherwise, all technical and scientific terms used herein have the same meaning as commonly understood by one of ordinary skill in the art to which this present technology belongs. Although any methods and materials similar or equivalent to those described herein can also be used in the practice or testing of the present technology, representative illustrative methods and materials are now described.

Where a range of values is provided, it is understood that each intervening value, to the tenth of the unit of the lower limit unless the context clearly dictates otherwise, between the upper and lower limit of that range and any other stated or intervening value in that stated range, is encompassed within the present technology. The upper and lower limits of these smaller ranges may independently be included in the smaller ranges and are also encompassed within the present technology, subject to any specifically excluded limit in the stated range. Where the stated range includes one or both of the limits, ranges excluding either or both of those included limits are also included in the present technology.

This disclosure is not limited to particular embodiments described, as such may, of course, vary. It is also to be understood that the terminology used herein is for the purpose of describing particular embodiments only, and is not intended to be limiting, since the scope of the present technology will be limited only by the appended claims.

As will be apparent to those of skill in the art upon reading this disclosure, each of the individual embodiments described and illustrated herein has discrete components and features which may be readily separated from or combined with the features of any of the other several embodiments without departing from the scope or spirit of the present technology. Any recited method can be carried out in the order of events recited or in any other order which is logically possible.

EXAMPLES

Example 1. General Synthesis of Polyester Polyurethane

To prepare a diol terminated polyester, a suitable di-carboxylic acid is reacted with a diol at a mole ratio of n di-carboxylic acid to (n+1) diol. The diol is selected from the group consisting of ethylene glycol; 1,2 propanediol; 1,3-propanediol; glycerol; 1,3-butanediol; 1,4-butanediol; 2-methyl-1,3-propanediol; 2,3-butanediol; trimethylolpropane; 1,5-pentanediol; 1,6-hexanediol; 3-methyl-1,5-pentanediol; 1,7-heptanediol; 1,8-octanediol; 1,9-nonanediol; and 1,10-decanediol, or any suitable molecular diol is used. The value of n is determined based upon the desired molecular weight. Briefly, the appropriate reagents are added to a reactor and heated to 120-140° C. with stirring, under adequate N2 flow to assist in the polycondensation. Then, a small amount of an esterification catalyst, such as those of the organotin family, is added (20-200 ppm). The temperature is slowly increased from 140° C. to approximately 200-230° C. to drive off as much water as possible, over the course of several hours. Additionally, vacuum is applied to assist in water removal. The total reaction time ranges from 16 to 80 hours, depending on the reactivity of the starting material.

Polyurethanes are then prepared from the aforementioned diol terminated polyester, and potentially (depending on formulation): water, surfactant, catalysts and extenders, creating the "B-side". This is then combined, by mechanical mixing, with a stoichiometric amount of isocyanate (A-side) to produce a reactive resin. Operating conditions range from room temperature to slightly elevated (40-60° C.), depending on the viscosity of the starting material. The reactive resin is poured into a mold, cast into a film, or cast as a slabstock feed, etc. Curing occurs at room temperature, or in an oven (40-60° C.).

Example 1A. Representative Foam Example

A foam was prepared as described in Example 1 using a polyol prepared from 1:1:1 of succinic acid, 1,4-butanediol, and 1,3-propanediol. Additional composition information is as follows:

| Component | Parts per hundred |
|---|---|
| Polyol | 100 |
| Surfactant | 1.0 |
| Tertiary amine catalysts | 0.2 |
| Delayed-action tertiary amine catalyst | 0.1 |
| water | 1.0 |
| MDI | 25-50 |

The surfactant was MAX' silicone L-1507, a non-hydrolyzable silicone surfactant. The tertiary amine catalysts were triethylenediamine and bis(2-dimethylaminoethyl)ether. The first five components were mixed in a high-speed mixer for 20 seconds at 2000 rpm to homogenize the materials, before mixing for another 5 seconds with MDI at 45° C. The mixture was cured in an oven for 20 minutes at 50° C. to produce the foam.

Example 1B. Representative Adhesive Example (PUD-004)

Acetone (100 mL), was charged into a 1000-mL reactor equipped with nitrogen inlet, mechanical stirrer, temperature probe, and condenser. A polyester polyol, made of azelaic acid and ethylene glycol, average molecular weight of 2240 (OH number 50) was vacuum dried at 60° C. Under stream of nitrogen, polyol (252 grams) and dimethylolpropionic acid (DMPA) (10 grams) was added into the reactor. Two drops of dibutyltin dilaurate catalyst were added and the mixture was mechanically stirred at 34° C. until a clear solution was obtained. Two isocyanate reactants, isophorone diisocyanate (IPDI) (48.8 grams), and hexamethylene diisocyanate (HDI) (18.9 grams) were added to the reactor under nitrogen. The mixture was stirred without heat until the exothermic reaction subsided. The mixture was then heated to 65° C. and stirred at this temperature for additional 4 hours. The solution was cooled to 35° C., acetone (200 mL) and triethylamine (6 grams) were added, and the stirring continued for 15 minutes. The chain extension was completed by addition of ethylenediamine (5.4 grams). The resulting viscous polymer solution was slowly dispersed in deionized water (550 mL) under vigorous stirring. The acetone was removed by vacuum distillation and 860 grams of waterborne polyurethane dispersion PUD-004 was obtained.

Example 1C. Polyols

Polyester polyols are synthesized via polycondensation, using a molar excess of diol relative to diacid. By reacting n moles of diacid with k moles of diol, where n<k, a difunctional, hydroxyl terminated polyol of desired molecular weight is achieved; the molecular weight increases and decreases with a respective decrease or increase in the value of k. Mixtures of more than one diol or dicarboxylic acid are optionally used. The following diols and dicarboxylic acids are used.

| # of Carbons | Diol | Dicarboxylic Acid |
|---|---|---|
| 2 | ethylene glycol | oxalic acid |
| 3 | 1,2 propanediol, 1,3-propanediol, glycerol | malonic acid |
| 4 | 1,3-butanediol, 1,4-butanediol, 2-methyl-1,3-propanediol, 2,3-butanediol, trimethylolpropane | succinic acid |
| 5 | 1,5-pentanediol, neopentyl glycol | glutaric acid |
| 6 | 1,6-hexanediol, 3-methyl-1,5-pentanediol | adipic acid, 2,5-furandicarboxyic acid |
| 7 | 1,7-heptanediol | pimelic acid, 3,3-dimethyl-1,2-cyclopropanedicarboxylic acid |
| 8 | 1,8-octanediol | suberic acid |
| 9 | 1,9-nonanediol | azelaic acid |
| 10 | 1,10-decanediol | sebacic acid |

Based on the protocol(s) described above, the following polyols were made:

- succinic acid, azaleic acid and 1,3-propanediol were polycondensed at a molar ratio of 0.69:0.23:1.00, and a polyol with an average molecular weight of 2,200 was obtained;
- succinic acid, 1,3-propanediol and 1,4-butanediol were polycondensed at a molar ratio of 0.91:0.67:0.33, and a polyol with an average molecular weight of 1,700 was obtained; and
- succinic acid, sebacic acid and 1,3-propanediol were polycondensed at a molar ratio of 0.67:0.22:1.0, and a polyol with an average molecular weight of 1,700 was obtained.

Diisocyanates used to prepare final polyurethanes with the above polyols included methylene diphenyl diisocyanate, toluene diisocyanate, hexamethylene diisocyanate, heptamethylene diisocyanate, or isophorone diisocyanate.

Example 2. Preparation of Algae-Based Polyurethane Foam and its Testing

Azelaic Polyol Foam Cube Properties

| Formula | Avg. Density ($kg/m^3$) | Avg. Hardness (Shore A) | Avg. Hysteresis (%) | Avg. Peak Force (N) |
|---|---|---|---|---|
| Photosynthetic PU foam | 297 ± 4 | 30 ± 3 | 51 ± 3 | 217 ± 17 |

Figure 2:
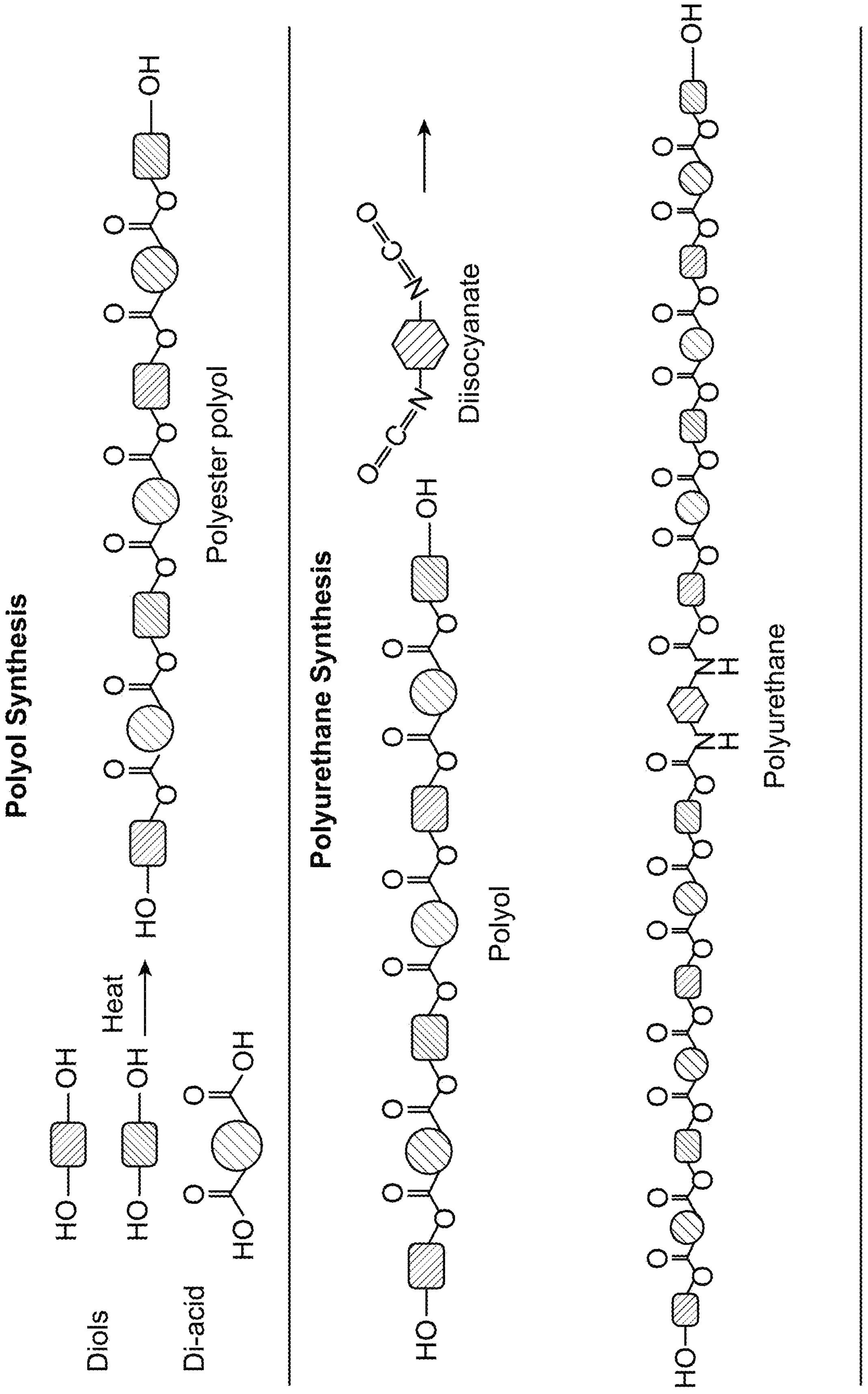
FIG. 2: Polyol and polyurethane (PU) synthesis diagrams.

Incubating Algae-Based Polyurethane Foam Cubes in Four Different Environmental Samples To identify if algae-based polyurethanes were susceptible to biodegradation, algae-based polyols were made and then converted into a polyurethane foam. Two diols (1,4-butanediol and 1,3-propanediol) and one di-carboxylic acid (succinic acid) were polymerized into a polyester polyol. 4,4 Methylene diphenyl diisocyanate (MDI) was then reacted with the polyol to produce a PU foam with only four basic components, facilitating identification of the breakdown products (see FIG. 2). Testing of the PU foam was carried out using testing paradigm depicted in FIG. 1.

To generate the foam, the polyol and MDI were stirred in a mixing cup at 2000 rpm in a DAC 600.1 Flacktek Speed Mixer, for 15 seconds and then poured into a 2 cm thick square mold (20 cm×20 cm) and cured in an oven at 50° C. for at least 2 h. The cured foam was cooled overnight, and individual 2-cm square cube samples were cut and used for subsequent degradation studies. Each cube was numbered and weighed so that changes could be tracked over time.

Triplicate sets cubes were subject to three different environments (soil, compost, and ocean water) and physical measurement (mass and force deflection) were taken at four different time points (0, 4, 8 and 12 weeks), along with control samples for background reference.

Figure 3:
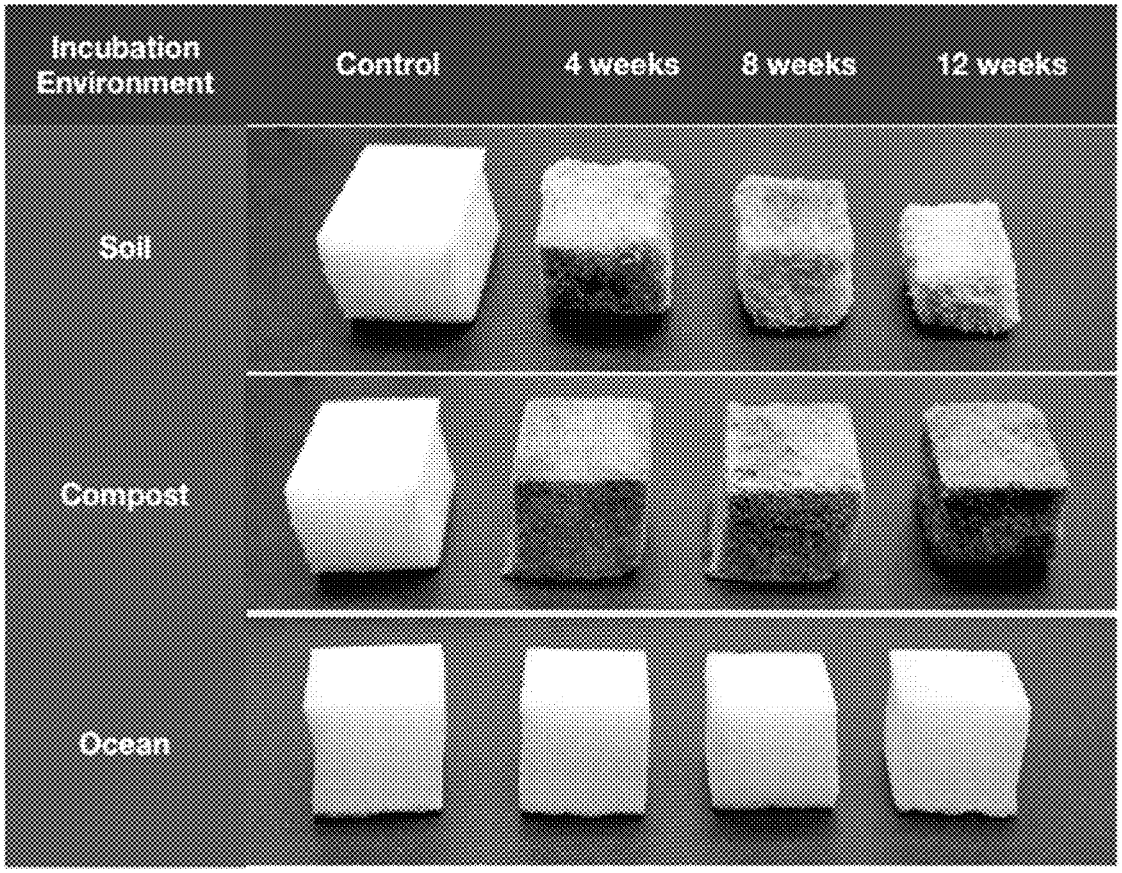
FIG. 3: Cubes incubated in different environments over 12 weeks: soil, compost, and ocean water.
Figure 4:
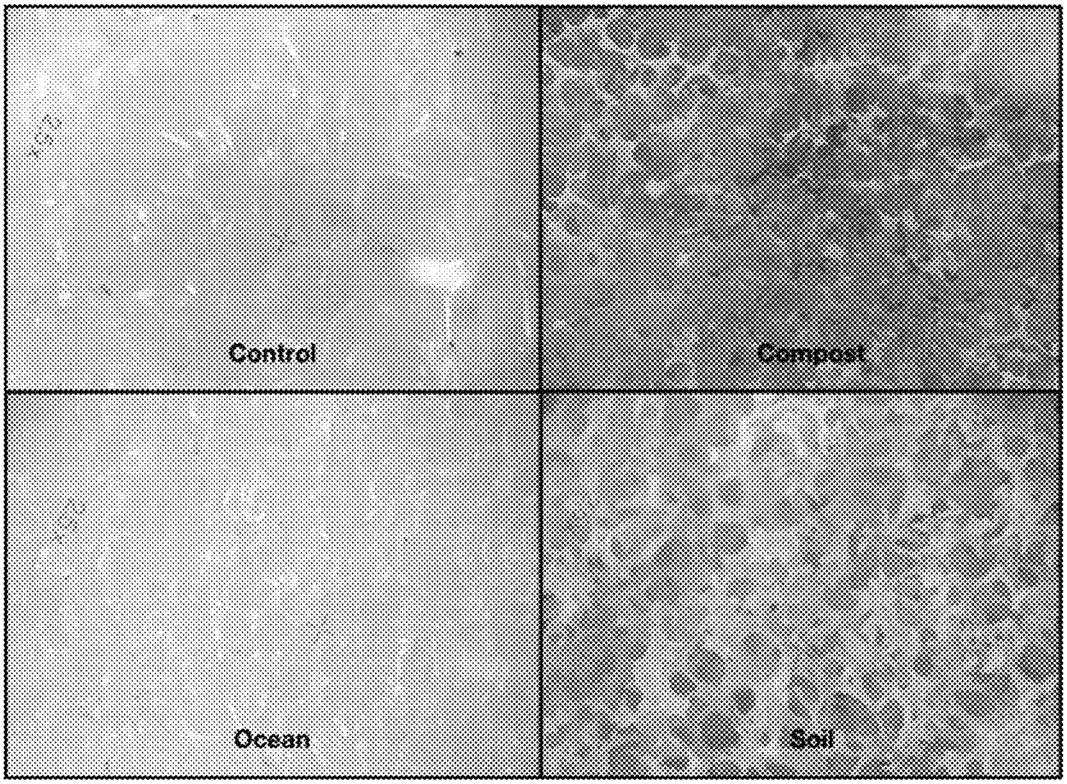
FIG. 4: Close-up image of the surface of PU after incubation in different environments, compared to a control—room temperature, not incubated in any environment. Image taken on a dissecting microscope at 2.5× magnification.

Twelve cubes (triplicate for four time points) were incubated in the three different environmental samples. Compost and soil samples were incubated at 30° C. under continuous high humidity, while ocean samples were incubated, shaking at room temperature. Samples were assayed for both microbiome content as well as physical properties of the foams at 0, 4, 8 and 12 weeks. Two of the environments, soil and home compost showed dramatic degradation of the foams as measure by mass, size, and physical properties including compression rebound, while the foams in simple ocean water showed much less degradation. Without being bound to any one theory, this may be due to the lack of available nutrients such as iron, nitrogen, or phosphates in the ocean water environment. A photo of the foam cubes over time is shown in FIG. 3. Magnified images of the foam after 12 weeks (FIG. 4) shows degradation of the cell walls and struts in the soil and compost samples compared to the control, resulting in shrinkage and more porous foam. The color also varied between the controls and incubated samples. It is important to note that while yellowing is a typical sign of PU degradation, some of the color difference may have come from substances in the environments themselves.

Isolating DNA from Microorganisms for Microbiome Sequence Analysis

The incubation of foam cubes in several environments allowed for the determination that the cubes were physically degrading and for the determination of the set of microorganisms associated with degrading foams in the different environments.

At 4, 8, and 12 weeks of environmental incubation, PU cubes were removed from all examined environments and cut into subsections. Subsections from the exterior surface of the cube and the interior of the cube were sectioned with a sterile disposable razor blade, and then further cut into approximately 2×2×1 mm sections. Following the Earth Microbiome DNA Extraction Protocol, DNA was extracted using the Qiagen MagAttract KingFisher PowerSoil DNA Kit (cat #: 27000-4-KF) with 0.15 grams to 0.20 grams starting material. In addition, baseline compost and soil material was prepared for DNA extraction using the same method. The DNA library was then prepared for Illumina sequencing following the Earth Microbiome Protocol for 16S (bacteria) and ITS (fungi) sequencing, using Promega Wizard SV Gel and PCR Clean-Up System (cat #: A9281) to clean the pool (Thompson et al., Nature, 2017, 551, 457-463). Next-Generation Sequencing was performed on the Illumina MiSeq system with 2×250 bp reads. The data was analyzed using the QIIME2 pipeline (Bolyen et al., Nature Biotechnology, 2019, 37: 852-857). The taxonomy databases, SILVA and UNITE, were used to classify reads for 16S (bacteria) and ITS (fungi), respectively (Quast et al., Nucl. Acids Res., 2013, 41 (D1): D590-D596; Nilsson et al., Nucl. Acids Res., 2018, 47 (D1):D259-D264.).

To identify the consortia of bacteria and fungi present on the compost and soil-incubated PU, 16S and ITS metagenomic sequencing was employed. Analysis of the compost and soil media showed the background biodiversity present with each sampling. Several bacteria families were enriched on the PU material from the background media. Here, the top 5 organisms refer to the 5 most abundant organisms found on the PU interior at 12 weeks. From compost, the top 5 bacterial families, Burkholderiaceae, Pseudomonadaceae, Acetobacteraceae, Caulobacteraceae and Chitonophagaceae made up 19.19% of the abundance in compost media, compared to 65.44% on the interior PU. From soil, the top 5 bacteria families Burkholderiaceae, Acetobacteraceae, Caluobacteraceae, Xanthobacteraceae and Rhizobiaceae made up 7.10% of the soil media, compared to 74.84% on the interior PU. Fungal organisms were slightly enriched on the PU material, although the top 5 fungi families were already heavily present in the background compost and soil media. In soil, Uncultured fungus, Eremomycetaceae, Trichocomaceae, Trichosporonaceae and Mortierellaceae made up 65.56% of the compost media and 96.08% of the interior PU. In compost, Uncultured fungus, Eremomycetaceae, Trichocomaceae, Trichosporonaceae and Aspergillaceae made up 82.60% of the soil media and 95.29% of the interior PU. The Uncultured fungus, which was heavily present in both compost and soil, had the closest similarity to Uncultured soil fungus with GenBank accession number JX489840.1 (Zhou et al., PloS one, 2012, 7, e48288-e48288).

Figure 5A:
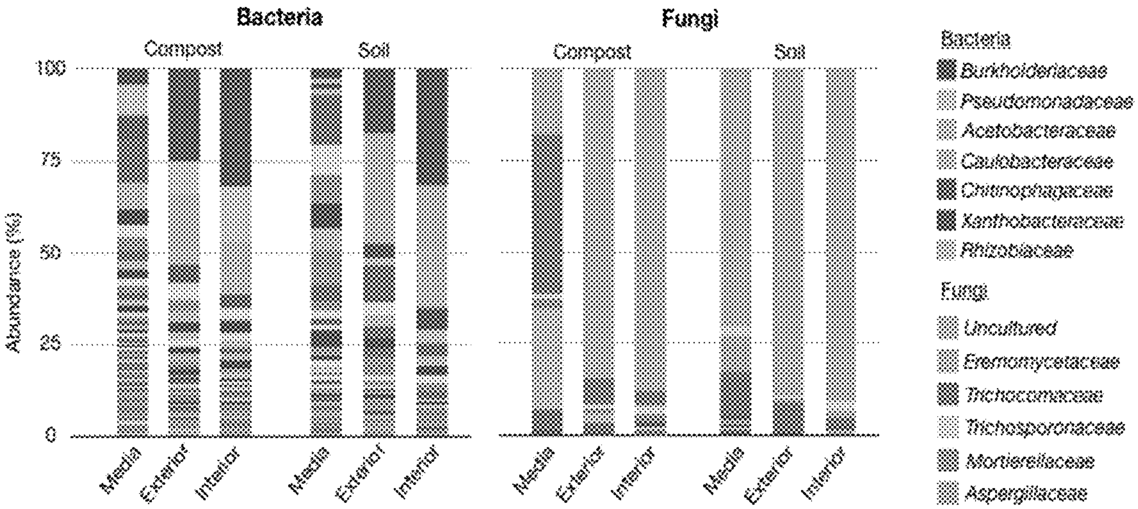
FIGS. 5A-5C: Bacterial and fungal abundance associated with biodegradation of PU in compost and soil.
Figure 5B:
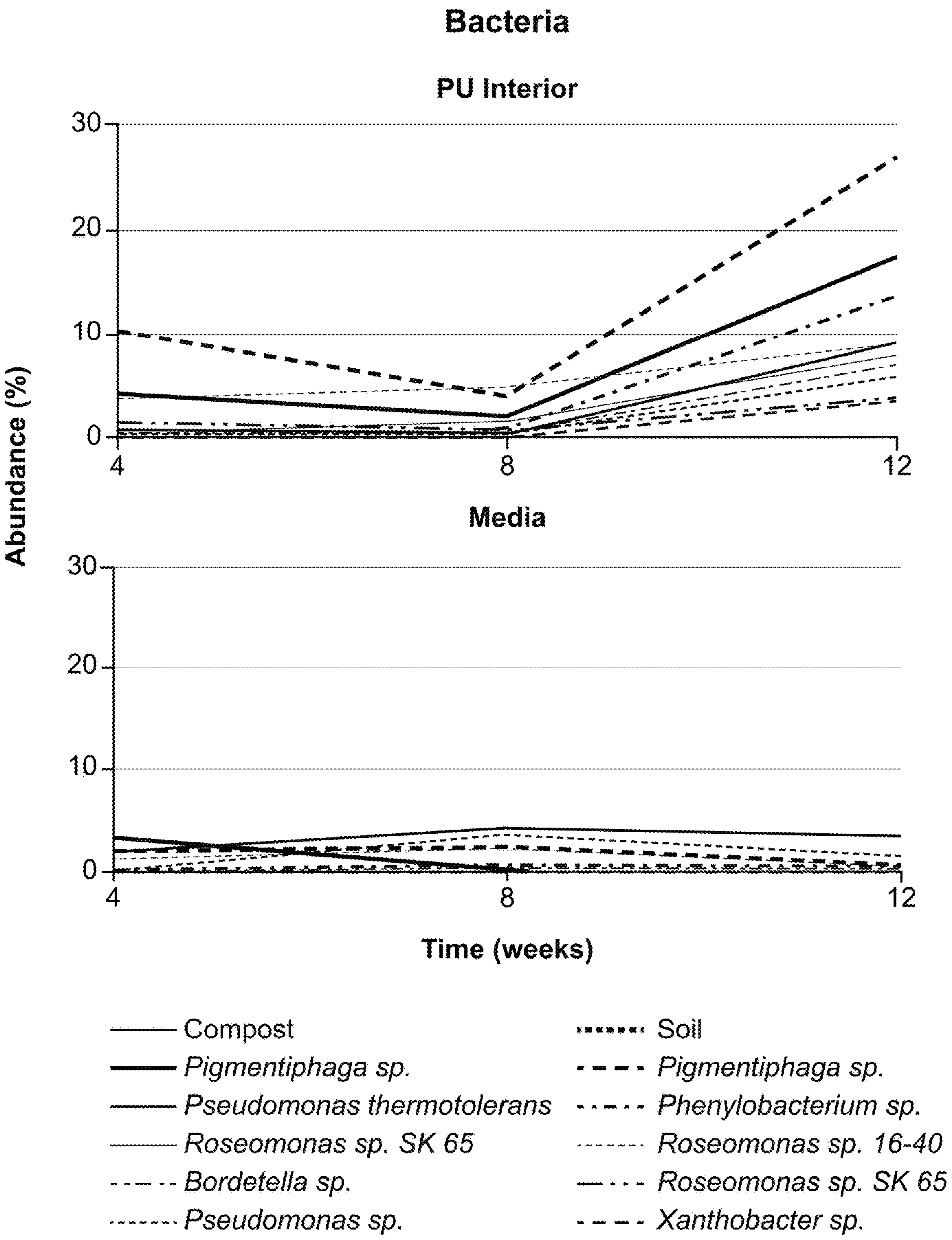
Figure 5C:
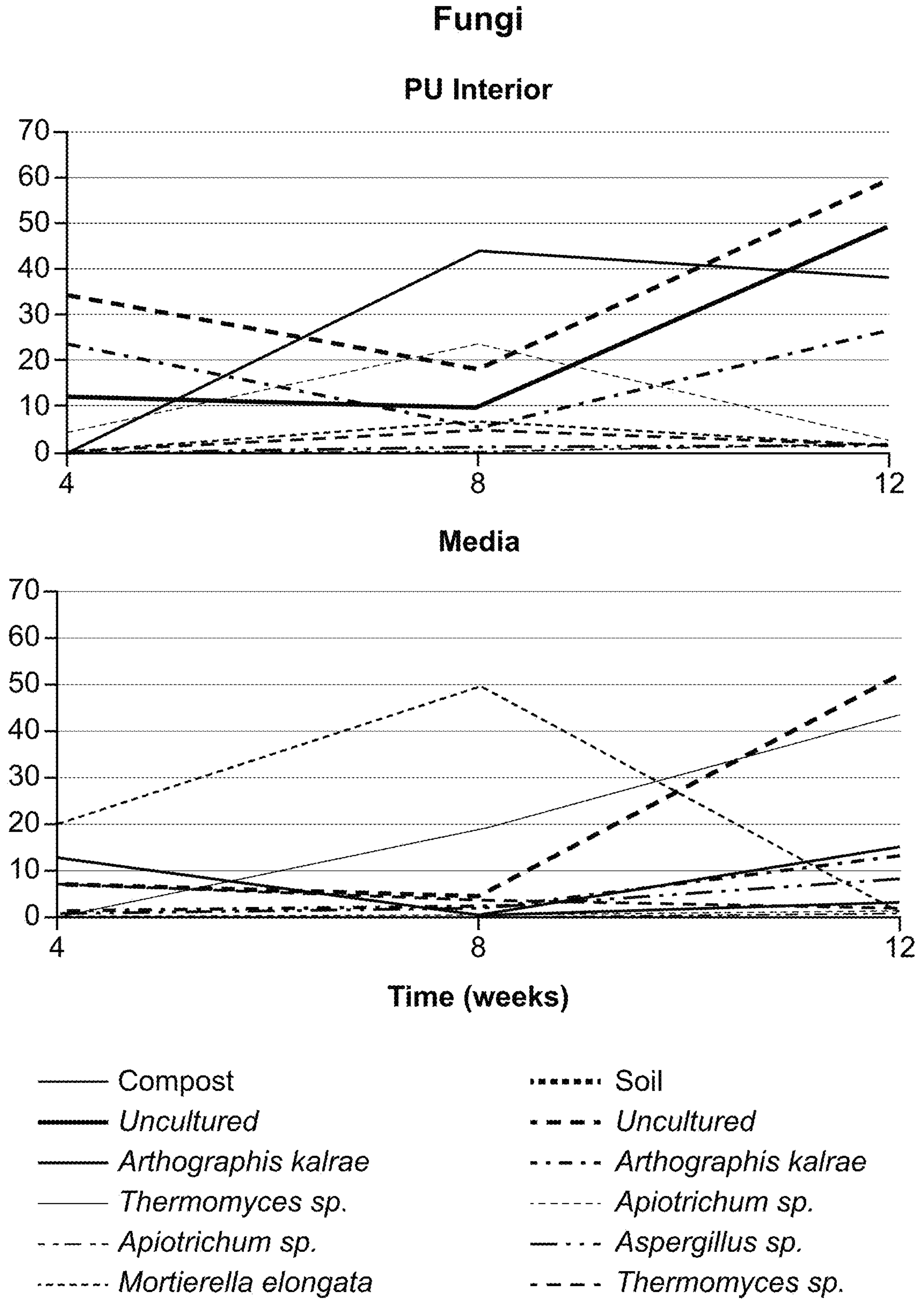

A time-based analysis of the top 5 organisms from FIG. 5A was also conducted at the species-level (FIG. 5B an FIG. 5C). The top 5 bacterial species from both compost and soil were found to increase in abundance on the PU interior over the course of 12 weeks, with pronounced growth from week 8 to 12, compared to relatively unchanging abundance in the media. For fungi, only a few species grew with greater abundance than in the media: Uncultured sp. and *Arthographis kalrae* in compost, and *Arthographis kalrae* in soil. There was a correlation between enrichment of bacteria on the PU interior and increased physical degradation (FIGS. 3, 9, & 10), while there was no clear correlation for fungi. This suggests that bacteria may have played a more significant role than fungi in the degradation process of the PU.

Identifying Polyurethane Breakdown Products Released During Degradation

Enzymatic Degradation of Bio-based Polyol: Eppendorf tubes containing 10 mg of the algae-based polyester polyols were washed with water to remove any soluble contaminants and then dried overnight in a desiccator to remove residual water. Four different commercially available enzymes known to cleave ester bonds were diluted to a concentration of 10 μg/mL in phosphate buffered solution (PBS) media and added to separate tubes in triplicate. *Bacillus subtilis* lipase, *Pseudomonas* sp. cholesterol esterase, *Aspergillus niger* esterase, and *Candida rugosa* esterase were purchased from Sigma-Aldrich. In addition, triplicates of tubes containing enzymes without polyol and polyol without enzymes were prepared as controls. The samples were shaken for 6 hours at 37° C., then frozen immediately to prevent further enzyme activity.IN Enzymatic Degradation of Bio-based Foam: As described above, the algae-based polyols and MDI were used to make relatively simple PU foams. These bio-based PU foams were frozen in liquid nitrogen and blended to create fine particulates, then autoclaved to ensure that they were free from contaminating microorganisms. The foam particles were pre-washed to remove any unreacted monomers, and then dried in a desiccator overnight. Foam (5 mg) was added to test tubes containing 1 ml of PBS, followed by 10 μg of enzymes. The samples were shaken for 24 hours at 37° C., after which they were frozen to prevent further enzyme activity.

MS Identification of Enzymatic Degradation Products: To identify the breakdown products from the polyol and foam samples, assessment was made using gas chromatography followed by mass spectrometry (GCMS). The polyol and foam degraded samples were thawed, and the enzyme was removed with 3 KDa Amicon Ultra 0.5 mL centrifugal filters spun for 10 minutes at 14,000 rpm. Filtrate (80 μL) was transferred to a 2 mL glass vial. 80 of a 5% ethylene glycol in isopropanol keeper solution was added to prevent evaporation of the analytes, and the vials were heated in an 85° C. oven for 30 minutes to remove water. 100 μL of ethyl acetate, 100 μL of di-n-propyl succinate internal standard, and 200 μL of n-trimethylsilyl-n-methyl trifluoroacetamide (MSTFA) were added to each vial, and the vials were shaken for 20 min.

Figure 6:
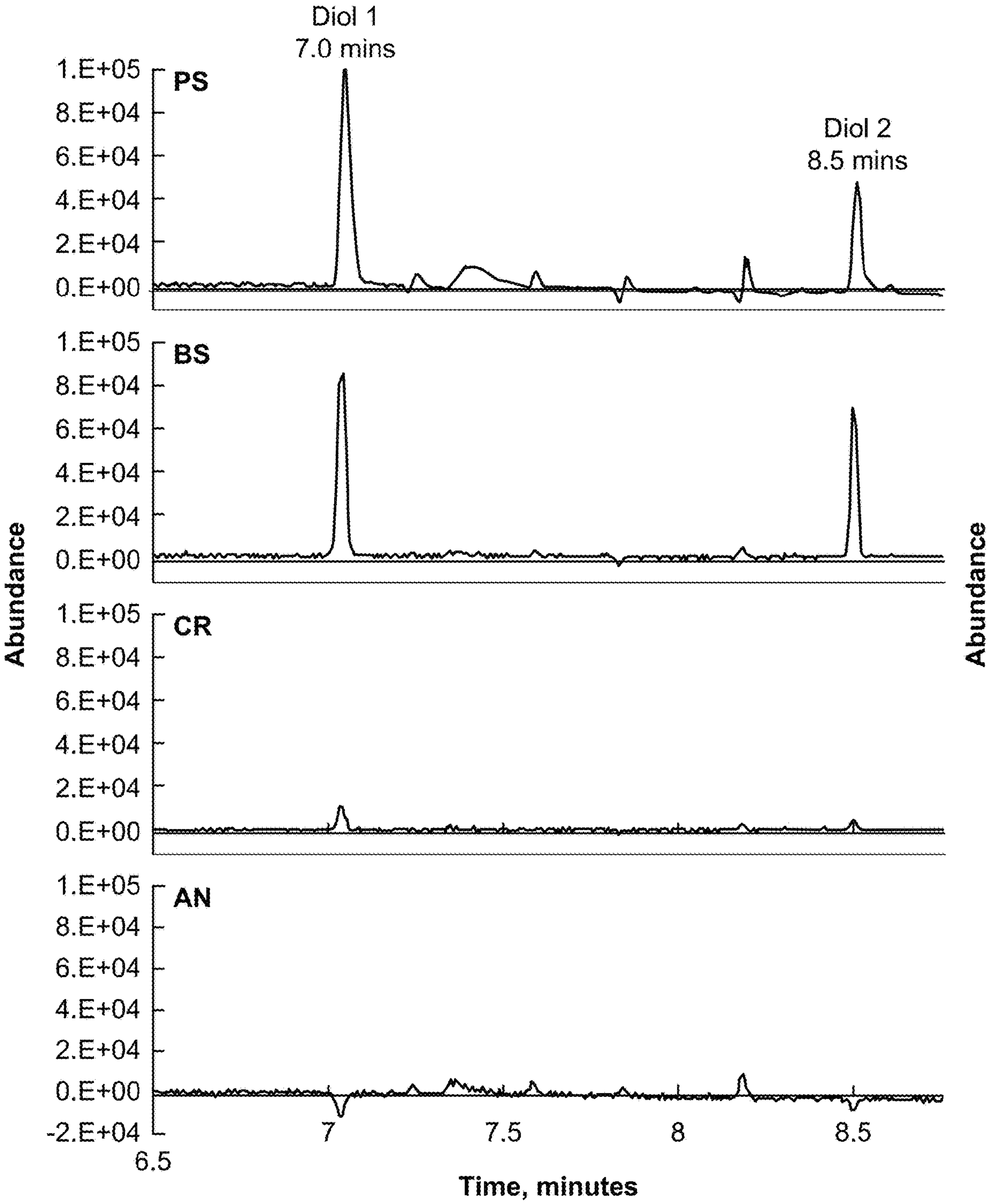
FIG. 6: GCMS chromatograms showing diols present from degradation of foam after 6 hours from four esterases/lipases. Triplicates of no-enzyme controls were averaged and subtracted from sample triplicates. PS—*Pseudomonas* sp. Cholesterol esterase, BS—*Bacillus subtilis* lipase, CR—*Candida rugosa* esterase, AN—*Aspergillus niger* esterase.
Figure 7:
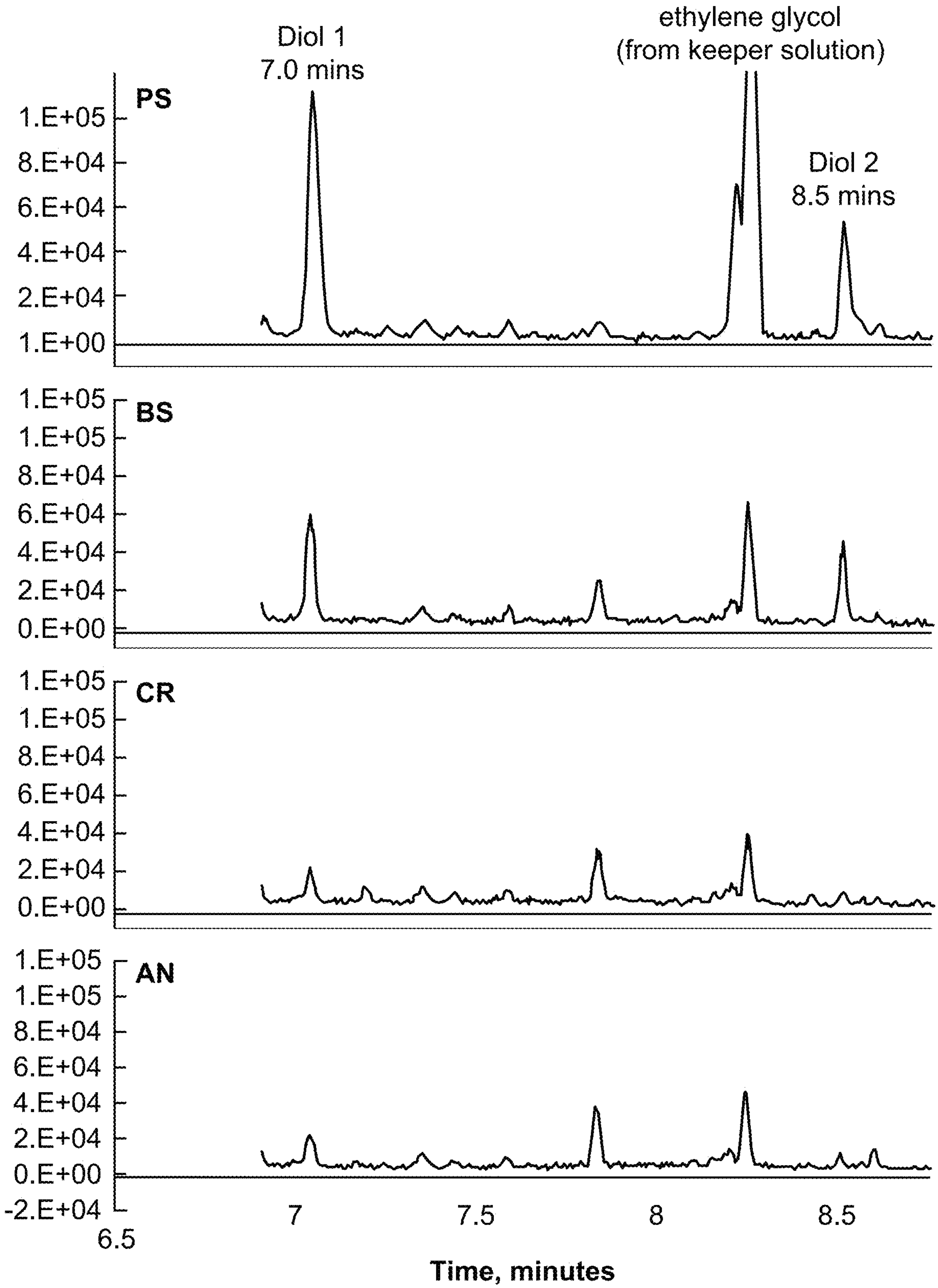
FIG. 7: GCMS chromatograms showing diols present from degradation of foam after 24 hours from four esterases/lipases. Triplicates of no-enzyme controls were averaged and subtracted from sample triplicates. PS—*Pseudomonas* sp. Cholesterol esterase, BS—*Bacillus subtilis* lipase, CR—*Candida rugosa* esterase, AN—*Aspergillus niger* esterase.

The samples were analyzed on a 7820A GCMS. The inlet temperature was 150° C., the flow rate was set at 2 mL/min. The oven was set at 50° C. for 4 min, then ramped to 150° C. at 15° C./min and held for 5 min. GCMS chromatograms of the polyol and foam enzyme samples are pictured below in FIGS. 6 and 7. Two of the four enzymes tested significantly degraded both the polyol and the foams based on the diol peaks that appeared over time. These diols, which make up a significant portion of the polyol did not appear in the control tests, and only showed insignificantly in the *Candida rugosa* and *Aspergillus niger* esterase tests. In the *Pseudomonas* cholesterol esterase and *Bacillus subtilis* lipase tests, significant diol peaks appeared at 7 and 8.5 min.

Further examination by GCMS of a polyol sample after incubation with the *Pseudomonas* cholesterol esterase for 24 h led to identification of the two diols and di-carboxylic acid monomers at earlier retention times followed by partial degradation products (dimers of one diol and di-carboxylic acid; trimers of one di-carboxylic acid and two diols or one diol and two di-carboxylic acids) at later retention times. To further validate the identity of the late retention time compounds, the degraded sample was treated with strong base to completely hydrolyze any of the remaining water soluble polymer fragments. Notably, a complete disappearance of the polyol fragment peaks and the increase of all three product peaks was observed.

A similar trend was observed in the PU foam samples. Diol and di-carboxylic acid peaks were present, though in smaller abundance, which is expected as the foam particulate structure limited the enzyme's access to available surface area.

The presence of MDA in the PU foam+enzyme sample was detected by LCMS: mass trace of 199.2 m/z, corresponding to the MDA+$H^+$ ion, and was also compared to an MDA PBS matrix standard run under the same conditions. These results indicate that the esterase targeted the ester bonds present in the polyol and to a lesser extent the urethane bond between the polyol and the MDI, showing evidence for PU degradation into the polyol monomers and MDA.

Imaging Mass Spectrometry (IMS) Analysis of Degrading PU: 2D MALDI-IMS, which provides spatial resolution of chemicals across a solid sample, was applied to provide further evidence of biodegradation of PU foams and to identify products of the biodegradation process. Organisms of interest, including the fungus *Cladosporium* and organisms derived and enriched from flask-based biodegradation experiments in compost or soil environments, were grown on PUM9 agar plates that lacked any nutritional source of carbon except for a thin film of PU that was prepared on top of the agar surface. Biological samples were inoculated at a site on the plate where a small section of film was removed to allow access to the minimal media salts and trace elements. After a week of growth on the PUM9 plates, samples were processed for IMS analysis. Because detection of specific molecules of interest, especially small or negatively charged chemicals such as the di-carboxylic acid or diol polyol precursors used for the PU films, identification may only be possible through derivatization with the MALDI matrix and identification of these derivatives a priori can be difficult. As a control, an uninoculated film-plate sample was used that had 1 drops of concentrated chemical standards of the expected biodegradation products (the two diols, one di-carboxylic acid, and 4,4'-methylenedianiline (MDA)) added at separate locations. Following derivatization of the samples and controls, it was noted that exposed agar media, in contrast to the PU film, rejected the universal MALDI matrix. This resulted in these exposed agar regions to be devoid of signal in the IMS, whether this was in a region with biological growth or on the control section. Analysis of the ion distributions for the control section revealed distinct classes of molecular signatures that were either generally uniformly distributed over the samples, except where the agar-exposed regions prevented signal or the concentrated chemicals masked these signatures, or specifically localized to the addition sites of the concentrated chemicals. Thus, based either on the spatial distributions in the control section or previously known mass spectra for PU, a number of molecular signatures could be associated with the matrix, the polymer, specific polymer precursor chemicals, or the expected diisocyanate biodegradation product, MDA.

Figures 8A, 8B, 8C, 8D, 8E, 8F:
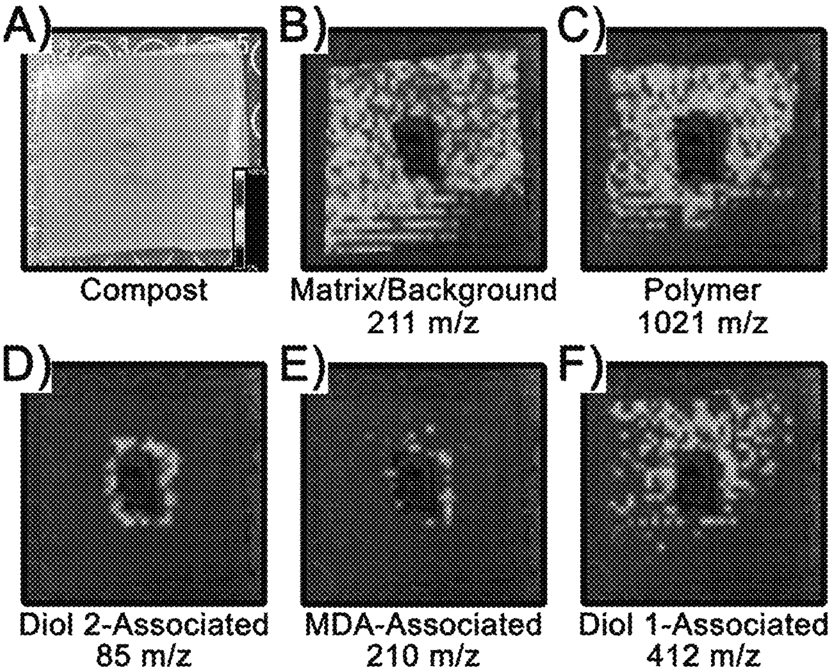

When examining the spatial distributions of these chemical-associated molecular signatures over biological samples, it was again observed that matrix or PU polymer associated signatures showed broad and relatively uniform distributions (FIGS. 8B & C) across the entire sample, while ion signatures associated with the expected biodegradation products were localized to the sites of biodegradation where the organisms contacted the PU films (FIGS. 8D-F). These distributions demonstrate that the organisms are degrading the PU films to produce, but not necessarily consume, the expected degradation products. In addition to the control-based classification of signatures, a number of ion distributions were observed, such as 206 m/z (FIG. SX2), that localize to the organisms in a manner similar to the biodegradation products but were not present on the control sample except as low intensity or non-uniform noise. Because the IMS analysis alone does not allow for identification of these signatures, it was hypothesized that these are either products of the organisms' metabolism or are unknown by-products of the PU film degradation.

Correlation of Foam Biodegradation and Loss of Physical Properties

The foam used in this study contained only polyol, MDI, surfactants, catalysts and water, and created a low-density (~200 kg/$m^3$) soft foam with a porous cellular structure. This type of foam is similar to those used in consumer applications such as seat cushions, furniture, and paddings. Its low density and porosity make it an ideal substrate for microorganism growth, and thus it was especially suitable to the studies that were conducted. Additionally, this type of foam can be deformed reversibly; it can be compressed and springs back to its original shape, which allowed for the monitoring of the foam's mechanical degradation in tandem with its mass reduction.

Figure 9:
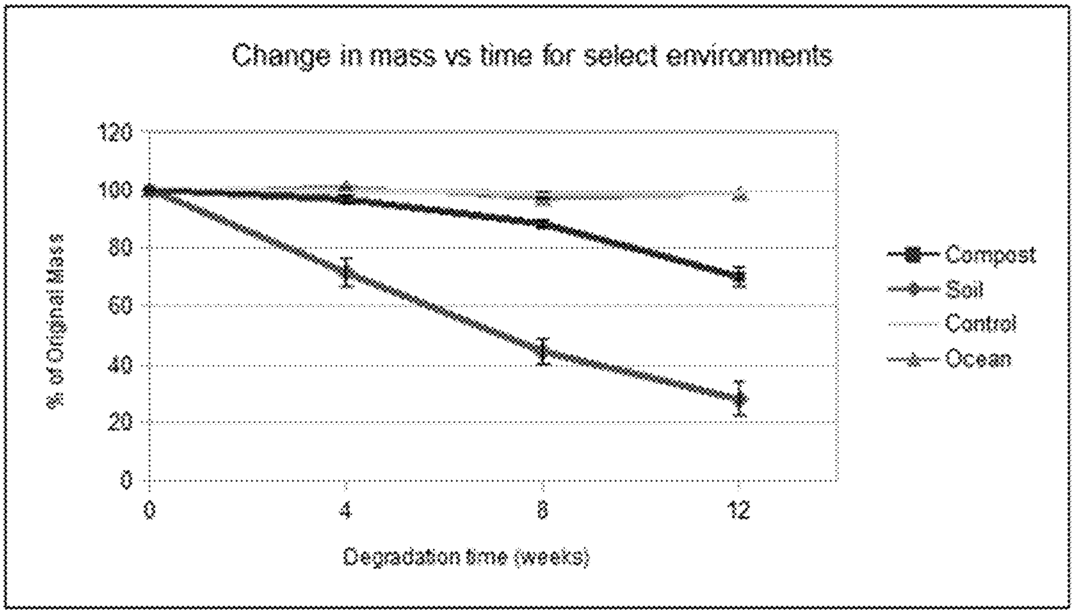
FIG. 9: Percent of mass remaining after incubation in biological environments.
Figure 10:
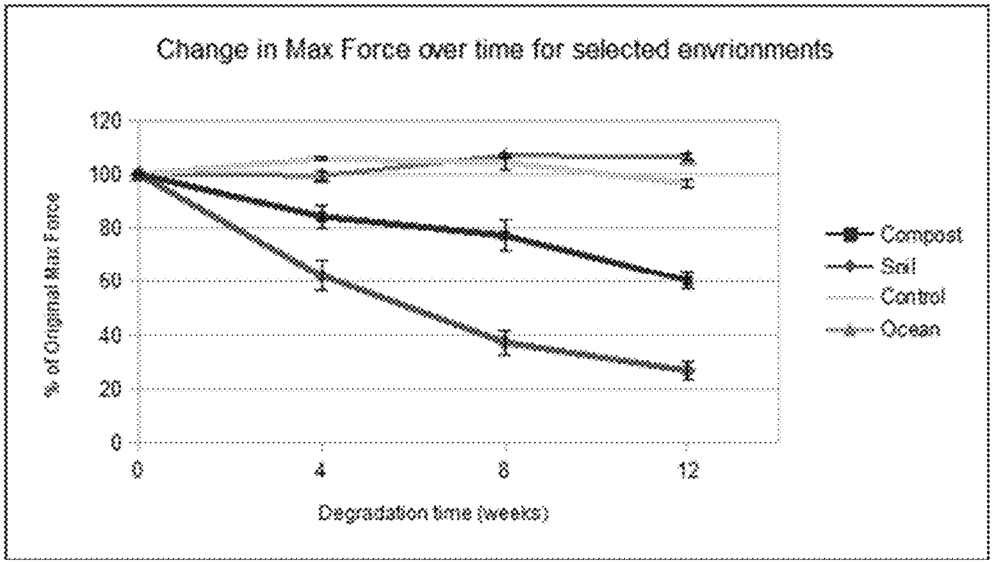
FIG. 10: Percent of maximum force remaining after incubation in biological environments.
Figure 11:
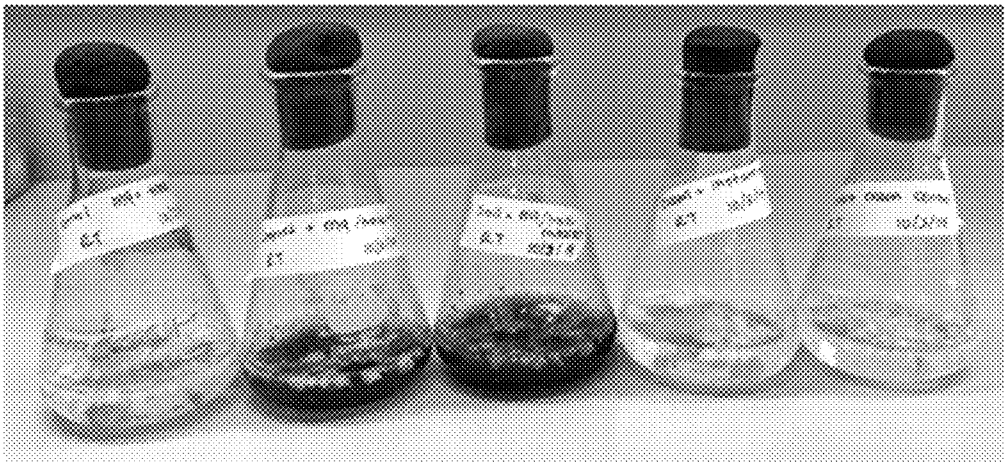
FIG. 11: Initial setup of flasks with shredded PU, 25 mL minimal media (no carbon), and 1 g inoculant. From left to right: freshwater media with no inoculant (control), compost in freshwater media, soil in freshwater media, ocean in saltwater media, saltwater media, soil in freshwater media, ocean in saltwater media, saltwater media with no inoculant (control).
Figure 12:
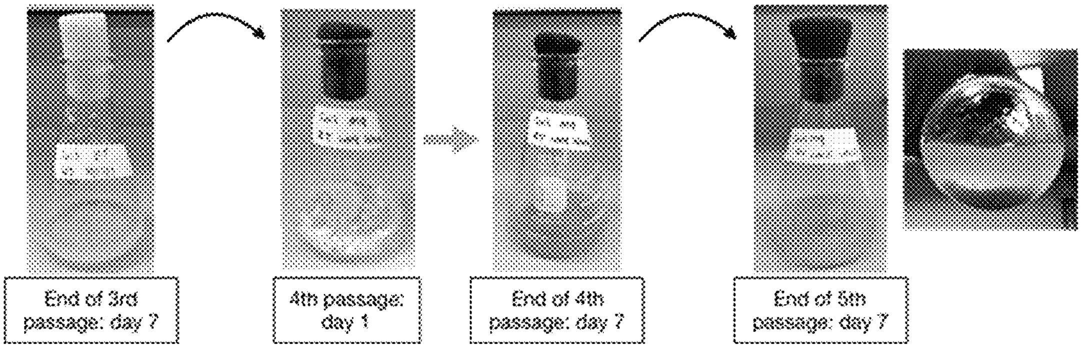
FIG. 12: An example of the passaging process from soil. At the end of the 3rd passage, the liquid culture appeared turbid and slightly yellow. Once 1 mL was aliquoted into a fresh flask for the 4th passage, a pink color emerged after several days of shaking, indicating that one or more organisms may be growing well with PU as its carbon source. The trend continued throughout the next passages with clear sinking and coloration of the foam pieces.
Figure 13:
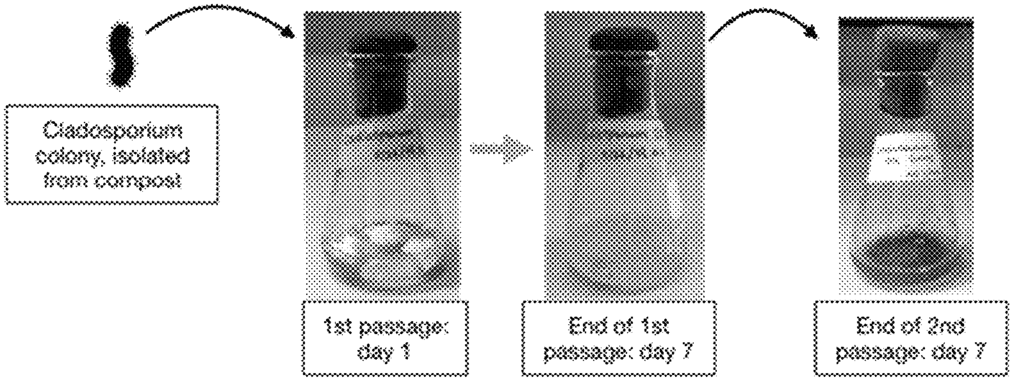
FIG. 13: An example of a fungus colony, *Cladosporium*, which was placed into a fresh flask with minimal media and PU, and left for a week, shaking at room temperature, before being passaged again.
Figure 14:
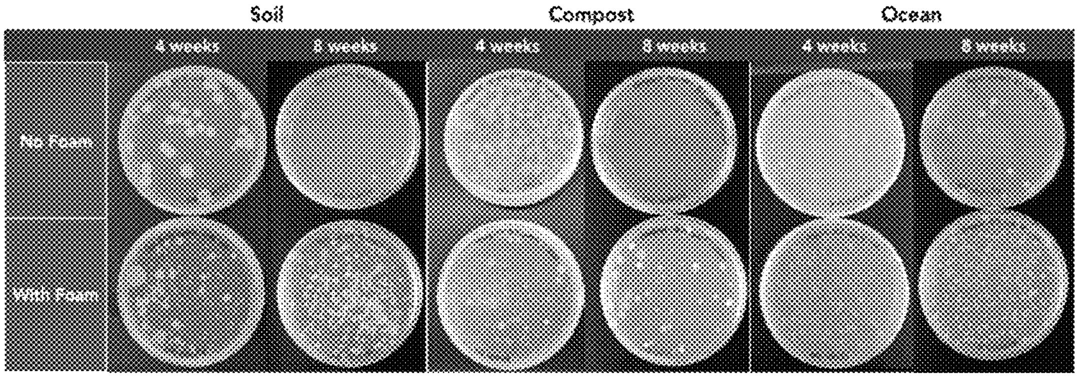
FIG. 14: Samples were plated on rich media at the end of each passaging in order to visualize changes in consortia diversity. From 4 to 8 weeks the number of colonies seen on the no-foam controls decreased significantly, compared to the foam samples, indicating that the PU foam was being used by several organisms to survive.

Mass of the cubes was determined by removing the cubes from the different environmental media, washing in clean water and then allowing the cubes to air dry for 24 hours. As shown in FIG. 9, the mass of the cubes for both soil and compost decreased rapidly during the study, and appear to closely correlate with the decrease in cube size as shown in FIG. 3. The physical resilience of the cubes was determined by measuring the compression force deflection according to ASTM D3574 C, using an AFG 2500N compression tester (MecMesin Inst), equipped with a MultiTest-dV sample stage. This test method involved compressing the cube to 50% of its original height and subsequent decompression, at a constant speed of 100 mm per minute for 10 compression-decompression cycles. The output data was plotted as force by displacement. The maximum force value of the 10th cycle was recorded for all cubes.

Both cube mass and maximum force were normalized to initial, pre-degradation values for all samples. The output data was plotted as a percentage of this initial value for each of the 4, 8, and 12-week time points for each of the environments in FIGS. 9 & 10. After 12 weeks, samples in compost lost 30±3% mass and 41±3% CFD. Samples in soil showed greater degradation with 71±9% mass loss and 71.5±0.8% CFD decrease. The decrease in CFD over time can be partially explained by the loss in mass. The force applied to the surface area of a polymeric substance is distributed among the polymer, and thus when subjected to equal stress, substances with similar surface areas but lower surface densities have more stress per molecule and will therefore register lower strain. The chain length and condition of the remaining polymer chains within the cubes may also be a factor in the CFD decrease over time, as partially degraded polymer chains would also register lower strain values. Cubes incubating in the ocean water showed no perceptible changes.

Isolate Individual Organisms Capable of Degrading Algae-Based Polyester Polyurethane Foams To identify organisms from compost and soil that were capable of utilizing the PU to grow, adaptation experiments were conducted where organisms were placed in minimal media with PU as the sole carbon source. Minimal media was prepared using M9 salt solution with a mix of trace elements (Table 1). PU foam was pulverized cryogenically by immersion in liquid nitrogen followed by use of a high-speed blender to create a fine particulate. Flasks, media and PU were autoclaved to ensure sterility. In 125 mL flasks, 25 mL of minimal media, 0.5 g PU particulate, and 1 g of inoculum from compost or soil was added. Control flasks with inoculum but no PU were also prepared to ensure that organisms were not surviving on the minimal media alone by the end of the experiment. A control flask with the PU minimal media but no inoculum was also prepared to account for contamination.

TABLE 1

M9 minimal media composition

| Components (g/L) | | Total Ion Concentrations (M) | |
|---|---|---|---|
| $Na_2HPO_4$ | 6.78 | $Na^+$ | 0.104 |
| $KH_2PO_4$ | 3.00 | $PO_4^{2-}$ | 0.0698 |
| $NH_4Cl$ | 1.00 | $Cl^-$ | 0.0273 |
| NaCl | 0.50 | $K^+$ | 0.0220 |
| $MgSO_4•7H_2O$ | 0.0250 | $NH_4^+$ | 0.0188 |
| $Na_2EDTA•2H_2O$ | 0.0108 | $SO_4^{2-}$ | 1.08E−04 |
| $FeCl_3•6H_2O$ | 0.00270 | $Mg^{2+}$ | 1.01E−04 |
| $FeSO_4•7H_2O$ | 0.00150 | EDTA | 2.89E−05 |
| NaOH | 0.00138 | $Fe^{3+}$ | 1.54E−05 |
| $Na_2CO_3$ | 0.00115 | $Ca^{2+}$ | 5.44E−06 |
| $CaCl_2•2H_2O$ | 0.000800 | $Mn^{2+}$ | 3.01E−06 |
| $MnCl_2•4H_2O$ | 0.000595 | $Zn^{2+}$ | 1.25E−06 |
| $ZnSO_4•7H_2O$ | 0.000360 | $Cu^{2+}$ | 9.97E−07 |
| $CuCl_2•2H_2O$ | 0.000170 | $Mo^{6-}$ | 9.91E−08 |
| $(NH_4)_6Mo_7O_{24}•4H_2O$ | 0.0000175 | $SeO_3^{2-}$ | 4.91E−08 |
| $Na_2SeO3$ | 0.00000850 | | |

For each incubation period, the flasks were shaken at 100 rpm at room temperature. 1 mL of the liquid in the flask was then used as an inoculum into a fresh PU minimal media flask for the subsequent period. At the end of each passage, 1:1000 and 1:10,000 dilutions were prepared and 50 μL of each was plated onto LB and PDA media and incubated at room temperature for 48 hours. Fresh flasks were inoculated weekly for a total of 8 weeks. At 8 weeks, the number of unique colonies appeared to stabilize and so, the incubation time was increased to 2 weeks prior to inoculation into a fresh flask. At the 12th passage, individual colonies with unique morphology were picked from each plate and PCR-amplified using Phire Plant Direct PCR Master Mix (cat #F160S) with appropriate primers for 16S (515F, 806R) and ITS1 (ITS1-F, ITS2). The samples were sent for Sanger sequencing.

From compost, the organisms enriched in PU minimal media after 12 passages (Table 2) included *Achromobacter* sp., *Brucella melitensis, Pseudomonas* sp., *Rhizobium pusense*, and *Strenotrophomonas acidaminiphila*. From soil, the surviving organisms included *Chryseobacterium* sp., *Herbaspirillum* sp., *Ochrobactrum* sp., *Rhodococcus erythropolis*, and *Stenotrophomonas acidaminiphila*. The *Pseudomonas* genus appeared in compost in the previously mentioned environmental incubation condition as well as in this isolation experiment. Through plating the cultures, it became evident that a consortia of surviving organisms was stabilizing in compost and soil samples, while the no PU control flasks had no remaining surviving organisms, indicating that organisms from compost and soil were utilizing the PU to survive. No fungi were seen on plates by the 12th passage. The setup of liquid cultures in a shaker flask could be more ideal for bacterial growth on the PU rather than fungi, which may have had difficulties latching on to the PU or competing with bacteria to survive.

TABLE 2

Table of remaining surviving bacteria species after 12 passages with PU as sole carbon source

| | |
|---|---|
| Compost | *Achromobacter* species * |
| | *Brucella melitensis* |
| | *Pseudomonas* species * |
| | *Rhizobium pusense* * |
| | *Stenotrophomonas acidaminiphila* * |
| Soil | *Chryseobacterium* species * |
| | *Ochrobactrum* species * |
| | *Pseudomonas* species * |
| | *Rhodococcus erythrypolis* * |
| | *Stenotrophomonas acidaminiphila* * |

Culturing of Microorganisms for Individual Isolates on Polyurethane Films

As described above, samples were prepared for the IMS test by depositing foam films on the surface of minimal plates. Sections were removed via sterile scalpel to provide regions where microbes have access to polyurethane, salts in the media, and oxygen simultaneously. This method was successful for culturing isolates, but not conducive to identifying individual colonies themselves. The shaker method proved significantly more efficient for identifying individual isolates capable of degrading PU foam.

Inoculating Species Identified from the Microbiome Sequencing to Identify Those Capable of Degrading Films on their Own Throughout the course of the passaging experiment, several species became of interest due to their abilities to degrade foam, based on visual cues of the shredded PU: changing color, sinking in liquid, shrinking in size. The species of interest were inoculated on to plates made from minimal media with a thin film of PU, to see if it would be possible to isolate individual colonies that utilize the foam as its carbon source. Breakdown products from these films were imaged using the IMS, which produced several signatures confirming that degradation was taking place.

Expression of Identified Enzymes in *E. coli*

Based on the enzymatic tests, two enzymes, CE1 and LipA, were chosen for expression in *E. coli*. CE1 is a cholesterol esterase found in *Pseudomonas* species, while LipA is a lipase found in *Bacillus subtilis*.

Figure 15:
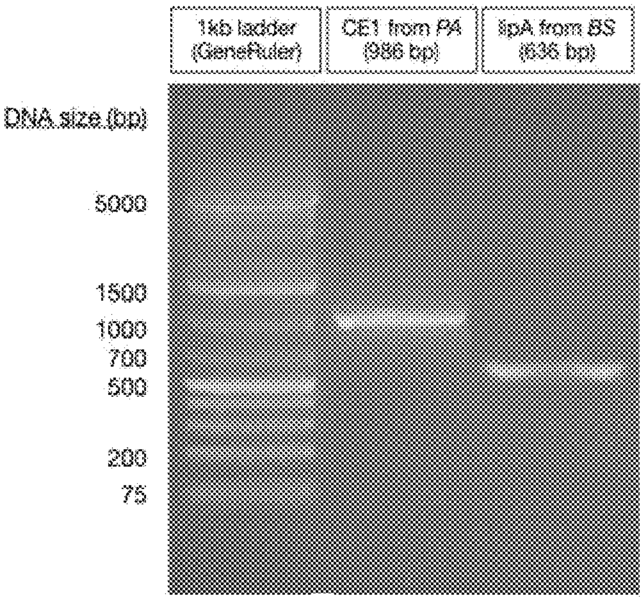
FIG. 15: Successful PCR amplification of enzymes of interest, Cholesterol Esterase (CE1) from *Pseudomonas aeruginosa*, and Lipase (LipA) from *Bacillus subtilis*.
Figure 16:
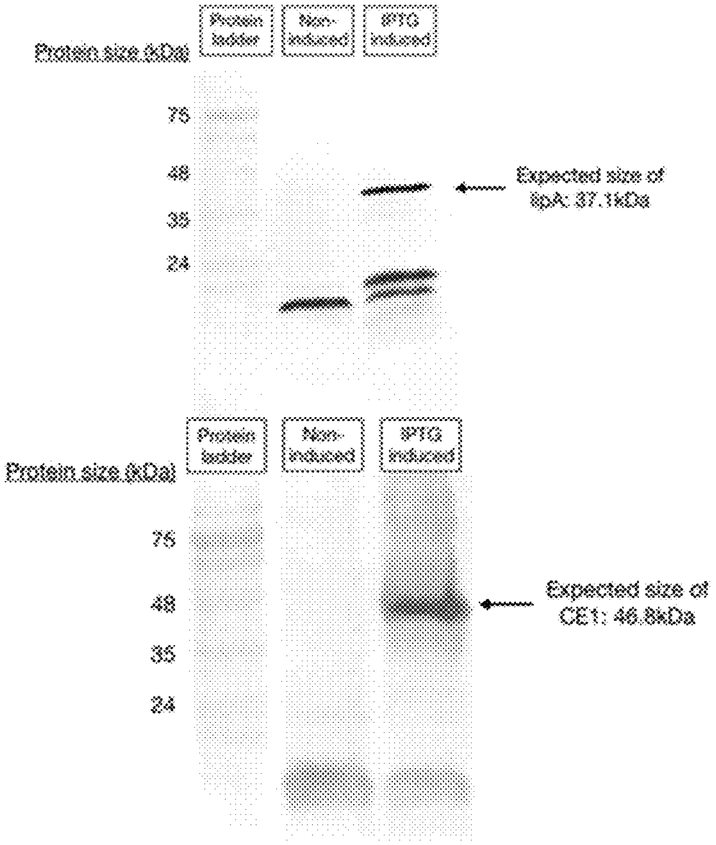
FIG. 16: Comparison of IPTG-induced and non-induced *E. Coli* BL21 expressed enzymes, LipA and CE1, based on expected size of protein. Induced proteins can be seen at 37.1 kDa (LipA) and 46.8 kDa (CE1), as expected. No bands of the appropriate size are seen in non-induced controls, indicating successful IPTG induction of desired proteins.

DNA was extracted from bacteria, *Pseudomonas aeruginosa*, isolated from soil, and *Bacillus subtilis*, isolated from stock culture of strain 168. Primers were designed to amplify enzymes that have previously been cited as having PU biodegradative properties: a cholesterol esterase (CE1) from *Pseudomonas aeruginosa* and a lipase (LipA) from *Bacillus subtilis*. The primers were used to PCR amplify the respective enzymes from the DNA extract. Successful PCR amplification of the region of interest was confirmed through separation by electrophoresis on a 1% agarose gel and sequencing the isolated bands by Sanger Sequencing (FIG. 15).

The PCR amplified genes were then used to express the protein in *E. coli*. Each gene was amplified and cloned into a pET28a *E. coli* expression vector. A His-tag attached to a SUMO fusion protein was utilized within this vector, to help detect the protein and to assist in protein-folding once the enzyme was expressed. Seamless assembly was used to assemble the vector backbones with the genes of interest. The assembled product was first transformed into *E. coli* DH5alpha cells and sequenced to confirm correct cloning of the cDNA. For LipA, the sequenced gene was identical to the NCBI sequence, except for a point mutation causing a change from valine to leucine in a location not predicted to be near the active site. For CE1, there was also a single point mutation outside the active site changing a valine to an isoleucine. The plasmid was then transformed into *E. coli* BL21 cells, which were optimized for protein expression, and again sequenced to confirm successful transformation.

BL21 transformant cells were grown at 37° C. for 3 hours, then induced using 500 mM IPTG and grown up overnight at room temperature. Lipase assays were performed on the crude lysate using a Lipase Activity kit from Sigma-Aldrich to analyze enzymatic activity of the two purified recombinant enzymes. Triplicates of induced BL21 cells showed a LipA activity of 0.33 μmol glycerol produced/min compared to −0.03 μmol glycerol produced/min in uninduced BL21 cells.

Successful induction of the two enzymes, LipA and CE1, were confirmed through Western Blot analysis. Because the proteins have a His-tag attached, His-antibody was used to develop the Western Blot. His-tagged proteins of the expected size were seen in the IPTG induced cell lysate, but not in the non-induced cell lysate, indicating successful IPTG induction of the proteins.

Example 3. Effect of Branching and Chain Length of Polyol on Biodegradation Rate of Polyurethane Biodegradation rate of a polyurethane can be controlled by changing the chemical properties of the polyol segment, specifically through modifying the carbon chain length and branching structure of monomer components within the polyol. These modifications determine the amount of hard and soft segment components in the polyurethane structure. Polyurethanes with longer carbon chains and less branching have larger ratios of soft segments to hard segments, which allow for greater biodegradation due to accessible ester and urethane bonds for hydrolysis.

Figure 17:
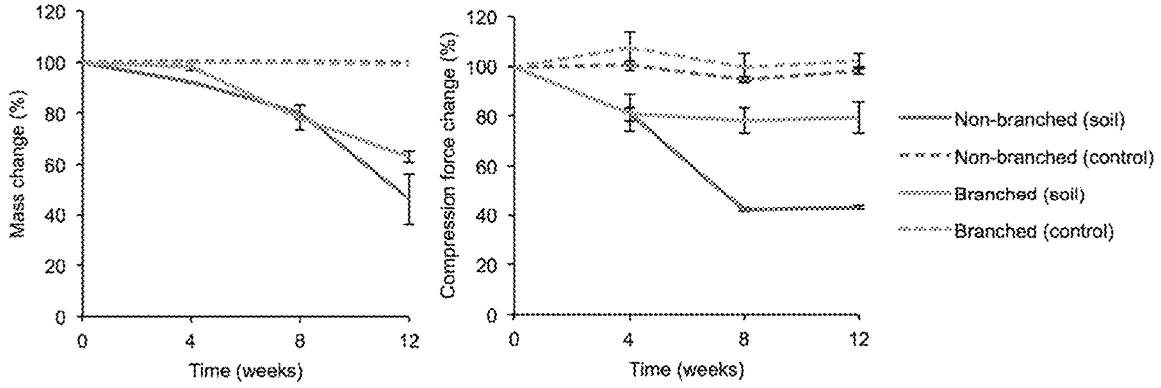
FIG. 17: Mass change (%) (left) and compression force change (%) (right) for a non-branched polyurethane foam compared to a branched polyurethane foam after 12 weeks of biodegradation in soil.
Figure 18:
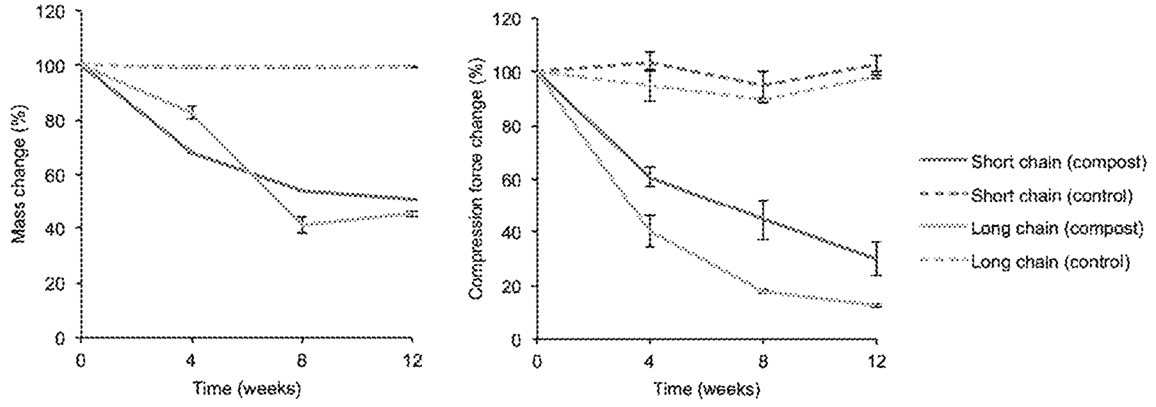
FIG. 18: Mass change (%) (left) and compression force change (%) (right) for a shorter chain polyurethane foam compared to a longer chain polyurethane foam after 12 weeks of biodegradation in compost.

A polyurethane foam of the present technology (non-branched, shorter chain length) with two other polyurethane foams of the present technology: one with a branched polyol portion (FIG. 17) and one with a longer carbon-chain length polyol portion (FIG. 18). The foam made from non-branched, shorter chain length monomers corresponds to the foam described in Example 1A. The counterparts prepared with (1) succinic acid, 2-methyl-1,3-propanediol, and MDI (comparative example with branched polyol portion) or (2) succinic acid, sebacic acid, 1,3-propanediol, and MDI (comparative example with longer carbon-chain length polyol portion), were also prepared in a similar manner. Compared to the non-branched, shorter chain length polyurethane foam, the branched polyurethane foam demonstrated less structural degradation over 12 weeks in soil, while longer chain polyurethane foam showed greater degradation over 12 weeks in compost.

Figure 19:
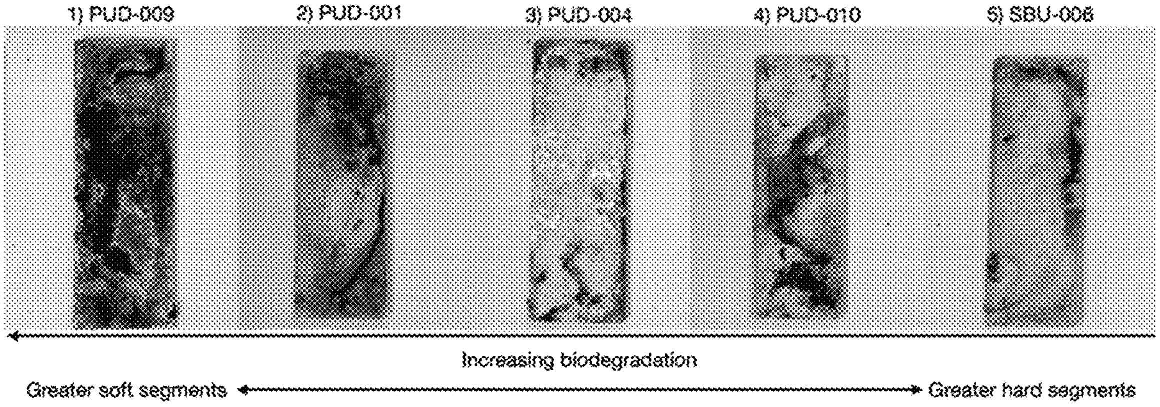
FIG. 19: Five adhesives with different formulations after 7 weeks of biodegradation in compost. Adhesives are ordered from right to left in increasing biodegradation. Adhesives with greater soft segments in the polyol region are found on the left of the ranking, while adhesives with a greater amount of hard segments are found on the right of the ranking.

A suite of five polyurethane adhesive formulations (PUD-009, PUD-001, PUD-004, PUD-010, and SBU-006) with different components of hard and soft segments in the polyol region were assessed (FIG. 19).

The five formulations were prepared as described in Example 1B. PUD-001 was prepared from polycaprolactone, dimethylolpropionic acid, isophorone diisocyanate, and ethylenediamine. PUD-004 was prepared from poly(azelaic acid-ethylene diol), dimethylolpropionic acid, a mixture of isophorone diisocyanate and hexamethylene diisocyanate, and ethylenediamine. PUD-009 was prepared from poly(azelaic acid-ethylene diol), propylene diol, toluene diisocyanate, dimethylolpropionic acid, and ethylenediamine. PUD-010 was prepared from poly(azelaic acid-ethylene diol), propylene diol, isophorone diisocyanate, dimethylolpropionic acid, and ethylenediamine. SBU-006 was prepared from poly(azelaic acid-ethylene diol), propylene diol, toluene diisocyanate, and ethylenediamine.

Degradation was studied based on visual analysis and ranking of changes in coloration, adhesive properties, such as stickiness, and organism growth. It was found that samples with a greater amount of soft segments demonstrated increasing biodegradation compared to their counterparts. For example, PUD-009, PUD-001 and PUD-004 contained long carbon chains of varying lengths within the polyol region. More specifically, PUD-009 and PUD-001 similarly contained a longer carbon chain attached to a short carbon chain, whereas PUD-004 contained a slightly shorter carbon chain that still acted as a soft segment. The adhesives that demonstrated less biodegradation have a greater amount of hard segments due to chemical properties such as branching.

Example 4. Effect of Nutrient Additive on Biodegradation Rate of Polyurethane Biodegradation rate of polyurethane foam can be increased by the addition of nutrients as an additive into the foam composition. Microorganism growth is promoted by addition of nutrients into the material, causing an increase in biodegradation rate, particularly in environments with limited nutrient supply, such as the ocean.

Figure 20:
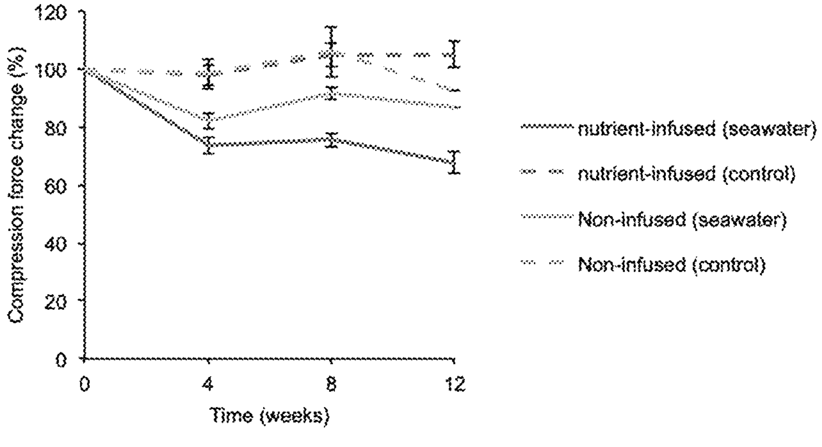
FIG. 20: Compression force change (%) of nutrient-infused polyurethane foam compared to non-infused polyurethane foam after 12 weeks of biodegradation in seawater.

Degradation tests (FIG. 20) have shown that polyurethane foam samples infused with an essential nutrient exhibited increased biodegradation as evidenced by greater loss of compression force compared to non nutrient-infused polyurethane foam samples over 12 weeks in seawater at room temperature. Control samples of both infused and non-infused foams were assessed in deionized water, instead of seawater, at room temperature. In this example, the foam sample without infusion corresponds to the foam described in Example 1A. The foam sample with infusion of media was prepared similarly, but water was replaced with f/2 media, which contains components listed in Table 3.

TABLE 3

Content in f/2 media that promotes biodegradation in seawater.

| f/2 media | |
|---|---|
| $NaNO_3$ (75.0 g/L $dH_2O$) | 1.0 ml |
| $Na_2HPO_4$•$H_2O$ (5.0 g/L $dH_2O$) | 1.0 ml |
| $Na_2SiO_3$•$9H_2O$ (30.0 g/L $dH_2O$) | 1.0 ml |

TABLE 3-continued

| Content in f/2 media that promotes biodegradation in seawater. | |
|---|---|
| f/2 Trace Metal Solution | 1.0 ml |
| f/2 Vitamin Solution | 0.5 ml |
| Filtered seawater to | 1.0 L |
| f/2 Trace Metal Solution: | |
| $FeCl_3•6H_2O$ | 3.15 g |
| $Na_2EDTA•2H_2O$ | 4.36 g |
| $CuSO_4•5H_2O$ (9.8 g/L $dH_2O$) | 1.0 ml |
| $Na_2MoO_4•2H_2O$ (6.3 g/L $dH_2O$) | 1.0 ml |
| $ZnSO_4•7H_2O$ (22.0 g/L $dH_2O$) | 1.0 ml |
| $CoCl_2•6H_2O$ (10.0 g/L $dH_2O$) | 1.0 ml |
| $MnCl_2•4H_2O$ (180.0 g/L $dH_2O$) | 1.0 ml |
| Distilled water to | 1.0 L |
| f/2 Vitamin Solution: | |
| Vitamin $B_{12}$ (1.0 g/L $dH_2O$) | 1.0 ml |
| Biotin (0.1 g/L $dH_2O$) | 10.0 ml |
| Thiamine HCl | 200.0 mg |
| Distilled water to | 1.0 L |

Example 5. Effect of Foam Density on Biodegradation Rate of Polyurethane

Biodegradation rate of a polyurethane can be controlled by the density of the foam. As the density of the polyurethane increases, the rate of biodegradation decreases due to lack of water uptake for hydrolysis. Increasing density results in less air within the foam material, and thus a more rigid material.

Figure 21:
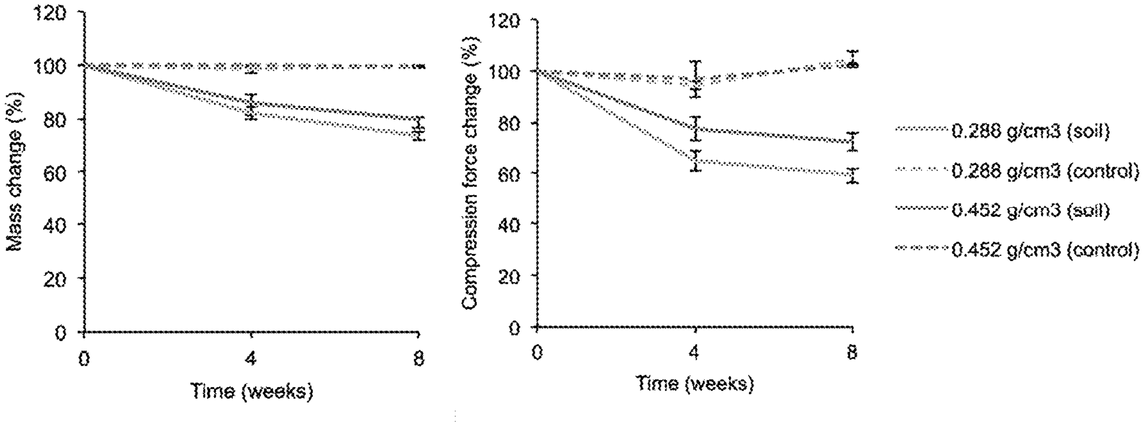
FIG. 21: Mass change (%) (left) and compression force change (%) (right) of 0.288 g/$cm^3$ density polyurethane foam compared to 0.452 g/$cm^3$ density polyurethane foam after 8 weeks of biodegradation in soil.

The same formulation of a polyurethane foam (same monomers as in Example 1A) was made with two different densities: 0.288 g/cm$^3$ and 0.452 g/cm$^3$ and degraded in a soil environment over the same period of time to assess biodegradation rates. It was found that the higher density polyurethane foam structurally degraded at a slower rate with lower mass loss and lower compression force loss (FIG. 21).

Figure 22:
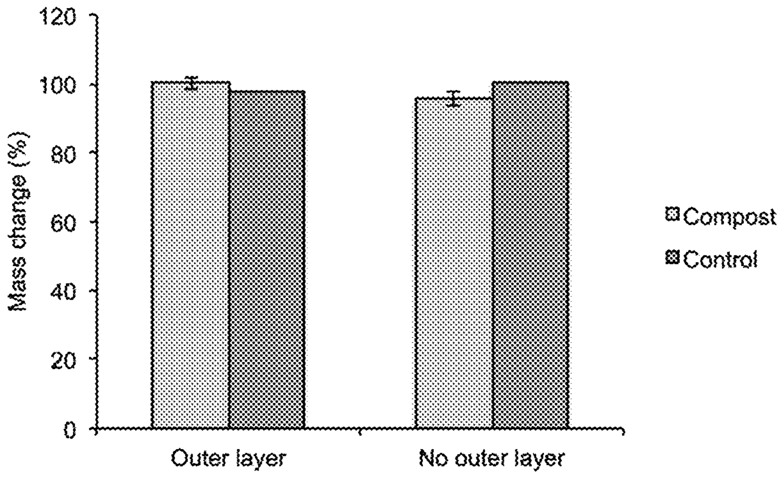
FIG. 22: Mass change (%) for polyurethane sample with an outer surface layer compared to polyurethane sample without an outer surface layer after 4 weeks of biodegradation in compost.

Example 6. Effect of Outer Surface Layer on Biodegradation Rate of Polyurethane Biodegradation of polyurethane foam can be controlled by the presence of an outer surface layer as well as the thickness of that surface layer. An outer surface layer reduces both water absorption and microorganism access to the polyurethane foam and thus, reduces the opportunity for microorganisms to hydrolyze the foam in the biodegradation process. It was expected that the outer surface layer would also biodegrade but at a slower rate. Therefore, modifying the outer surface (presence and thickness) can be used as a method for slowing or speeding up biodegradation. Two sets of polyurethane samples: one with an outer surface layer and the other without any outer surface layer were examined (FIG. 22). The outer surface layer is created by the molding process of creating a foam. The sample without an outer surface layer corresponds to the foam of Example 1A with the outer layers cut off, whereas the sample with an outer surface is a molded counterpart wherein all sides have the outer surface layer due to the cube-shape of the mold. There was greater mass loss in samples without an outer surface layer after 4 weeks of biodegradation in compost. Samples were tested in a compost incubator at 56° C. in >80% humidity in the presence or absence of compost.

Example 7. Effect of Cell Openness on Biodegradation Rate of Polyurethane

Biodegradation of polyurethane foam can be modified by the addition of one or more cell-openers, which also act as a surfactant.

Figure 23:
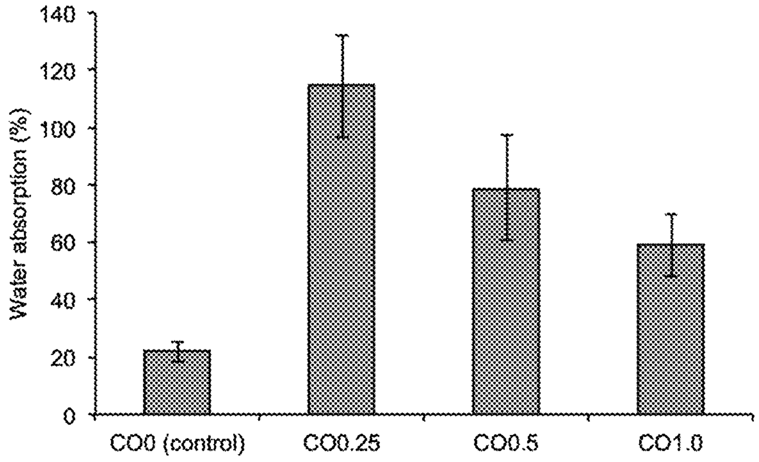
FIG. 23: Water absorption of polyurethane samples with varying concentrations of cell-opener: 0 pphp, 0.25 pphp, 0.5 pphp and 1.0 pphp, (pphp=parts per hundred parts of polyol).
Figure 24:
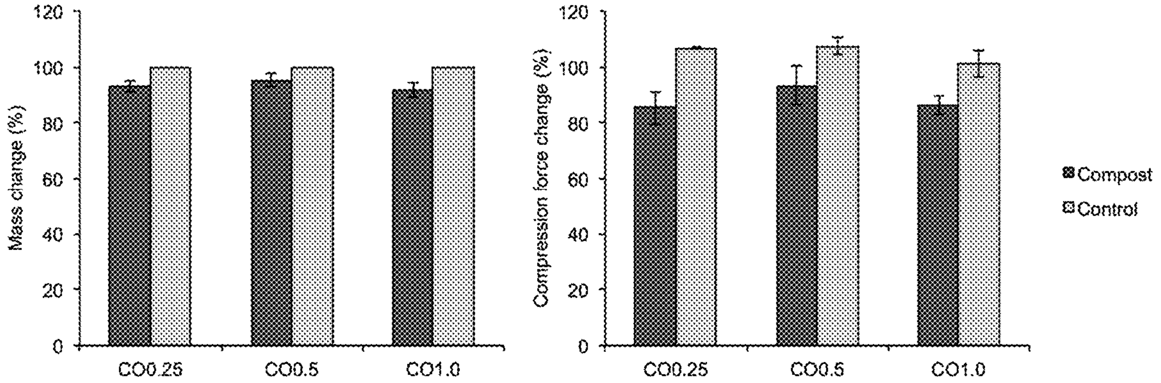
FIG. 24: Mass change (left) and compression force change (right) of polyurethane samples with varying cell-opener concentrations after 4 weeks of biodegradation in compost.

Four polyurethane samples of Example 1A were assessed, with increasing concentration of cell opener (NIAX™ L-6164) The addition of a cell-opener into the polyurethane formulation allowed for increased water absorption (FIG. 23), with the most significant water absorption at a cell-opener concentration of 0.25 parts per hundred parts of polyol (pphp). Among the three cell-opener concentrations assessed, a concentration of 0.25 pphp led to the highest degradation rate, presumably due to the polyurethane sample's greater ability to absorb water (FIG. 24). All samples were tested in a compost incubator at 56° C. in >80% humidity in the presence or absence of compost.

Figure 25:
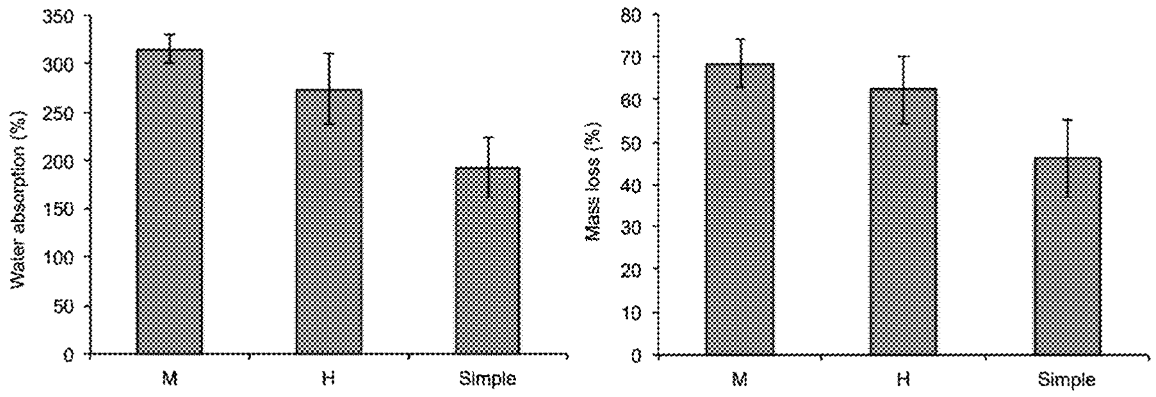
FIG. 25: Water absorption data (left) and mass loss data after 8 weeks of biodegradation in compost (right) for samples, simple foam, M and H. Samples M and H have greater porosity and cell openness due to the prepolymer used compared to the simple foam. M is a sample with lighter density (0.150 g/$cm^3$) than H (0.200 g/$cm^3$). Simple foam has density of around 0.200 g/$cm^3$, comparable to sample H.

Cell-openness can also be adjusted by modifying the isocyanate portion of the polyurethane to alter the porosity of the resultant foam. Sample M, sample H, and “simple foam” were all prepared from using monomers as shown in Example 1A (i.e., succinic acid, 1,4-butanediol, 1,3-propanediol, and MDI). Sample M has a lighter density (0.150 g/cm$^3$) than sample H (0.200 g/cm$^3$). “Simple foam” has a density of around 0.200 g/cm$^3$, comparable to sample H. When the samples were biodegraded for 8 weeks in compost, greater mass loss in samples M and H were observed than with the simple foam (FIG. 25).

Example 8. Effect of Nucleation on Biodegradation Rate of Polyurethane

During the pouring of the polyurethane foam, nucleation is the process of generating many small air bubbles within the liquid. These bubbles generate sites for gas to expand within the foam structure. A greater number of nucleation sites into the foam are introduced by mechanically shearing the mixture to entrain air bubbles.

Figure 26:
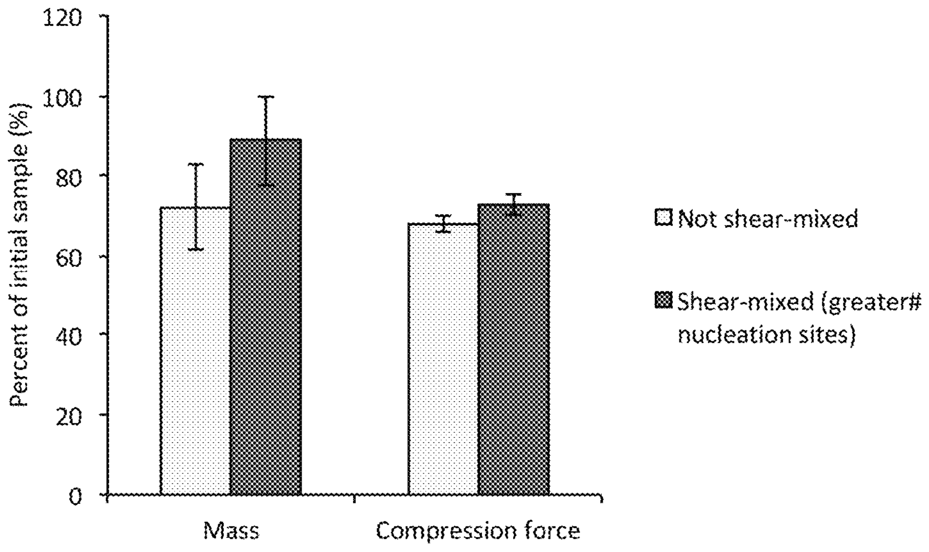
FIG. 26: Mass change (%) (left) and compression force change (%) (right) of foam samples with or without shear-mixing prior to pouring.

For this example, the mixture for one polyol sample was mechanically sheared to introduce small bubbles as nucleation sites, and therefore increase the cell number (smaller cells) prior to pouring, while in the other case (baseline sample corresponding to Example 1A) no mechanical shearing of the mixture prior to pouring was performed. A foam with a greater number of cells of lower volume (e.g., due to greater number of nucleation sites) degraded more slowly after 4 weeks in compost than a foam with a lower number of cells of greater volume (baseline sample with no additional nucleation), as shown in FIG. 26.

EQUIVALENTS

It is to be understood that while the disclosure has been described in conjunction with the above embodiments, that the foregoing description and examples are intended to illustrate and not limit the scope of the disclosure. Other aspects, advantages and modifications within the scope of the disclosure will be apparent to those skilled in the art to which the disclosure pertains.

Unless otherwise defined, all technical and scientific terms used herein have the same meaning as commonly understood by one of ordinary skill in the art to which this disclosure belongs. All nucleotide sequences provided herein are presented in the 5' to 3' direction.

The embodiments illustratively described herein may suitably be practiced in the absence of any element or elements, limitation or limitations, not specifically disclosed herein. Thus, for example, the terms "comprising," "including," containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the disclosure.

Thus, it should be understood that although the present disclosure has been specifically disclosed by specific embodiments and optional features, modification, improvement, and variation of the embodiments therein herein disclosed may be resorted to by those skilled in the art, and that such modifications, improvements and variations are considered to be within the scope of this disclosure. The materials, methods, and examples provided here are representative of particular embodiments, are exemplary, and are not intended as limitations on the scope of the disclosure.

The scoped of the disclosure has been described broadly and generically herein. Each of the narrower species and subgeneric groupings falling within the generic disclosure also form part of the disclosure. This includes the generic description with a proviso or negative limitation removing any subject matter from the genus, regardless of whether or not the excised material is specifically recited herein.

In addition, where features or aspects of the disclosure are described in terms of Markush groups, those skilled in the art will recognize that embodiments of the disclosure may also thereby be described in terms of any individual member or subgroup of members of the Markush group.

Certain embodiments of the present disclosure are as follows:

1. A method to biodegrade a bio-based polymer product, the method comprising, or consisting essentially of, or yet further consisting of incubating the bio-based polymer product with a first microorganism, wherein the bio-based polymer product comprises a bio-based polymer, and incubation of the bio-based polymer product and the first microorganism is conducted under a condition that degrades the bio-based polymer to subunits.
2. The method of embodiment 1, wherein the bio-based polymer is a polyurethane.
3. The method of embodiment 2, wherein the polyurethane is a polymerization product of one or more linear aliphatic polyester polyols, and a diisocyanate.
4. The method of embodiment 3, wherein one or more linear aliphatic polyester polyols are produced from one or more biologically sourced diols and one or more biologically sourced di-carboxylic acids.
5. The method of embodiment 4, wherein the one or more biologically sourced diols, the one or more biologically sourced di-carboxylic acids, or a combination thereof are derived from algae.
6. The method of embodiment 4, wherein the one or more biologically sourced diols or the one or more biologically sourced di-carboxylic acids are non-branched.
7 The method of embodiment 4, wherein the one or more biologically sourced diols and the one or more biologically sourced di-carboxylic acids are non-branched.
8. The method of embodiment 4, wherein the one or more biologically sourced diols and the one or more biologically sourced di-carboxylic acids are branched.
9. The method of any one of embodiments 1-8, wherein the one or more biologically sourced diols or the one or more biologically sourced di-carboxylic acids have a carbon chain length of 2-4 carbons.
10. The method of any one of embodiments 1-8, wherein the one or more biologically sourced diols and the one or more biologically sourced di-carboxylic acids have a carbon chain length of 2-4 carbons.
11. The method of any one of embodiments 1-8, wherein the one or more biologically sourced diols and the one or more biologically sourced di-carboxylic acids have a carbon chain length of 5-20 carbons.
12. The method of any one of embodiments 1-11, wherein the bio-based polymer product further comprises a rate-regulating compound, wherein the rate-regulating compound accelerates degradation of the bio-based polymer compared to degradation of the bio-based polymer in the absence of the rate-regulating compound.
13. The method of any one of embodiments 1-11, wherein the bio-based polymer product further comprises a rate-regulating compound, wherein the rate-regulating compound decelerates degradation of the bio-based polymer compared to degradation of the bio-based polymer in the absence of the rate-regulating compound.
14. The method of embodiment 13, wherein the rate-regulating compound is a cross-linker or a chain extender additive.
15. The method of embodiment 14, wherein the cross-linker is selected from a $C_2$-$C_{12}$ diol, glycerol, trimethylolpropane, pentaerythritol, and a combination of two or more thereof.
16. The method of embodiment 14, wherein the chain extender additive is selected from trimethylolpropane; ethylene glycol; 1,2- and 1,3-propylene glycol; 1,4- and 2,3-butane diol; 1,6-hexane diol; 1,8-octane diol; neopentyl glycol; cyclohexane dimethanol; 2-methyl-1,3-propane diol; glycerine; 1,2,6-hexane triol; 1,2,4-butane triol; trimethylolethane; pentaerythritol; quinitol; mannitol; sorbitol; methyl glycoside; diethylene glycol; triethylene glycol; tetraethylene glycol; dipropylene glycol; dibutylene glycol; or a combination of two or more thereof
17. The method of embodiment 12, wherein the rate-regulating compound comprises, or consists essentially of, or consists of a mineral, a salt, a vitamin, or a combination of two or more thereof
18. The method of embodiment 17, wherein the mineral is selected from the group consisting of nitrogen, potassium, phosphate, iron, calcium, sulfur, magnesium, cobalt, zinc, and a combination of two or more thereof
19. The method of embodiment 17, wherein the salt is selected from $CaCl_2$), $Na_2HPO_4$, $KH_2PO_4$, NaCl, $NH_4Cl$, $MgSO_4$, and a combination of two or more thereof.
20. The method of embodiment 17, wherein the salt is selected from $CaCl_2$), $Na_2HPO_4$, $KH_2PO_4$, NaCl, $NH_4Cl$, $MgSO_4$, $NaNO_3$, $NaH_2PO_4$, $FeCl_3$, and a combination of two or more thereof.
21. The method of embodiment 12, wherein the rate-regulating compound is a cell-opener.
22. The method of embodiment 21, wherein the cell-opener is selected from VORANOL™ CP1421 polyol (polyether polyol), VORANOL™ 4053 polyol (polyether polyol), GORAPUR® IMR 852 (silicone-based), TEGOSTAB® B8948, NIAX™ L-1507 (non-hydrolyzable silicone surfactant), NIAX™ L-6164

(non-hydrolyzable silicone copolymer surfactant), NIAX™ L-6186 (non-hydrolyzable silicone copolymer surfactant), and NIAX™ L-6189 (organosilicone copolymer surfactant).

23. The method of any one of embodiments 1-22, wherein the bio-based polymer product comprises an outer surface layer.
24. The method of embodiment 23, wherein the outer surface layer is comprised of the same polymer as the bio-based polymer.
25. The method of any one of embodiments 1-24, wherein the bio-based polymer product comprises, consists essentially of, or consists of a foam.
26. The method of embodiment 25, wherein the bio-based polymer product comprises, consists essentially of, or consists of an open cell foam.
27. The method of embodiment 25, the bio-based polymer product comprises, consists essentially of, or consists of a closed cell foam.
28. The method of any one of embodiments 25-27, wherein the foam has a density of about 0.075 g/L to about 0.3 g/L.
29. The method of any one of embodiments 25-27, wherein the foam has a density of about 0.45 g/L to about 0.6 g/L.
30. The method of any one of embodiments 25-29, wherein the bio-based polymer was mechanically sheared prior to pouring.
31. The method of any one of embodiments 25-29, wherein the bio-based polymer was not mechanically sheared prior to pouring.
32. The method of any one of embodiments 1-31, wherein the bio-based polymer product is comprised in a shoe, an insole, or a midsole.
33. The method of any one of embodiments 1-20, wherein the bio-based polymer product comprises, consists essentially of, or consists of a thermal plastic polyurethane (TPU).
34. The method of any one of embodiments 1-20, wherein the bio-based polymer product comprises, consists essentially of, or consists of an adhesive.
35. The method of any one of embodiments 1-34, wherein the incubation is performed in an aqueous solution.
36. The method of embodiment 35, wherein the aqueous solution is sea water or salt water.
37. The method of embodiment 35 or embodiment 36, wherein the aqueous solution lacks a carbon source.
38. The method of any one of embodiments 1-37, wherein the first microorganism is selected from a bacterium or a fungus.
39. The method of embodiment 38, wherein the bacterium is selected from the genus *Chryseobacterium, Ochrobactrum, Paenarthrobacter, Pandoraea, Pseudomonas, Rhizobium, Stenotrophomonas, Alteromonas, Marinobacter, Achromobacter, Brucella*, and *Bacillus.*
40. The method of any one of embodiments 1-37, wherein the first microorganism is selected from the group consisting of *Paenarthrobacter nicotinovorans, Pseudomonas oceani, Pseudomonas aeruginosa, Alteromonas marina, Bacillus subtilis, Brucella melitensis*, and *Aspergillus fumigatus*
41. The method of any one of embodiments 1-40, wherein the first microorganism expresses at least one enzyme that degrades the bio-based polymer to the subunits, wherein the at least one enzyme comprises, consists essentially of, or consists of a serine hydrolase, a lipase, an esterase, or a combination of two or more thereof.
42. The method of any one of embodiments 1-40, wherein the first microorganism expresses at least one enzyme that degrades the bio-based polymer to the subunits, wherein the at least one enzyme comprises, consists essentially of, or consists of LipA or CE1, or both.
43. The method of any one of embodiments 1-42, wherein the incubation further comprises 1, 2, 3, or 4 additional microorganisms.
44. The method of embodiment 43, wherein a rate of degradation of the bio-based polymer product is accelerated in the presence of the additional microorganisms.
45. The method of embodiment 43 or embodiment 44, wherein at least one of the first microorganism or the additional microorganisms metabolizes methylenedianiline (MDA).
46. The method of any one of embodiments 44-46, wherein each of the additional microorganisms expresses at least one enzyme that degrades the bio-based polymer to the subunits, wherein the at least one enzyme comprises, consists essentially of, or consists of a serine hydrolase, a lipase, an esterase, or a combination of two or more thereof.
47. The method of any one of embodiments 44-46, wherein each of the additional microorganisms expresses at least one enzyme that degrades the bio-based polymer to the subunits, wherein the at least one enzyme comprises, consists essentially of, or consists of LipA or CE1, or both.
48. The method of embodiment 42 or embodiment 47, wherein the LipA is full-length enzyme or is a functional fragment.
49. The method of any one of embodiments 42, 47, or 48, wherein the LipA is a modified LipA, comprising one or more substitutions.
50. The method of embodiment 49, wherein the modified LipA comprises a valine to leucine substitution.
51. The method of any one of embodiments 42 or 47-50, wherein the LipA comprises at least 80%, 85%, 90%, 95%, 96%, 96%, 97%, 98%, 99%, or 100% sequence identity to SEQ ID NO: 1.
52. The method of embodiment 42 or embodiment 47, wherein the CE1 is full-length enzyme or is a functional fragment.
53. The method of any one of embodiments 42, 47, or 52, wherein the CE1 is a modified CE1, comprising one or more substitutions.
54. The method of embodiment 53, wherein the modified CE1 comprises a valine to isoleucine substitution.
55. The method of any one of embodiments 42, 47 or 52-54, wherein the CE1 comprises at least 80%, 85%, 90%, 95%, 96%, 96%, 97%, 98%, 99%, or 100% sequence identity to SEQ ID NO: 2.
56. The method of any one of embodiments 1-55, wherein the incubation results in about 5%, 10%, 20%, 30%, 40%, 50%, 60%, 70%, 80%, 90%, 95%, or 100% degradation of the bio-based polymer to subunits.
57. The method of any one of embodiments 1-56, wherein the subunits comprise, consist essentially of, or consist of a polyol, a di-carboxylic acid, a diol, or a combination of two or more thereof.
58. The method of embodiment 57, wherein the dicarboxylic acid is independently selected from the group consisting of oxalic acid, malonic acid, succinic acid, glutaric acid, adipic acid, pimelic acid, suberic acid, azelaic acid, and sebacic acid.

59. The method of embodiment 57, wherein the diol is independently selected from the group consisting of ethylene glycol; 1,2 propanediol; 1,3-propanediol; glycerol; 1,3-butanediol; 1,4-butanediol; 2-methyl-1,3-propanediol; 2,3-butanediol; trimethylolpropane; 1,5-pentanediol; 1,6-hexanediol; 3-methyl-1,5-pentanediol; 1,7-heptanediol; 1,8-octanediol; 1,9-nonanediol; and 1,10-decanediol.
60. The method of any one of embodiments 1-59, wherein the incubation is performed at a temperature from about 22° C. to about 32° C.
61. The method of embodiment 60, wherein the incubation is performed at a temperature from about 22° C. to about 30° C., from about 22° C. to about 28° C., from about 23° C. to about 30° C., from about 23° C. to about 28° C., from about 24° C. to about 30° C., from about 24° C. to about 28° C., from about 25° C. to about 30° C., from about 25° C. to about 28° C., from about 26° C. to about 30° C., or from about 26° C. to about 28° C.
62. The method of embodiment 60, wherein the incubation is performed at a temperature of about 22° C., about 23° C., about 24° C., about 25° C., about 26° C., about 27° C., about 28° C., about 29° C., about 30° C., about 31° C., or about 32° C.
63. The method of any one of embodiments 1-62, wherein the incubation is performed at a humidity of about 50%, 60%, 70%, 80%, 90%, or 100%.
64. The method of any one of embodiments 1-63, wherein the incubation is performed for at least 12 weeks.
65. A method to degrade a bio-based polymer product, the method comprising, or consisting essentially of, or yet further consisting of incubating the bio-based polymer product with an acid or a base, wherein the bio-based polymer product comprises a bio-based polymer, and incubation of the bio-based polymer product with the acid or the base is conducted under a condition that degrades the bio-based polymer to subunits.
66. The method of embodiment 65, wherein the bio-based polymer is a polyurethane.
67. The method of embodiment 66, wherein the polyurethane is a polymerization product of one or more linear aliphatic polyester polyols, and a diisocyanate.
68. The method of embodiment 67, wherein one or more linear aliphatic polyester polyols are produced from one or more biologically sourced diols and one or more biologically sourced di-carboxylic acids.
69. The method of embodiment 68, wherein the one or more biologically sourced diols, the one or more biologically sourced di-carboxylic acids, or a combination thereof are derived from algae.
70. The method of any one of embodiments 65-69, wherein the bio-based polymer product further comprises a rate-regulating compound, wherein the rate-regulating compound accelerates degradation of the bio-based polymer compared to degradation of the bio-based polymer in the absence of the rate-regulating compound.
71. The method of any one of embodiments 65-69, wherein the bio-based polymer product further comprises a rate-regulating compound, wherein the rate-regulating compound decelerates degradation of the bio-based polymer compared to degradation of the bio-based polymer in the absence of the rate-regulating compound.
72. The method of embodiment 71, wherein the rate-regulating compound is a cross-linker or a chain extender additive.
73. The method of embodiment 72, wherein the cross-linker is selected from a $C_2$-$C_{12}$ diol, glycerol, trimethylolpropane, pentaerythritol, and a combination of two or more thereof.
74. The method of embodiment 72, wherein the chain extender additive is selected from trimethylolpropane; ethylene glycol; 1,2- and 1,3-propylene glycol; 1,4- and 2,3-butane diol; 1,6-hexane diol; 1,8-octane diol; neopentyl glycol; cyclohexane dimethanol; 2-methyl-1,3-propane diol; glycerine; 1,2,6-hexane triol; 1,2,4-butane triol; trimethylolethane; pentaerythritol; quinitol; mannitol; sorbitol; methyl glycoside; diethylene glycol; triethylene glycol; tetraethylene glycol; dipropylene glycol; dibutylene glycol; or a combination of two or more thereof
75. The method of any one of embodiments 65-74, wherein the incubation is performed in an aqueous solution.
76. The method of embodiment 75, wherein the aqueous solution is sea water or salt water.
77. The method of any one of embodiments 65-76, wherein the bio-based polymer product comprises, consists essentially of, or consists of a foam.
78. The method of embodiment 77, wherein the bio-based polymer product comprises, consists essentially of, or consists of an open cell foam.
79. The method of embodiment 77, the bio-based polymer product comprises, consists essentially of, or consists of a closed cell foam.
80. The method of any one of embodiments 65-79, wherein the bio-based polymer product is comprised in a shoe, an insole, or a midsole.
81. The method of any one of embodiments 65-76, wherein the bio-based polymer product comprises, consists essentially of, or consists of a thermal plastic polyurethane (TPU).
82. The method of any one of embodiments 65-76, wherein the bio-based polymer product comprises, consists essentially of, or consists of an adhesive.
83. The method of any one of embodiments 65-82, wherein the incubation results in about 5%, 10%, 20%, 30%, 40%, 50%, 60%, 70%, 80%, 90%, 95%, or 100% degradation of the bio-based polymer to subunits.
84. The method of embodiment 83, wherein the subunits comprise, consist essentially of, or consist of a polyol, a di-carboxylic acid, a diol, or a combination of two or more thereof.
85. The method of embodiment 84, wherein the di-carboxylic acid is independently selected from the group consisting of oxalic acid, malonic acid, succinic acid, glutaric acid, adipic acid, pimelic acid, suberic acid, azelaic acid, and sebacic acid.
86. The method of embodiment 84, wherein the diol is independently selected from the group consisting of ethylene glycol; 1,2 propanediol; 1,3-propanediol; glycerol; 1,3-butanediol; 1,4-butanediol; 2-methyl-1,3-propanediol; 2,3-butanediol; trimethylolpropane; 1,5-pentanediol; 1,6-hexanediol; 3-methyl-1,5-pentanediol; 1,7-heptanediol; 1,8-octanediol; 1,9-nonanediol; and 1,10-decanediol.
87. The method of any one of embodiments 65-86, wherein the incubation is performed at a temperature from about 22° C. to about 32° C.

88. The method of embodiment 87, wherein the incubation is performed at a temperature from about 22° C. to about 30° C., from about 22° C. to about 28° C., from about 23° C. to about 30° C., from about 23° C. to about 28° C., from about 24° C. to about 30° C., from about 24° C. to about 28° C., from about 25° C. to about 30° C., from about 25° C. to about 28° C., from about 26° C. to about 30° C., or from about 26° C. to about 28° C.
89. The method of embodiment 87, wherein the incubation is performed at a temperature of about 22° C., about 23° C., about 24° C., about 25° C., about 26° C., about 27° C., about 28° C., about 29° C., about 30° C., about 31° C., or about 32° C.
90. The method of any one of embodiments 65-89, wherein the incubation is performed at a humidity of about 50%, 60%, 70%, 80%, 90%, or 100%.
91. The method of any one of embodiments 65-90, wherein the incubation is performed for at least 12 weeks.
92. The method of any one of embodiments 65-91, wherein the acid is selected from hydrochloric acid, nitric acid, sulfuric acid, hydrobromic acid, hydroiodic acid, or perchloric acid, or a combination of two or more thereof
93. The method of any one of embodiments 65-91, wherein the base is selected from lithium hydroxide, sodium hydroxide, potassium hydroxide, calcium hydroxide, strontium hydroxide, or barium hydroxide, or a combination of two or more thereof
94. A degradable polymer product comprising, or consisting essentially of, or yet further consisting of a bio-based polymer and a rate-regulating compound, wherein the bio-based polymer comprises a bio-based polymer; the bio-based polymer is a polyurethane, a polyester, or a polyester polyurethane; and the rate-regulating compound is a cross-linker comprised within the bio-based polymer or an additive.
95. The degradable polymer product of embodiment 94, wherein the cross-linker is selected from a $C_2$-$C_{12}$ diol, glycerol, trimethylolpropane, pentaerythritol, and a combination of two or more thereof
96. The degradable polymer product of embodiment 94 or embodiment 95, wherein the rate-regulating compound is present in the degradable polymer product in an amount of about 0.1% w/w to about 5% w/w.
97. The degradable polymer product of embodiment 94, wherein the additive is a vitamin, a salt or a mineral.
98. The degradable polymer product of embodiment 97, wherein the vitamin is selected from p-aminobenzoic acid (PABA), folic acid, biotin, lipoic acid, mercaptoethane-sulfonic acid, nicotinic acid, pantothenic acid, pyridoxine (B6), riboflavin (B2), thiamine (B1), vitamin B12, or vitamin K, or a combination of two or more thereof.
99. The degradable polymer product of embodiment 97, wherein the salt is selected from the group consisting of $CaCl_2$, $Na_2HPO_4$, $KH_2PO_4$, NaCl, $NH_4Cl$, $MgSO_4$, and a combination of two or more thereof
100. The degradable polymer product of embodiment 97, wherein the salt is selected from the group consisting of $CaCl_2$, $Na_2HPO_4$, $KH_2PO_4$, NaCl, $NH_4Cl$, $MgSO_4$, $NaNO_3$, $NaH_2PO_4$, $FeCl_3$, and a combination of two or more thereof.
101. The degradable polymer product of embodiment 97, wherein the mineral is selected from the group consisting of nitrogen, potassium, phosphate, iron, calcium, sulfur, magnesium, cobalt, zinc, and a combination of two or more thereof.
102. The degradable polymer product of embodiment 94, wherein the additive is a cell-opener.
103. The degradable polymer product of embodiment 102, wherein the cell-opener is selected from VORANOL™ CP1421 polyol (polyether polyol), VORANOL™ 4053 polyol (polyether polyol), GORAPUR® IMR 852 (silicone-based), TEGOSTAB® B8948, NIAX™ L-1507 (non-hydrolyzable silicone surfactant), NIAX™ L-6164 (non-hydrolyzable silicone copolymer surfactant), NIAX™ L-6186 (non-hydrolyzable silicone copolymer surfactant), and NIAX™ L-6189 (organosilicone copolymer surfactant).
104. The degradable polymer product of any one of embodiments 94-103, wherein the degradable polymer product is in a form of a foam.
105. The degradable polymer product of embodiment 104, wherein the foam comprises, consists essentially of, or consists of an open cell foam.
106. The degradable polymer product of embodiment 104, wherein the foam comprises, consists essentially of, or consists of a closed cell foam.
107. The degradable polymer product of any one of embodiments 104-106, wherein the foam has a density of about 0.075 g/L to about 0.3 g/L.
108. The degradable polymer product of any one of embodiments 104-106, wherein the foam has a density of about 0.075 g/L to about 0.6 g/L.
109. The degradable polymer product of any one of embodiments 104-108, wherein the bio-based polymer was mechanically sheared prior to pouring.
110. The degradable polymer product of any one of embodiments 104-108, wherein the bio-based polymer was not mechanically sheared prior to pouring.
111. The degradable polymer product of any one of embodiments 104-110, wherein the degradable polymer product comprises an outer surface layer.
112. The degradable polymer product of embodiment 111, wherein the outer surface layer is comprised of the same polymer as the bio-based polymer.
113. The degradable polymer product of any one of embodiments 94-101, wherein the degradable polymer product is in a form of a thermal plastic polyurethane (TPU).
114. The degradable polymer product of any one of embodiments 94-101, wherein the degradable polymer product is in a form of an adhesive.
115. The degradable polymer product of any one of embodiments 94-114, wherein the bio-based polymer is a polymerization product of one or more polyols, and a diisocyanate.
116. The degradable polymer product of embodiment 115, wherein the polyol is produced from one or more biologically sourced diols, one or more biologically sourced di-carboxylic acids, or a combination thereof
117. The degradable polymer product of embodiment 116, wherein the one or more biologically sourced diols, the one or more biologically sourced di-carboxylic acids or a combination thereof are derived from algae.
118. The degradable polymer product of embodiment 116 or embodiment 117, wherein the one or more biologically sourced diols or the one or more biologically sourced di-carboxylic acids are non-branched.
119. The degradable polymer product of embodiment 116 or embodiment 117, wherein the one or more biologically sourced diols and the one or more biologically sourced di-carboxylic acids are non-branched.

120. The degradable polymer product of embodiment 116 or embodiment 117, wherein the one or more biologically sourced diols and the one or more biologically sourced di-carboxylic acids are branched.

121. The degradable polymer product of embodiment 116 or embodiment 117, wherein the one or more biologically sourced diols or the one or more biologically sourced di-carboxylic acids have a carbon chain length of 2-4 carbons.

122. The degradable polymer product of embodiment 116 or embodiment 117, wherein the one or more biologically sourced diols and the one or more biologically sourced di-carboxylic acids have a carbon chain length of 2-4 carbons.

123. The degradable polymer product of embodiment 116 or embodiment 117, wherein the one or more biologically sourced diols and the one or more biologically sourced di-carboxylic acids have a carbon chain length of 5-20 carbons.

124. The degradable polymer product of embodiment 116 or embodiment 117, wherein the one or more biologically sourced di-carboxylic acids are independently selected from the group consisting of oxalic acid, malonic acid, succinic acid, glutaric acid, adipic acid, pimelic acid, suberic acid, azelaic acid, and sebacic acid.

125. The degradable polymer product of embodiment 116 or embodiment 117, wherein the one or more biologically sourced diols are independently selected from the group consisting of ethylene glycol; 1,2 propanediol; 1,3-propanediol; glycerol; 1,3-butanediol; 1,4-butanediol; 2-methyl-1,3-propanediol; 2,3-butanediol; trimethylolpropane; 1,5-pentanediol; 1,6-hexanediol; 3-methyl-1,5-pentanediol; 1,7-heptanediol; 1,8-octanediol; 1,9-nonanediol; and 1,10-decanediol.

126. The degradable polymer product of any one of embodiments 94-125, wherein the degradable polymer product is a biodegradable polymer product.

127. The degradable polymer product of any one of embodiments 94-126, wherein about 5%, 10%, 20%, 30%, 40%, 50%, 60%, 70%, 80%, 90%, 95%, or 100% degradation of the bio-based polymer into subunits occurs after at least 12 weeks.

128. The degradable polymer product of embodiment 127, wherein the subunits comprise, consist essentially of, or consist of a polyol, a di-carboxylic acid, a diol, or a combination of two or more thereof 129. The degradable polymer product of embodiment 128, wherein the di-carboxylic acid is independently selected from the group consisting of oxalic acid, malonic acid, succinic acid, glutaric acid, adipic acid, pimelic acid, suberic acid, azelaic acid, and sebacic acid.

130. The degradable polymer product of embodiment 128, wherein the diol is independently selected from the group consisting of ethylene glycol; 1,2 propanediol; 1,3-propanediol; glycerol; 1,3-butanediol; 1,4-butanediol; 2-methyl-1,3-propanediol; 2,3-butanediol; trimethylolpropane; 1,5-pentanediol; 1,6-hexanediol; 3-methyl-L5-pentanediol; 1,7-heptanediol; 1,8-octanediol; 1,9-nonanediol; and 1,10-decanediol.

131. The degradable polymer product of any one of embodiments 94-130, wherein the degradation is performed at a temperature from about 22° C. to about 32° C.

132. A shoe, insole or midsole comprising, or consisting essentially of, or yet further consisting of the degradable polymer product of any one of embodiments 94-131.

133. A method of recycling a bio-based polymer product, the method comprising, or consisting essentially of, or yet further consisting of:
   incubating a bio-based polymer product, wherein the bio-based polymer product comprises a bio-based polymer, under a condition to generate a mixture of subunits from depolymerization of the bio-based polymer;
   purifying the mixture to obtain one or more isolated subunits; and
   synthesizing a pre-polymer comprising, or consisting essentially of, or yet further consisting of at least one of the one or more isolated subunits.

134. The method of embodiment 133, wherein the bio-based polymer is a polyurethane.

135. The method of embodiment 133 or embodiment 134, wherein the mixture of subunits comprises, consists essentially of, or consists of a di-carboxylic acid and diol.

136. The method of any one of embodiments 133-135, wherein the one or more isolated subunits comprises, consists essentially of, or consists of a di-carboxylic acid.

137. The method of any one of embodiments 133-136, wherein the one or more isolated subunits comprises, consists essentially of, or consists of a diol.

138. The method of any one of embodiments 133-137, wherein the pre-polymer is synthesized from two isolated subunits, each of which has a different chemical structure.

139. The method of embodiment 138, wherein the two isolated subunits comprise, consist essentially of, or consist of a diol and a di-carboxylic acid.

140. The method of embodiment 135, embodiment 136, or embodiment 139, wherein the di-carboxylic acid is selected from the group consisting of oxalic acid, malonic acid, succinic acid, glutaric acid, adipic acid, pimelic acid, suberic acid, azelaic acid, and sebacic acid.

141. The method of embodiment 135, embodiment 137, or embodiment 139, wherein the diol is selected from the group consisting of ethylene glycol; 1,2 propanediol; 1,3-propanediol; glycerol; 1,3-butanediol; 1,4-butanediol; 2-methyl-1,3-propanediol; 2,3-butanediol; trimethylolpropane; 1,5-pentanediol; 1,6-hexanediol; 3-methyl-L5-pentanediol; 1,7-heptanediol; 1,8-octanediol; 1,9-nonanediol; and 1,10-decanediol.

142. The method of any one of embodiments 133-141, wherein the bio-based polymer product comprises, consists essentially of, or consists of cross-linked components.

143. The method of any one of embodiments 133-141, wherein the bio-based polymer product further comprises a rate-regulating compound, wherein the rate-regulating compound accelerates degradation of the bio-based polymer compared to degradation of the bio-based polymer in the absence of the rate-regulating compound.

144. The method of any one of embodiments 133-141, wherein the bio-based polymer product further comprises a rate-regulating compound, wherein the rate-regulating compound decelerates degradation of the bio-based polymer compared to degradation of the bio-based polymer in the absence of the rate-regulating compound.

145. The method of embodiment 144, wherein the rate-regulating compound is a cross-linker or a chain extender additive.

146. The method of embodiment 145, wherein the cross-linker is selected from a $C_2$-$C_{12}$ diol, glycerol, trimethylolpropane, pentaerythritol, and a combination of two or more thereof.

147. The method of embodiment 145, wherein the chain extender additive is selected from trimethylolpropane; ethylene glycol; 1,2- and 1,3-propylene glycol; 1,4- and 2,3-butane diol; 1,6-hexane diol; 1,8-octane diol; neopentyl glycol; cyclohexane dimethanol; 2-methyl-1,3-propane diol; glycerine; 1,2,6-hexane triol; 1,2,4-butane triol; trimethylolethane; pentaerythritol; quinitol; mannitol; sorbitol; methyl glycoside; diethylene glycol; triethylene glycol; tetraethylene glycol; dipropylene glycol; dibutylene glycol; or a combination of two or more thereof 148. The method of embodiment 143, wherein the rate-regulating compound comprises, consists essentially of, or consists of a mineral, a salt, a vitamin, or a combination of two or more thereof.

149. The method of embodiment 148, wherein the mineral is selected from the group consisting of nitrogen, potassium, phosphate, iron, calcium, sulfur, magnesium, cobalt, zinc, and a combination of two or more thereof 150. The method of embodiment 148, wherein the salt is selected from $CaCl_2$), $Na_2HPO_4$, $KH_2PO_4$, NaCl, $NH_4Cl$, $MgSO_4$, and a combination of two or more thereof.

151. The method of embodiment 148, wherein the salt is selected from $CaCl_2$), $Na_2HPO_4$, $KH_2PO_4$, NaCl, $NH_4Cl$, $MgSO_4$, $NaNO_3$, $NaH_2PO_4$, $FeCl_3$, and a combination of two or more thereof.

152. The method of embodiment 148, wherein the vitamin is selected from p-aminobenzoic acid (PABA), folic acid, biotin, lipoic acid, mercaptoethane-sulfonic acid, nicotinic acid, pantothenic acid, pyridoxine (B6), riboflavin (B2), thiamine (B1), vitamin B12, or vitamin K, or a combination of two or more thereof.

153. The method of any one of embodiments 133-152, wherein the bio-based polymer product comprises, consists essentially of, or consists of a polyurethane foam.

154. The method of embodiment 153, wherein the polyurethane foam comprises, consists essentially of, or consists of an open cell foam.

155. The method of embodiment 153, wherein the polyurethane foam comprises, consists essentially of, or consists of a closed cell foam.

156. The method of any one of embodiments 133-152, wherein polymer is a polyurethane in a form of a foam having commercial specifications for use in the manufacture of footbeds and midsoles comprising a density of 0.05 g/cc to 0.75 g/cc as measured by ASTM D796; a hardness of 20 Asker C units to 80 Asker C units as measured by ASTM D2240; a tensile of 0.5 MPa to 5 MPa as measured by ASTM D412; elongation of 50% to 900% as measured by ASTM D2209 and ASTM D2211; Die C Tear values of 2 N/mm to 20 N/mm as measured by ASTM D624; Split Tear values of 0.5 N/mm to 3 N/mm as measured by ASTM D3574; compression of 5% to 20% as measured by ASTM 3574; and resilience of 10% to 60% as measured by DIN 53512.

157. The method of any one of embodiments 133-156, wherein the bio-based polymer product is comprised in a shoe, an insole, or a midsole.

158. The method of any one of embodiments 133-152, wherein the bio-based polymer product comprises, consists essentially of, or consists of a thermal plastic polyurethane (TPU).

159. The method of any one of embodiments 133-152, wherein the bio-based polymer product comprises, consists essentially of, or consists of a polyurethane adhesive.

160. The method of any one of embodiments 133-159, further comprising synthesizing a polymer from the pre-polymer.

161. The method of embodiment 160, wherein the polymer is a polyurethane, a polyester, or a polyester polyurethane.

162. The method of embodiment 160 or embodiment 161, wherein the synthesizing does not utilize any petroleum-based components.

163. The method of any one of embodiments 133-162, wherein the condition to generate a mixture of subunits from degradation of the bio-based polymer results in about 5%, 10%, 20%, 30%, 40%, 50%, 60%, 70%, 80%, 90%, 95%, or 100% degradation of the bio-based polymer to subunits.

164. The method of any one of embodiments 133-163, wherein the condition comprises, or consists essentially of, or consists of the inclusion of one or more independently selected from an acid, a base, a microorganism, or an enzyme.

165. The method of embodiment 164, wherein the acid is selected from hydrochloric acid, nitric acid, sulfuric acid, hydrobromic acid, hydroiodic acid, or perchloric acid, or a combination of two or more thereof 166. The method of embodiment 164, wherein the base is selected from lithium hydroxide, sodium hydroxide, potassium hydroxide, calcium hydroxide, strontium hydroxide, or barium hydroxide, or a combination of two or more thereof.

167. The method of embodiment 164, wherein the enzyme is isolated from a microorganism found in soil, compost, or seawater.

168. The method of embodiment 164 or embodiment 167, wherein the microorganism is selected from a bacterium or a fungus.

169. The method of embodiment 168, wherein the bacterium is selected from the genus *Chryseobacterium, Ochrobactrum, Paenarthrobacter, Pandoraea, Pseudomonas, Rhizobium, Stenotrophomonas, Alteromonas, Marinobacter, Achromobacter, Brucella*, or *Bacillus.*

170. The method of embodiment 164 wherein the enzyme is a serine hydrolase, a lipase, an esterase or a combination thereof 171. The method of embodiment 164, wherein the enzyme is derived from an organism selected from the genus of *Chryseobacterium*, Cladosporim, *Ochrobactrum, Paenarthrobacter, Pandoraea, Pseudomonas, Rhizobium, Stenotrophomonas, Alteromonas, Marinobacter, Achromobacter, Brucella*, or *Bacillus.*

172. The method of embodiment 170, wherein the enzyme is derived from an organism selected from *Paenarthrobacter nicotinovorans, Pseudomonas oce-*

*ani, Pseudomonas aeruginosa, Alteromonas marina, Bacillus subtilis, Brucella melitensis, Aspergillus fumigatus.*

173. The method of embodiment 164, wherein the enzyme comprises, consists essentially of, or consists of LipA or CE1, or both.

174. The method of embodiment 173, wherein the LipA is full-length enzyme or is a functional fragment.

175. The method of embodiment 173, the LipA is a modified LipA, comprising one or more substitutions.

176. The method of embodiment 175, the modified LipA comprises a valine to leucine substitution.

177. The method of any one of embodiments 173-176, wherein the LipA comprises at least 80%, 85%, 90%, 95%, 96%, 96%, 97%, 98%, 99%, or 100% sequence identity to SEQ ID NO: 1.

178. The method of embodiment 173, wherein the CE1 is full-length enzyme or is a functional fragment.

179. The method of embodiment 173, wherein the CE1 is a modified CE1, comprising one or more substitutions.

180. The method of embodiment 179, wherein the modified CE1 comprises a valine to isoleucine substitution.

181. The method of any one of embodiments 173 or 178-180, wherein the CE1 comprises at least 80%, 85%, 90%, 95%, 96%, 96%, 97%, 98%, 99%, or 100% sequence identity to SEQ ID NO: 2.

182. The method of any one of embodiments 133-181, wherein the bio-based polymer is prepared from algae-derived material.

183. The method of any one of embodiments 133-182, wherein the incubating step is performed in an aqueous solution.

184. The method of embodiment 183, wherein the aqueous solution is sea water or salt water.

185. The method of embodiment 183 or embodiment 184, wherein the aqueous solution lacks a carbon source.

186. The method of any one of embodiments 133-185, wherein the incubating is performed at a temperature from about 22° C. to about 32° C.

187. The method of embodiment 186, wherein the incubating is performed at a temperature from about 22° C. to about 30° C., from about 22° C. to about 28° C., from about 23° C. to about 30° C., from about 23° C. to about 28° C., from about 24° C. to about 30° C., from about 24° C. to about 28° C., from about 25° C. to about 30° C., from about 25° C. to about 28° C., from about 26° C. to about 30° C., or from about 26° C. to about 28° C.

188. The method of embodiment 186, wherein the incubating is performed at a temperature of about 22° C., about 23° C., about 24° C., about 25° C., about 26° C., about 27° C., about 28° C., about 29° C., about 30° C., about 31° C., or about 32° C.

189. The method of any one of embodiments 133-188, wherein the incubating is performed at a humidity of about 50%, 60%, 70%, 80%, 90%, or 100%.

190. The method of any one of embodiments 133-189, wherein the incubating is performed for at least 12 weeks.

191. A method to prepare a polyurethane, the method comprising, or consisting essentially of, or yet further consisting of:

contacting one or more diols and one or more di-carboxylic acids in a first polymerization reaction to obtain a linear aliphatic polyester polyol; and contacting the linear aliphatic polyester polyol with a diisocyanate in a second polymerization reaction to obtain the polyurethane;

wherein at least about 5% of the polyurethane degrades after incubation for 12 weeks with one or more enzymes at a temperature from about 22° C. to about 32° C.

192. The method of embodiment 191, wherein the diisocyanate is methylenebis(phenyl isocyanate) (MDI), toluene diisocyanate (TDI), hexamethylene diisocyanate (HDI), naphthalene diisocyanate (NDI), methylene bis-cyclohexylisocyanate (HMDI), isophorone diisocyanate (IPDI), or a combination of two or more thereof.

193. The method of embodiment 191 or embodiment 192, wherein the one or more diols are derived from algae.

194. The method of any one of embodiments 191-193, wherein the one or more diols comprises, consists essentially of, or consists of ethylene glycol; 1,2 propanediol; 1,3-propanediol; glycerol; 1,3-butanediol; 1,4-butanediol; 2-methyl-1,3-propanediol; 2,3-butanediol; trimethylolpropane; 1,5-pentanediol; 1,6-hexanediol; 3-methyl-L5-pentanediol; 1,7-heptanediol; 1,8-octanediol; 1,9-nonanediol; or 1,10-decanediol; or a combination of two or more thereof 195. The method of any one of embodiments 191-194, wherein the one or more di-carboxylic acids are derived from algae.

196. The method of any one of embodiments 191-195, wherein the one or more di-carboxylic acids comprises, consists essentially of, or consists of oxalic acid, malonic acid, succinic acid, glutaric acid, adipic acid, pimelic acid, suberic acid, azelaic acid, or sebacic acid, or a combination of two or more thereof.

197. The method of any one of embodiments 191-196, wherein the one or more diols are contacted with an equimolar amount of the one or more di-carboxylic acids.

198. The method of any one of embodiments 191-197, wherein the linear aliphatic polyester polyol has a molecular weight of about 400 to about 4000 and OH number of about 14 mg KOH/g to about 140 mg KOH/g.

199. The method of any one of embodiments 191-198, wherein the polyurethane further comprises a rate-regulating compound, wherein the rate-regulating compound accelerates degradation of the bio-based polymer compared to degradation of the bio-based polymer in the absence of the rate-regulating compound.

200. The method of embodiment 199, wherein the rate-regulating compound comprises, consists essentially of, or consists of a mineral, a salt, a vitamin, or a combination of two or more thereof.

201. The method of embodiment 200, wherein the mineral is selected from the group consisting of nitrogen, potassium, phosphate, iron, calcium, sulfur, magnesium, cobalt, zinc, and a combination of two or more thereof 202. The method of embodiment 200, wherein the salt is selected from $CaCl_2$, $Na_2HPO_4$, $KH_2PO_4$, NaCl, $NH_4Cl$, $MgSO_4$, $NaNO_3$, $NaH_2PO_4$, $FeCl_3$, and a combination of two or more thereof.

203. The method of embodiment 199, wherein the rate-regulating compound is a cell-opener.

204. The method of embodiment 203, wherein the cell-opener is selected from VORANOL™ CP1421 polyol (polyether polyol), VORANOL™ 4053 polyol (polyether polyol), GORAPUR® IMR 852 (silicone-based), TEGOSTAB® B8948, NIAX™ L-1507 (non-hydrolyzable silicone surfactant), NIAX™ L-6164 (non-hydrolyzable silicone copolymer surfactant), NIAX™ L-6186 (non-hydrolyzable silicone copolymer surfactant), and NIAX™ L-6189 (organosilicone copolymer surfactant).

205. The method of any one of embodiments 191-204, wherein the polyurethane is in the form of a foam.

206. The method of any one of embodiments 191-205, wherein the method avoids mechanical shearing prior to pouring during the step to form the polyurethane.

207. The method of any one of embodiments 191-202, wherein the polyurethane is in the form of a thermal plastic polyurethane (TPU).

208. The method of any one of embodiments 191-202, wherein the polyurethane is in the form of an adhesive.

209. The method of any one of embodiments 191-208, wherein at least about 6%, 10%, 15%, 20%, 25%, 30%, 40%, 50%, 60%, 70%, 80%, 90%, 95%, or 100% of the polyurethane degrades after incubation for 12 weeks with one or more enzymes at a temperature from about 22° C. to about 32° C.

210. The method of embodiment 209, wherein the incubation is performed at a temperature from about 22° C. to about 30° C., from about 22° C. to about 28° C., from about 23° C. to about 30° C., from about 23° C. to about 28° C., from about 24° C. to about 30° C., from about 24° C. to about 28° C., from about 25° C. to about 30° C., from about 25° C. to about 28° C., from about 26° C. to about 30° C., or from about 26° C. to about 28° C.

211. The method of embodiment 209, wherein the incubation is performed at a temperature of about 22° C., about 23° C., about 24° C., about 25° C., about 26° C., about 27° C., about 28° C., about 29° C., about 30° C., about 31° C., or about 32° C.

212. The method of any one of embodiments 191-211, wherein the incubation is performed at a humidity of about 50%, 60%, 70%, 80%, 90%, or 95%.

213. The method of any one of embodiments 191-212, wherein the one or more enzymes are from a fungus isolated from soil, compost, or seawater.

214. The method of any one of embodiments 191-213, wherein the one or more enzymes are from a bacterium selected from the genus *Chryseobacterium, Ochrobactrum, Paenarthrobacter, Pandoraea, Pseudomonas, Rhizobium, Stenotrophomonas, Alteromonas, Marinobacter*, or *Bacillus*.

215. The method of any one of embodiments 191-213, wherein at least one of the one or more enzymes is a serine hydrolase, a lipase, an esterase, or a combination of two or more thereof.

216. The method of any one of embodiments 191-213, wherein at least one of the one or more enzymes comprises, consists essentially of, or consists of LipA or CE1, or both.

217. The method of embodiment 216, wherein the LipA is full-length enzyme or is a functional fragment.

218. The method of embodiment 216 or embodiment 217, wherein the LipA is a modified LipA, comprising one or more substitutions.

219. The method of embodiment 218, wherein the modified LipA comprises a valine to leucine substitution.

220. The method of any one of embodiments 216-219, wherein the LipA comprises at least 80%, 85%, 90%, 95%, 96%, 96%, 97%, 98%, 99%, or 100% sequence identity to SEQ ID NO: 1.

221. The method of embodiment 216, wherein the CE1 is full-length enzyme or is a functional fragment.

222. The method of embodiment 216, wherein the CE1 is a modified CE1, comprising one or more substitutions.

223. The method of embodiment 222, wherein the modified CE1 comprises a valine to isoleucine substitution.

224. The method of any one of embodiments 216 or 221-223, wherein the CE1 comprises at least 80%, 85%, 90%, 95%, 96%, 96%, 97%, 98%, 99%, or 100% sequence identity to SEQ ID NO: 2.

REFERENCES

1. Akio, S., & Kazuo, A. (1994) Stable cholesterol-esterase and production thereof. JP7203959. Japan Patent Office.
2. Dartois, V., Baulard, A., Schanck, K., & Colson, C. (1992). Cloning, nucleotide sequence and expression in *Escherichia coli* of a lipase gene from *Bacillus subtilis* 168. *Biochimica Et Biophysica Acta (BBA)—Gene Structure and Expression,* 1131(3), 253-260.
3. Filip, Z. (1979) Polyurethane as the sole nutrient source for *Aspergillus niger* and *Cladosporium herbarum. European J. Appl. Microbiol. Biotechnol* 7: 277.
4. Gautam, R., Bassi, A. S. & Yanful, E. K. (2007) *Candida rugosa* lipase-catalyzed polyurethane degradation in aqueous medium. *Biotechnol Lett* 29, 1081-1086
5. Yang J Y, et al. (2012) Primer on agar-based microbial imaging mass spectrometry. *J Bacteriol* 194(22):6023-6028.
6. Marotz, L., Schwartz, T., Thompson, L., Humphrey, G., Gogul, G., Gaffney, J., Amir, A., Knight, R. (2018) Earth Microbiome Project (EMP) high throughput (HTP) DNA extraction protocol.
7. Mukherjee, K., Tribedi, P., Chowdhury, A. et al. (2011) Isolation of a *Pseudomonas aeruginosa* strain from soil that can degrade polyurethane diol. *Biodegradation* 22, 377-388.
8. Rowe, L., & Howard, G. T. (2002) Growth of *Bacillus subtilis* on polyurethane and the purification and characterization of a polyurethanase-lipase enzyme. International *Biodeterioration & Biodegradation,* 50(1), 33-40.
9. Sonnenschein, M. F. (2014) Polyurethanes: science, technology, markets, and trends. Vol. 11. John Wiley & Sons
10. Teng, D., Wang, J., Fan, Y. et al. (2006) Cloning of β-1,3-1,4-glucanase gene from *Bacillus licheniformis* EGW039 (CGMCC 0635) and its expression in *Escherichia coli* BL21 (DE3). *Appl Microbiol Biotechnol* 72, 705-712.

What is claimed is:

1. A method to biodegrade a bio-based polymer product, the method comprising incubating the bio-based polymer product with a first microorganism, wherein:

the bio-based polymer product comprises a bio-based polymer;

the bio-based polymer is a polyurethane; and incubation of the bio-based polymer product with the first microorganism degrades the bio-based polymer to subunits comprising a di-carboxylic acid, a diol, or a combination thereof; wherein the diol is selected from ethylene glycol; 1,2 propanediol; 1,3-propanediol; glycerol; 1,3-butanediol; 1,4-butanediol; 2-methyl-1,3-propanediol; 2,3-butanediol; trimethylolpropane; 1,5-pentanediol; 1,6-hexanediol; 3-methyl-1,5-pentanediol; 1,7-heptanediol; 1,8-octanediol; 1,9-nonanediol; 1,10-decanediol; or a combination of two or more thereof; and wherein the bio-based polymer product further comprises a rate-regulating compound, and the rate-regulating compound comprises a salt selected from $CaCl_2$, $Na_2HPO_4$, $KH_2PO_4$, NaCl, $NH_4Cl$, $MgSO_4$, $NaNO_3$, $NaH_2PO_4$, $FeCl_3$, or a combination of two or more thereof.

2. The method of claim 1, wherein the polyurethane is a polymerization product of one or more linear aliphatic polyester polyols, and a diisocyanate.

3. The method of claim 2, wherein the one or more linear aliphatic polyester polyols are produced from one or more biologically sourced diols and one or more biologically sourced di-carboxylic acids.

4. The method of claim 3, wherein the one or more biologically sourced diols, the one or more biologically sourced di-carboxylic acids, or a combination thereof are derived from algae.

5. The method of claim 3, wherein the one or more biologically sourced diols or the one or more biologically sourced di-carboxylic acids are non-branched, or the one or more biologically sourced diols and the one or more biologically sourced di-carboxylic acids are non-branched.

6. The method of claim 3, wherein the one or more biologically sourced diols and the one or more biologically sourced di-carboxylic acids are branched.

7. The method of claim 3, wherein the one or more biologically sourced diols or the one or more biologically sourced di-carboxylic acids have a carbon chain length of 2-4 carbons, or the one or more biologically sourced diols and the one or more biologically sourced di-carboxylic acids have a carbon chain length of 2-4 carbons.

8. The method of claim 3, wherein the one or more biologically sourced di-carboxylic acids have a carbon chain length of 5-20 carbons.

9. The method of claim 1, wherein the bio-based polymer product comprises a foam.

10. The method of claim 1, wherein the bio-based polymer product comprises a thermal plastic polyurethane (TPU).

11. The method of claim 1, wherein the first microorganism is selected from the group consisting of *Paenarthrobacter nicotinovorans, Pseudomonas oceani, Pseudomonas aeruginosa, Alteromonas marina, Bacillus subtilis, Brucella melitensis*, and *Aspergillus fumigatus*.

12. The method of claim 1, wherein the subunits comprise a di-carboxylic acid, a diol, or a combination of two or more thereof, wherein the di-carboxylic acid is independently selected from the group consisting of oxalic acid, malonic acid, succinic acid, glutaric acid, adipic acid, pimelic acid, suberic acid, azelaic acid, and sebacic acid.

13. A method to degrade a bio-based polymer product, the method comprising incubating the bio-based polymer product with an acid or a base, wherein:

the bio-based polymer product comprises a bio-based polymer;

the bio-based polymer is a polyurethane;

the acid is selected from hydrochloric acid, nitric acid, sulfuric acid, hydrobromic acid, hydroiodic acid, or perchloric acid, or a combination of two or more thereof, the base is selected from lithium hydroxide, sodium hydroxide, potassium hydroxide, calcium hydroxide, strontium hydroxide, or barium hydroxide, or a combination of two or more thereof, and incubation of the bio-based polymer product with the acid or the base degrades the bio-based polymer to subunits comprising a di-carboxylic acid, a diol, or a combination thereof; wherein the diol is selected from ethylene glycol; 1,2 propanediol; 1,3-propanediol; glycerol; 1,3-butanediol; 1,4-butanediol; 2-methyl-1,3-propanediol; 2,3-butanediol; trimethylolpropane; 1,5-pentanediol; 1,6-hexanediol; 3-methyl-1,5-pentanediol; 1,7-heptanediol; 1,8-octanediol; 1,9-nonanediol; 1,10-decanediol; or a combination of two or more thereof.

14. A method of recycling a bio-based polymer product, the method comprising:

incubating a bio-based polymer product under a condition to generate a mixture of subunits from depolymerization of the bio-based polymer;

purifying the mixture to obtain one or more isolated subunits; and synthesizing a pre-polymer comprising at least one of the one or more isolated subunits;

wherein the bio-based polymer product comprises a bio-based polymer;

the bio-based polymer is a polyurethane; and the subunits comprise a di-carboxylic acid, a diol, or a combination thereof; wherein the diol is selected from ethylene glycol; 1,2 propanediol; 1,3-propanediol; glycerol; 1,3-butanediol; 1,4-butanediol; 2-methyl-1,3-propanediol; 2,3-butanediol; trimethylolpropane; 1,5-pentanediol; 1,6-hexanediol; 3-methyl-1,5-pentanediol; 1,7-heptanediol; 1,8-octanediol; 1,9-nonanediol; 1,10-decanediol; or a combination of two or more thereof.

15. The method of claim 1, further comprising isolating the subunits.

16. The method of claim 13, further comprising isolating the subunits.

17. The method of claim 13, wherein the bio-based polymer product further comprises a rate-regulating compound, wherein the rate-regulating compound comprises a mineral, a salt, a vitamin, or a combination of two or more thereof;

wherein the mineral is selected from the group consisting of nitrogen, potassium, phosphate, iron, calcium, sulfur, magnesium, cobalt, zinc, and a combination of two or more thereof;

wherein the salt is selected from $CaCl_2$, $Na_2HPO_4$, $KH_2PO_4$, NaCl, $NH_4Cl$, $MgSO_4$, $NaNO_3$, $NaH_2PO_4$, $FeCl_3$, or a combination of two or more thereof, and wherein the vitamin is selected from p-aminobenzoic acid (PABA), folic acid, biotin, lipoic acid, mercaptoethanesulfonic acid, nicotinic acid, pantothenic acid, pyridoxine (B6), riboflavin (B2), thiamine (B1), vitamin B12, or vitamin K, or a combination of two or more thereof.

18. The method of claim 13, wherein the polyurethane is in the form of a foam, a thermal plastic polyurethane (TPU), or an adhesive.

19. The method of claim 14, wherein the bio-based polymer product further comprises a rate-regulating compound, wherein the rate-regulating compound comprises a mineral, a salt, a vitamin, or a combination of two or more thereof;

wherein the mineral is selected from the group consisting of nitrogen, potassium, phosphate, iron, calcium, sulfur, magnesium, cobalt, zinc, and a combination of two or more thereof;

wherein the salt is selected from $CaCl_2$, $Na_2HPO_4$, $KH_2PO_4$, NaCl, $NH_4Cl$, $MgSO_4$, $NaNO_3$, $NaH_2PO_4$, $FeCl_3$, or a combination of two or more thereof; and wherein the vitamin is selected from p-aminobenzoic acid (PABA), folic acid, biotin, lipoic acid, mercaptoethanesulfonic acid, nicotinic acid, pantothenic acid, pyridoxine (B6), riboflavin (B2), thiamine (B1), vitamin B12, or vitamin K, or a combination of two or more thereof.

20. The method of claim 14, wherein the polyurethane is in the form of a foam, a thermal plastic polyurethane (TPU), or an adhesive.

* * * * *